United States Patent [19]

Andrews et al.

[11] Patent Number: 4,646,075

[45] Date of Patent: Feb. 24, 1987

[54] SYSTEM AND METHOD FOR A DATA PROCESSING PIPELINE

[75] Inventors: David H. Andrews, West Jordan; Phillip H. Lucht, Salt Lake City; Leland K. Putnam, Taylorsville, all of Utah

[73] Assignee: Robert Bosch Corporation, Salt Lake City, Utah

[21] Appl. No.: 548,312

[22] Filed: Nov. 3, 1983

[51] Int. Cl.[4] .............................................. G09G 1/16
[52] U.S. Cl. .................................. 340/747; 340/728; 340/731; 340/703; 340/724
[58] Field of Search ............... 340/729, 728, 747, 731, 340/717, 703, 724, 739

[56] References Cited

U.S. PATENT DOCUMENTS

| Re. 30,785 | 10/1981 | Lovercheck et al. | 364/200 |
|---|---|---|---|
| 3,399,401 | 8/1968 | Ellis et al. | 340/709 |
| 3,534,338 | 10/1970 | Christensen et al. | |
| 3,534,396 | 10/1970 | Hart et al. | 235/61.6 |
| 3,602,702 | 8/1971 | Warnock | 235/151 |
| 3,639,736 | 2/1972 | Sutherland | 235/152 |
| 3,684,876 | 8/1972 | Sutherland | 235/152 |
| 3,700,792 | 10/1972 | Harrison, III et al. | 178/6.8 |
| 3,747,087 | 7/1973 | Harrison, III et al. | 340/725 |
| 3,763,365 | 10/1973 | Seitz | 235/156 |

List Continued on next page.

OTHER PUBLICATIONS

*On Coons and Other Methods for the Representation of Curved Surfaces;* Forrest; 1972; Reprinted in *Interactive Computer Graphics;* H. Freeman, Ed. IEEE Cat. No. EHO 156-0; 2/80.

List Continued on next page.

*Primary Examiner*—Marshall M. Curtis
*Attorney, Agent, or Firm*—Workman, Nydegger & Jensen

[57] ABSTRACT

An electronic data processing pipeline system and method for processing encoded control points representing graphical illustrations. The pipeline comprises a number of separate micro-programmed circuit cards, each of which are programmed to perform a specific processing operation.

A command is first sent to a matrix maker card defining a geometrical transformation to be performed on the graphical illustration. The matrix maker card, together with a matrix multiplier card, then calculates a transformation matrix representing the desired transformation.

Electronic representations of control data points are then transmitted to the pipeline for processing. These control points are 3D points comprising both the vertices which terminate linear edges of the illustration and the control points corresponding to curved edges of the illustration. Each of the points is encoded to indicate whether it represents a vertex or a control point for a curved edge. In addition, the various points are encoded to indicate whether the corresponding portion of the illustration is to be rendered as a solid figure or a line drawing.

The control points are then multiplied by the transformation matrix, computed previously, in a vector multiplier circuit card. Next, the control points are clipped to the planes of the viewing frustum by a number of clipper cards (one card for each clipping plane). The 3D control points are then mapped onto the 2D viewing window by a viewport card.

Once the control points have been processed as set forth above, the clipped control points are then exploded to generate a plurality of small line segments representing each of the curved edges of the illustration. A sufficient number of line segments are generated for each edge such that the edges of the illustration appear smooth to the viewer. Finally, the appropriate portions of the illustration are rendered as a line drawing, in accordance with the code attached to the various control points; and the processed data is then converted into a form which is appropriate for scan conversion.

26 Claims, 47 Drawing Figures

U.S. PATENT DOCUMENTS

| | | | |
|---|---|---|---|
| 3,816,726 | 6/1974 | Sutherland et al. | 235/152 |
| 3,889,107 | 6/1975 | Sutherland | 235/152 |
| 3,893,075 | 7/1975 | Orban et al. | 340/747 |
| 3,906,197 | 9/1975 | Grover | 235/151 |
| 3,925,776 | 12/1975 | Swallow | 340/703 |
| 3,944,997 | 3/1976 | Swallow | 340/703 |
| 3,978,280 | 8/1976 | Kavanagh et al. | 178/6.8 |
| 4,016,362 | 4/1977 | Bristow et al. | 358/142 |
| 4,045,789 | 8/1977 | Bristow | |
| 4,079,450 | 3/1978 | Grimm et al. | 364/200 |
| 4,094,000 | 6/1978 | Brudevold | 364/900 |
| 4,107,665 | 8/1978 | Mayer et al. | |
| 4,112,422 | 9/1978 | Mayer et al. | |
| 4,116,444 | 9/1978 | Mayer et al. | 273/101.2 |
| 4,117,473 | 9/1978 | Habeger, Jr. et al. | |
| 4,127,849 | 11/1978 | Okor | 340/725 |
| 4,148,070 | 4/1979 | Taylor | 358/160 |
| 4,159,519 | 6/1979 | Gupta | 364/200 |
| 4,168,488 | 9/1979 | Evans | 340/146.3 H |
| 4,189,743 | 2/1980 | Schure et al. | 358/93 |
| 4,189,744 | 2/1980 | Stern | 358/93 |
| 4,197,590 | 4/1980 | Sukonick et al. | 364/900 |
| 4,205,389 | 5/1980 | Heartz | 340/747 |
| 4,212,009 | 7/1980 | Apleman et al. | 340/747 |
| 4,222,048 | 9/1980 | Johnson | 340/747 |
| 4,225,920 | 9/1980 | Stokes | 364/200 |
| 4,225,929 | 9/1980 | Ikeda | 364/521 |
| 4,228,497 | 10/1980 | Gupta et al. | 364/200 |
| 4,229,790 | 10/1980 | Gilliland et al. | 364/200 |
| 4,266,253 | 5/1981 | Matherat | 358/903 |
| 4,272,767 | 6/1981 | Lacy | 340/722 |
| 4,283,765 | 8/1981 | Rieger | 364/521 |
| 4,296,476 | 10/1981 | Mayer et al. | 364/900 |
| 4,301,443 | 11/1981 | Sternberg et al. | 340/146.3 MA |
| 4,301,472 | 11/1981 | Danos | 358/163 |
| 4,303,986 | 12/1981 | Lans | 364/900 |
| 4,314,351 | 2/1982 | Postel et al. | 340/739 |
| 4,458,330 | 7/1984 | Imsand et al. | 340/747 |
| 4,475,104 | 10/1984 | Shen | 340/747 |

OTHER PUBLICATIONS

J. D. Foley et al., Fundamentals of Interactive Computer Graphics, pp. 514–536 (U.S.A., 1982).

T. Pavlidis, Algorithms for Graphics and Image Processing, pp. 215–316 (U.S.A., 1982).

Sproul, Robert F., *Principles of Interactive Computer Graphics* at pp. 309–331 (2d ed. 1979).

New York Institute of Technology and Computer Graphics Lab, Inc., *Computer Graphics Lab, Inc.*

New York Institute of Technology and Computer Graphics Lab, Inc., *Business Screen,* "The Elements of Style in Computer Pictures," (U.S.A., 1982).

Grove Video Corporation, *The New Digital Graphics System* (U.S.A., 1982).

*Educational and Industrial Television,* "Directory of Special Effects Generators and Computer Graphics Systems," at pp. 43–52 (U.S.A., Mar., 1982).

Cinetron Computer Systems, Inc.

Microconsultants, Inc., *MCI/Quantel News* (U.S.A., Mar. 1982).

Aurora Systems, *Aurora/100 Digital Videographics System Product Description* (U.S.A., Apr. 1982).

Interrand Corporation (U.S.A., 1982).

Via Vodeo, Inc., *System One.*

MPB Technologies, Inc. (Canada, 1979).

Dubner Computer Systems, Inc. (U.S.A., 1981).

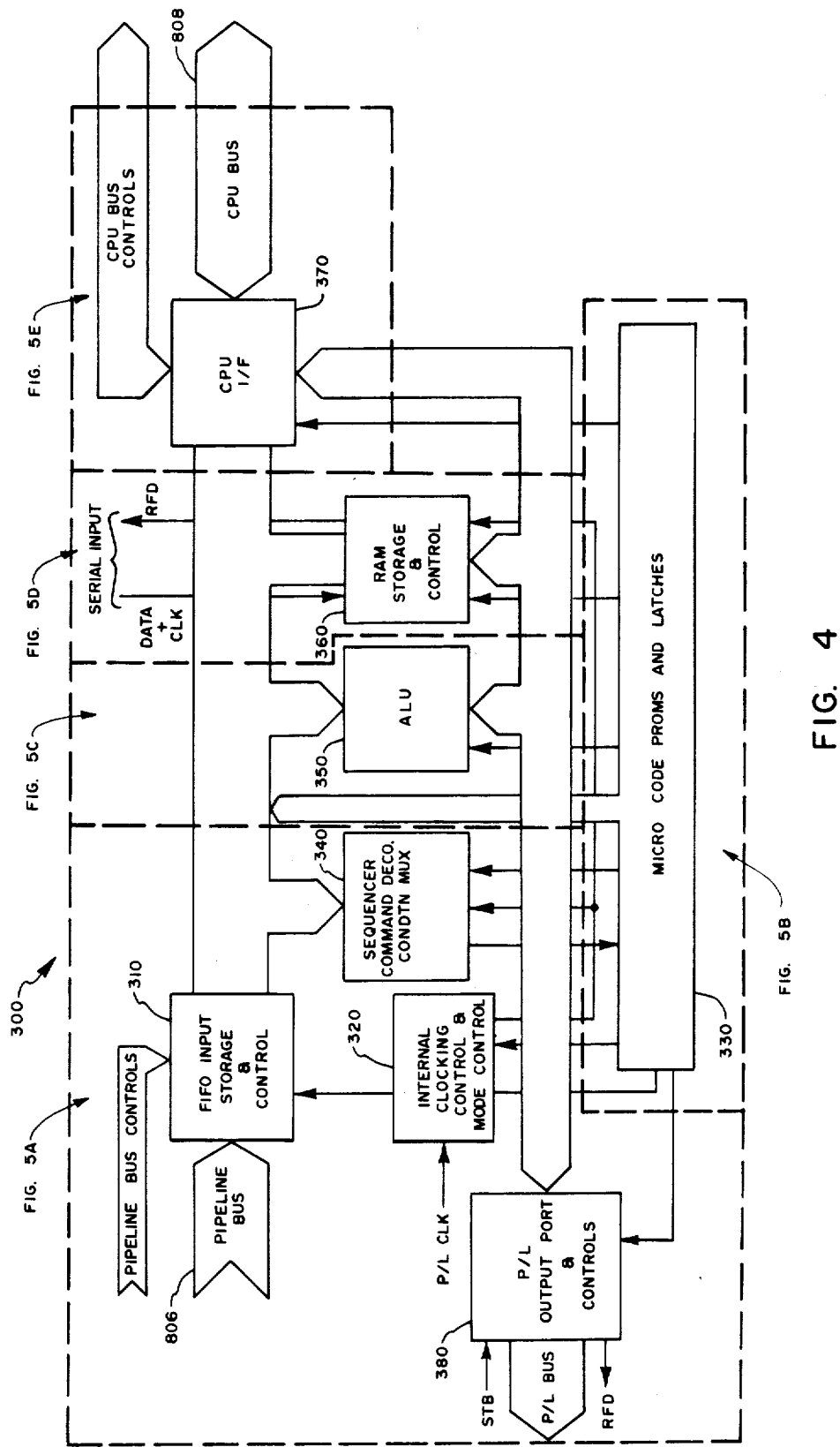

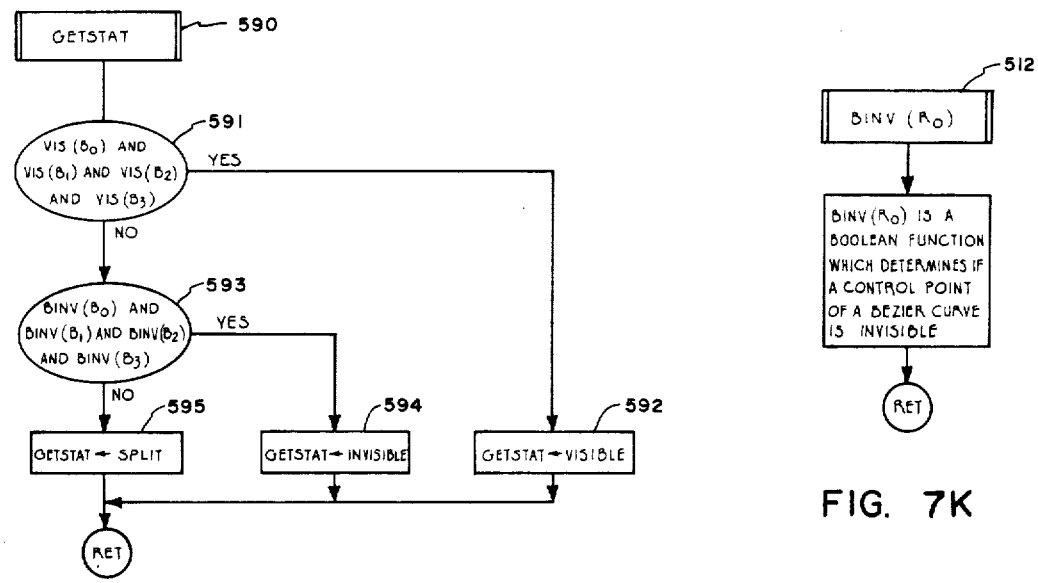
FIG. 7J
FIG. 7K
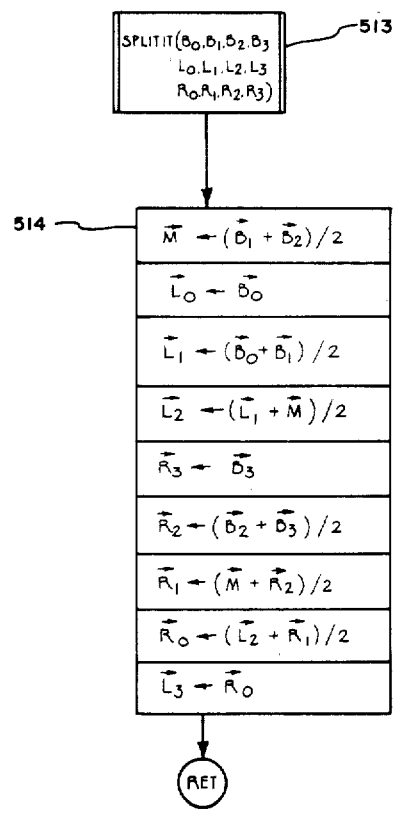
FIG. 7L

SYSTEM AND METHOD FOR A DATA PROCESSING PIPELINE

Appendices A-S, referred to herein, have been attached to the original specification.

BACKGROUND

1. The Field of the Invention

This invention relates to computerized graphic systems and, more particularly, to a novel system and method of computerized graphics in which a relatively small number of control data points generated by a parametric function are rapidly processed using a novel data processing pipeline so as to generate real time animation of graphical illustrations, even though such illustrations may be composed of curved lines or curved surfaces.

2. The Prior Art

During recent years, there has been an increased interest in the technology of computer graphics and computer-aided animation. It has been found that such technology can significantly reduce costs and increase productivity in a number of different fields.

Television broadcasters, for example, are often in need of graphic designs for use in their broadcasts. This is particularly true in the case of news broadcasts, where maps and graphs are frequently desired in order to help explain newsworthy events. Moreover, in many instances, it is also desirable to animate such graphic designs and illustrations during the broadcast. Using traditional illustration and animation methods, however, it would usually take several hours to produce the desired, animated result. Therefore, broadcasters have begun to routinely rely upon various computer-aided illustration and animation systems in order to meet their stringent time deadlines.

Another area in which computer-aided graphic design and animation has been increasingly employed, is that of computer-aided design. A growing number of manufacturers are finding that the graphic capabilities available through various computer graphic systems can greatly increase manufacturing productivity and significantly reduce design costs.

As a result of this growing interest in and need for computer graphics and computer-aided animation systems, a number of such systems have been developed which seek to meet the needs of various users. Typically, in such systems, an illustration is first converted into a number of data points. Importantly, it is desirable to obtain enough data points such that curved lines in the illustration will look smooth when adjacent data points are connected by a small line segment. It will be appreciated, therefore, that curved portions of an illustration will usually contain a significant number of data points. Once obtained, the numerous data points are then stored in some type of a memory device within the system.

Next, a viewing field is selected. The data points are then processed by the system in order to determine which points lie inside of the viewing field. Data points which lie outside the viewing field are then eliminated, and the illustration is thus "clipped" to the viewing field. After this "clipping" is completed, adjacent data points are connected by a short line segment so as to define some type of closed, graphic figure. Thereafter, each such graphic figure is typically colored or shaded in response to commands from the system user. The numerous colored figures are then displayed on a video monitor or other output device so as to produce the desired graphical illustration.

Although the prior art systems have greatly facilitated the preparation of graphic designs and animation, such systems also have a number of drawbacks and disadvantages, especially in terms of the ability of such systems to efficiently animate illustrations which have curved lines and surfaces. Most prior art systems will define each curved line in an illustration in terms of a relatively large number of data points which are then connected by line segments so that the line segments collectively approximate the curved line. If it is desired to modify the illustration in order to create animation, each of the data points for each line segment must be re-processed. For example, if the letter "S" were to be enlarged or rotated about an axis, the numerous data points used to approximate the curves of the "S" would each be processed a number of successive times. The large number of data points which must be processed greatly increases the storage capacity required for the system, as well as the processing time which is required.

Further, as mentioned above, the data points which are used to define the curved lines used in an illustration are connected by a series of short line segments which approximates the curved lines of the illustration. It will be appreciated, therefore, that when the illustration is enlarged on the viewing screen, the individual line segments become more visible, thus rendering the illustration less smooth. An analogous problem exists when attempting to approximate a curved surface. The prior art systems have not yet devised a way to overcome this problem, except through the use of complex shading techniques.

Still further, it has been found that the prior art systems are generally incapable of producing both line drawings and solid figures. Thus, a prior art system will typically produce either solid figures or line drawings, but such systems can rarely produce both kinds of drawings. Moreover, even if a prior art system can produce both solid figures and line drawings, prior art systems are generally incapable of incorporating both kinds of drawings into the same illustration.

Accordingly, it would be an improvement in the art to provide a system and method for generating and animating graphical illustrations which minimizes the number of data points which must be stored and processed. It would also be an improvement in the art to provide a system and method for processing data points representing graphical illustrations which minimizes the time required for processing such data points. Additionally, it would be an improvement in the art to provide a system and method for generating graphical illustrations wherein the illustrations remain smooth even after enlargement. Further, it would be an improvement in the art to provide a system and method for generating graphical illustrations which is capable of rendering both solid figures and line drawings within the same illustration. Such a system and method is disclosed and claimed herein.

BRIEF SUMMARY AND OBJECTS OF THE INVENTION

The present invention is directed to a computerized graphics system which utilizes a novel system and method for a data processing pipeline used to rapidly process control data points derived from a parameter function in order to generate real time animation of graphical illustrations. The pipeline comprises a number of separate micro-programmed circuit cards, each of which is programmed to perform a specific processing operation.

A command is first sent to a matrix maker card defining a geometrical transformation to be performed on the graphical illustration. The matrix maker card, together with a matrix multiplier card, then calculates a transformation matrix representing the desired geometrical transformation.

Electronic representations of control data points are then transmitted to the pipeline for processing. In one presently preferred embodiment of the invention, these control points are 3D points comprising, in the case of a curved line, both the vertices which terminate linear edges of the illustration and the Bezier control points corresponding to curved edges of the illustration. Significantly, each of the points is encoded to indicate whether it represents a vertex or a Bezier control point. In addition, the various points are encoded to indicate whether the corresponding portion of the illustration is to be rendered as a solid figure or a line drawing.

The control points are then multiplied by the transformation matrix, computed previously, in a vector multiplier circuit card. Next, the control points are clipped to the planes of the viewing frustum by a number of clipper cards (one card for each clipping plane). The 3D control points are then mapped onto the 2D viewing window by a viewpoint card.

Once the control points have been processed as set forth above, the clipped Bezier control points are then exploded to generate a plurality of small line segments representing each of the curved edges of the illustration. A sufficient number of line segments is generated for each edge such that the edges of the illustration appear smooth to the viewer. Finally, the appropriate portions of the illustration are rendered as line drawings, in accordance with the code attached to the various control points. The processed data is then converted into a form which is appropriate for scan conversion.

It is, therefore, a primary object of the present invention to provide a computer graphics system which utilizes a novel system and method for a data processing pipeline so that the quantity of data which must be stored and processed is substantially decreased in order to more efficiently achieve real time graphical animation.

It is also an object of the present invention to provide a data processing pipeline system and method for processing electronic representations of graphical illustrations which can clip the curved portions of such illustrations to a viewing frustum without converting said curved portions into numerous line segments.

Additionally, it is an object of the present invention to provide a data processing pipeline system and method having an increased processing speed.

Further, it is an object of the present invention to provide a data processing pipeline for use in processing data points representing a graphical illustration which will produce an illustration with substantially smooth edges even though the illustration is greatly enlarged on the viewing screen.

It is a still further object of the present invention to provide an automated graphics system which is capable of producing both solid figures and line drawings as part of a single illustration.

These and other objects and features of the present invention will become more fully apparent from the following description and appended claims taken in conjunction with the accompanying drawings.

BRIEF DESCRIPTION OF THE DRAWINGS

FIGS. 3A-3I are detailed electrical schematic diagrams illustrating one presently preferred embodiment of the general block diagram of FIG. 3.

FIG. 4 is a general block diagram of the header card of the data processing pipeline of the present invention.

DETAILED DESCRIPTION OF THE PRESENTLY PREFERRED EMBODIMENT

It will be readily appreciated that the components of the present invention, as generally described and illustrated in the figures herein, could be arranged and designed in a wide variety of different configurations. Thus, the following more detailed description of the system and method of the present invention, as represented in FIGS. 1 through 9D, is not intended to limit the scope of the invention, as claimed, but is merely representative of one presently preferred embodiment of the invention.

General Discussion—Typical Pipeline Use

As used herein, the term "pipeline" is used to refer to that portion of a computer graphics system in which the control data points which are used to define a graphic figure are processed, either by system hardware or software. The phrase "control data points" or "control points" refers, in the case of curved lines, to a set of points which is used to control the curve's shape in a predictable way. In the case of a curved surface, the control points define flat surface patches which are used to approximate the shape of the curved surface in a predictable way. As hereinafter more fully described, such control points are derived from parametric (or so-called vector-valued) functions such as Bezier or B-spline formulations.

The primary functions to be performed by the novel pipeline of the present invention comprise geometric transformation of the control data points, clipping the data points to a viewing frustum, and then exploding each curved line or curved surface contained in the figure so as to define each curved line or surface in terms of a number of very small straight line segments or flat planar patches which closely approximate the curved line or curved surface in a smooth fashion.

The data processing pipeline of the present invention may be used with virtually any computer graphics system in which real time animation of objects which are composed of curved lines or curved surfaces in a desirable feature. Thus, the pipeline of the present invention could be used in many types of computer graphics systems for different types of applications. It should be noted, therefore, that the data processing pipeline of the present invention is not intended to be limited to any particular application or type of system.

Figure 1:
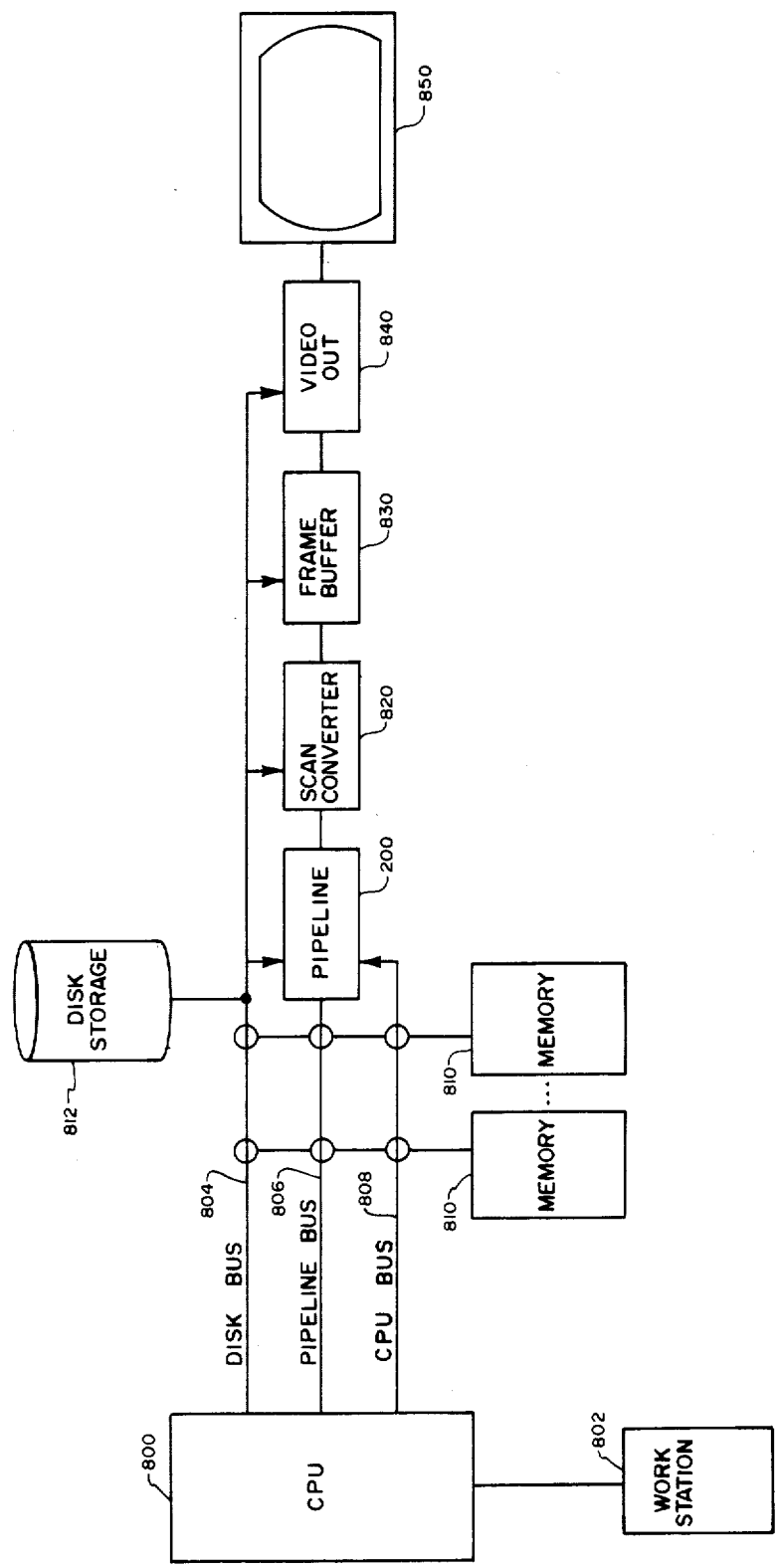
FIG. 1 is a general block diagram illustrating a computer graphics system which incorporates the novel data processing pipeline of the present invention.

For purposes of illustrating the general use and operation of the data processing pipeline of the present invention, designated generally at 200, pipeline 200 is illustrated in FIG. 1 as being used with a computer graphics animation system. As depicted in FIG. 1, the computer animation system comprises a central processing unit (CPU) 800 which controls the operation of the overall system and performs various calculations and operations both prior to and during data processing. CPU 800 could comprise a wide variety of different types of CPUs. For example, CPU 800 could comprise a large main frame computer. Alternatively, CPU 800 could comprise some type of microprocessor, such as, for example, a Motorolla 68000 microprocessor.

CPU 800 receives and transmits data to system users by means of one or more work stations 802. Work station 802 may comprise any suitable computer graphic work station. For example, work station 802 might include a conventional computer graphic tablet and stylus for communicating graphic information to CPU 800. In addition, work station 802 may also typically include a video display unit for use in viewing the graphic illustration generated by the system. Further, work station 802 may include additional controls and/or a standard computer key pad for use in transmitting commands and/or data to CPU 800.

In use, work station 802 is used to transmit data representing a desired graphic illustration to CPU 800. CPU 800 then transforms the data into a form which is suitable for processing. Accordingly, in the computer animation system illustrated in FIG. 1, CPU 800 would transform the data received from work station 802 in the following manner.

Figure 1A:
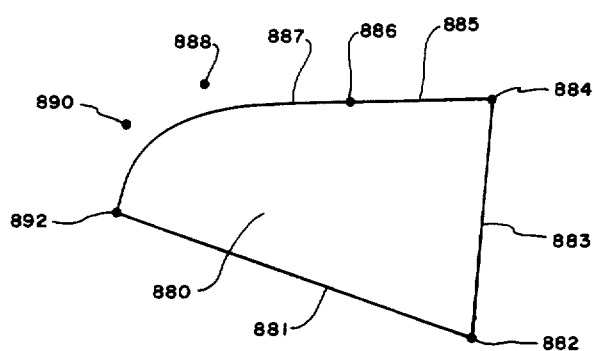
FIG. 1A depicts the data points which would be transmitted to the pipeline with respect to the closed figure illustrated.

First, CPU 800 reduces the illustration to a finite number of simple graphic figures or faces, such as, for example, face 880 of FIG. 1A. CPU 800 then generates a relatively small number of control data points which represent each face.

For each boundary of any given face which is a straight line, these control points are simply the vertices of the face. Thus, in the case of face 880 of FIG. 1A, control points 882, 884, 886 and 892 would be generated by CPU 800 since they represent vertices corresponding to linear edges 881, 883, and 885.

Any curved line which forms part of such a face may be represented by control points derived from parametric functions. For example, four Bezier control points can be used to define the shape of any curved line which forms part of such a face, where such control points are derived from the following equation:

$$f(t) = \sum_{i=0}^{3} B_{i,n}(t) p_i,$$

where $$B_{i,n}(t) = C(n,i) t^i (1-t)^{n-i},$$

are the Bernstein basis (binominal distribution) functions and $P_i$ are the Bezier control points. Thus, in the example illustrated in FIG. 1A, the curved boundary 887 of face 880 would be represented by the four Bezier control points 886, 888, 890 and 892. Similarly, other parametric functions such as the well-known B-spline function could be used to generate such control points.

As hereinafter more fully described, by configurating the data processing pipeline so that it operates first on the control data points when performing the geometric transformations, clipping, and mapping of the graphic figure to the desired viewport, it becomes unnecessary to manipulate all of the data points which are ultimately used to define the numerous straight line segments which approximate the curved lines in a figure. This greatly enhances the speed of the pipeline.

Similarly, using analogous equations and techniques, curved surfaces can also be represented using Bezier, B-spline or similar types of parametric functions to generate control points which define surface patches. See, for example, the techniques described by Newman, William M. and Robert F. Sproul, *Principles of Interactive Computer Graphics* at pp. 309-331 (2d ed. 1979), which is incorporated herein by reference.

Also, in CPU 800, the control points which are derived for each graphic figure are coupled with a code to specifically identify each particular point. This code indicates whether a particular point is a vertex or a Bezier control point and also provides information relative to the order of the points around the graphic figure. For example, each point could be coupled with one of four codes: First, Next, Bezier, or Close. In such case, the points illustrated in FIG. 1A could be encoded as follows: Point 882 could be encoded "First;" point 884 could be encoded "Next" and would follow immediately after point 882 in the data stream; point 886 could also be encoded "Next" and would follow after point 884; point 888 could be encoded "Bezier" and would follow immediately after point 886; point 890 could be encoded "Next" and would follow immediately after point 888; and point 892 could be encoded "Close," indicating that point 892 is the last control point of the graphic figure.

Once the data which has been received from work station 802 has been thus processed by CPU 800, the data representing the control points of each graphic figure or face are stored in a memory device 810. As illustrated in FIG. 1, CPU 800 may advantageously be configured so as to communicate with either of three data buses: a disk bus 804, a pipeline bus 806, or a CPU bus 808. Providing multiple buses from CPU 800 permits the system to function much more rapidly since the system is not totally dependent upon only one data bus.

In order to further enhance the speed of the system, the system may be provided with a plurality of memory devices 810 which are capable of swapping between the various data buses 804, 806, and 808. Thus, data can be either stored or retrieved from memories 810 by means of any of the three data buses. In addition, a disk storage unit 812 may be provided to provide greater system storage capacity, as needed.

Prior to processing the control points through the rest of the system, the user may send various commands from work station 802 to CPU 800 indicating the action to be employed for purposes of changing or animating the illustration. One such command is a command defining the viewing field which is to be employed when generating the illustration. It will be appreciated that by varying the viewing field, the user of the system may both modify the field of view and/or the size of the illustration, as desired.

Figure 1B:
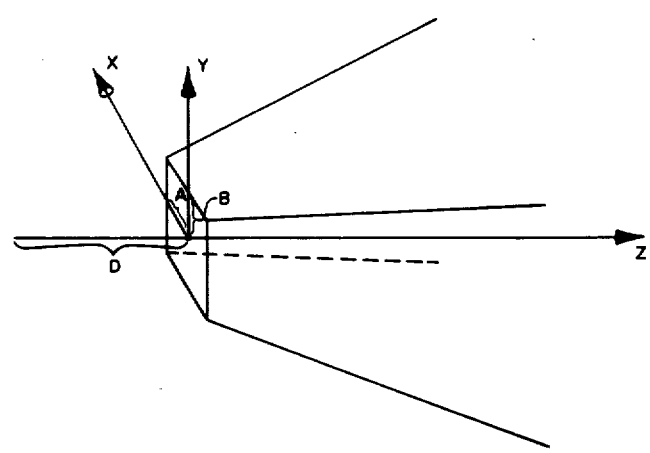
FIG. 1B depicts a typical viewing frustum which is used by the pipeline in processing data points.

A typical viewing field, configured as a frustum, is depicted in FIG. 1B. As shown, the viewing frustum comprises a front plane which lies a distance D from the origin of the coordinate system in a positive direction along the Z axis. This viewing plane is both perpendicular to and centered about the Z axis. The viewing field is also bounded by left and right planes, which intersect the front plane in vertical lines located a distance A from the Z axis, and by upper and lower planes, which intersect the front plane in horizontal lines located a distance B from the Z axis.

Once the appropriate instructions regarding the illustration are provided to pipeline 200 by CPU 800 and the control data points are stored in the appropriate memory device 810, such control data points may be transmitted to pipeline 200 for processing. In pipeline 200, the illustration is positioned and oriented in three-dimensional space by a set of geometric transformations. In addition, by successive transformations of the control data points, the illustration may be animated. Significantly, during such animation, the illustration can be transformed differently for each video frame, giving the appearance of smooth motion. The geometric transformations performed by pipeline 200 include rotation, translation, scaling (i.e., enlarging or diminishing size), and shear (tilt). Other geometric operations performed by pipeline 200 are clipping, perspective, hidden surface rejection, shading, and dynamic curve processing. Further, pipeline 200 performs preliminary phases of the scan conversion process and supplies synchronized graphic color information to the frame buffer 830.

After processing by pipeline 200, the data points are sent in the appropriate sequence into scan converter 820 where the illustration is translated into video scan lines. The data is then passed through frame buffer 830 and video output 840 to a video display unit 850 for display.

General Pipeline Operation

Figure 2:
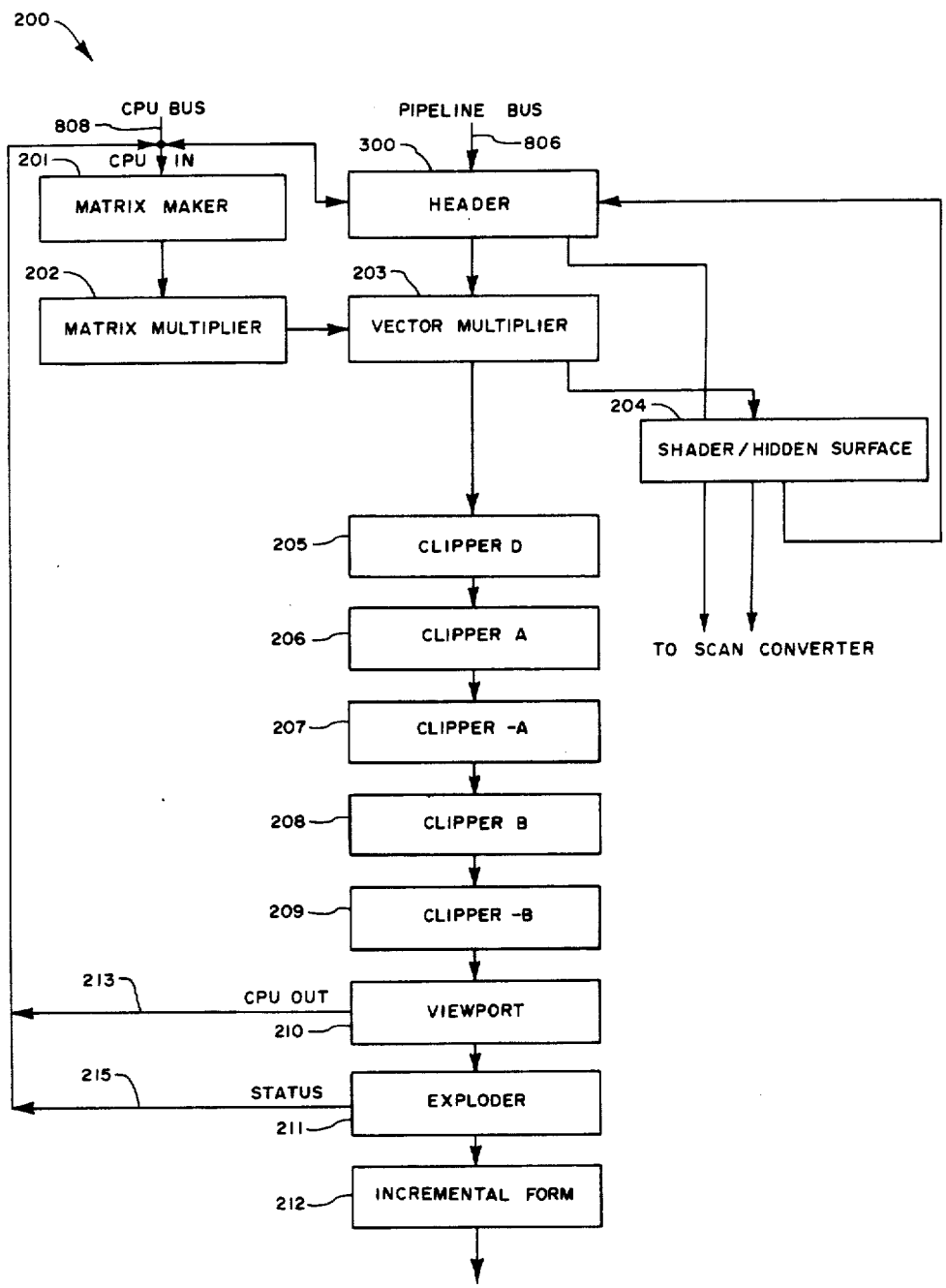
FIG. 2 is a general block diagram of one presently preferred embodiment of the data processing pipeline of the present invention.

A general block diagram of pipeline 200 is shown in FIG. 2. Each box represents one printed circuit card which contains a particular block of hardware controlled by a separate microprocessor, as hereinafter more fully described. Each block of hardware performs a different function. Except as otherwise noted, each card has a FIFO (First-In First-Out) on its primary input to buffer the data flow through pipeline 200 and thereby maximize data throughput. Thus, when a particular card has finished its specialized computing task, the results are delivered asynchronously to the input FIFO of the next pipeline card in line. The card from which data was transferred then looks to its own input FIFO for its next set of instructions.

The data linkages shown in FIG. 2 are those used in the normal (non-diagnostic) pipeline operating modes. Each data linkage between the pipeline cards represents a 16-bit data path and a Command bit, together with two data transfer handshake lines. In addition, although not specifically illustrated in FIG. 2, all pipeline cards are attached to a CPU mini Bus for diagnostic purposes. This allows CPU 800 (see FIG. 1) to test each pipeline card individually by simulating the appropriate pipeline environment for such card.

During normal operation, commands are sent to pipeline 200 through either header card 300 or matrix maker card 201 from the CPU bus 808. Commands targeted for lower cards in pipeline 200 are "passed through" the upper cards until they reach their intended destination. Data is fed to pipeline 200 through header card 300 from a memory 810 (see FIG. 1) which is attached to pipeline bus 806. Below header card 300, command words and data words are interleaved in each data linkage. To provide for effective soft error recovery, the command words are tagged with a Command bit, mentioned above, which prevents the accidental interpretation of a data word as a command.

Additional error protection is provided in pipeline 200 by means of a Bad Frame command. If any card discovers something wrong, it outputs a Bad Frame command to the next card down. The command eventually reaches Scan Converter 820 (see FIG. 1) where it causes a Bad Frame Status bit to be set. This status bit advises CPU 800 that a pipeline crash has occurred; the software of CPU 800 then restarts the frame construction.

The normal processing sequence for transmission through pipeline 200 of control data points representing a particular graphic figure (such as, for example, figure 880 illustrated in FIG. 1A), is as follows:

First, matrix commands are then sent to matrix maker card 201. These commands cause conventional 4×4 transformation matrices to be quickly assembled with hardware sine and cosine lookups in matrix maker card 201. As each matrix is assembled, it is fed to matrix multiplier card 202 where it is concatenated into a current transformation matrix. Matrix multiplier 202 can save and recover the current transformation matrices on a matrix stack which is capable of holding 64 matrices.

Next, a New Matrix command is sent to vector multiplier card 203. This command causes the appropriate current transformation matrix to be downloaded from matrix multiplier card 202 into vector multiplier card 203. This transformation matrix determines the scaling and orientation in space which wll be assumed by the next graphic figures to be processed by pipeline 200.

In addition to the foregoing, when the graphic figures to be processed by pipeline 200 represent the faces of solid 3D objects, a special preprocessing phase also occurs. During this preprocessing phase, a file containing the normal vector of each face is input into pipeline 200 through header card 300. These normal vectors are then transformed by the current transformation matrix in vector multiplier card 203, and the transformed vectors are then diverted to shader card 204.

Shader card 204 examines each transformed normal vector and sets a Face Visible bit to zero if the face is "back-facing." Shader card 204 also compares the normal vectors with a pre-stored lighting source direction in order to compute an appropriate shade fraction for the face. These shade fractions may, for example, be computed based upon a simple "Lambert's Law" lighting model.

After the normal vectors are transformed by shader card 204, the Face Visible bits are then sent back to header card 300. Header card 300 then sends the Face Visible bits back to CPU 800 (see FIG. 1) so that the system software can render the faces correctly with respect to hidden surfaces. Thus, pipeline 200 and scan converter 820 are saved from having to process such invisible faces.

The shade fractions computed by shader card 204 are sent to and stored in scan converter 820. These shade fractions are subsequently used to scale down the brightness of each of the faces to the extent that such faces face away from the pre-stored lighting source direction.

After completion of the above steps, including any needed preprocessing, control data points representing the next graphic figures to be processed by pipeline 200 are transmitted through pipeline bus 806 to header card 300. Each control point is then passed on to vector multiplier card 203 where it is transformed by the current transformation matrix.

After each control point is thus transformed, it is passed on to a series of clippers 205–209 which remove invisible portions of the graphic figure, i.e., those portions of the figure which lie outside the viewing frustum illustrated in FIG. 1B.

The three-dimensional, transformed, clipped control points are then passed to viewport card 210. There, the control points are projected in correct perspective onto a two-dimensional viewing surface (the window) and are then mapped to a desired area on the video monitor (the viewport).

Significantly, up to this point in pipeline 200, any curves have been represented as an ordered list of four encoded Bezier control points per curve, as described above. However, when these four control points are transmitted to exploder card 211, exploder card 211 "explodes" such control points into numerous data points which then define a large number of small straight line segments (edges) with sufficient resolution to approximate each curve in a very smooth fashion, regardless of the size of the viewing screen. Thus, unlike the prior art type systems, the system and method used in the pipeline of the present invention does not process each of the data points used to actually define the straight line segments which approximate a curve, but only those points which serve as the control points. The system and method of this invention thus provide a very powerful type of processing for figures which are composed of curved lines and surfaces, which has heretofore not been available in the art.

Finally, the edges of each graphic figure are passed to incremental form card 212 which recodes them into a format appropriate for scan line conversion. In addition, when pipeline 200 is operating in so-called "Vector Mode," incremental form card 212 converts each edge into a thin rectangle (four edges) such that the graphic figure is rendered on the viewing screen as it would be on a line drawing. Then, the recoded edges are transmitted to scan converter 820.

Importantly, it should be noted that the various cards in pipeline 200 operate independently from one another. Thus, while the control points of one graphic figure are being sent down pipeline 200, matrix maker card 201 and matrix multiplier card 202 can be used to generate the transformation matrix for the next graphic figure. It will be readily appreciated that this architecture greatly increases the processing speed of pipeline 200, and further aids in achieving real time animation.

FIG. 2 also depicts a status line 215 connecting exploder card 211 to CPU Bus 808. The exploder card status line 215 is used during an operation called a "Vector Hit Test." This operation allows a system user to know when he or she is pointing with the stylus of the work station data tablet to a vertex or edge of a particular graphic figure. The "Hit Test" operation is used to select a display of elements for various editing functions.

When illustration complexity increases sufficiently, pipeline 200 can no longer process all the control data points of an illustration rapidly enough to generate real-time animation. However, an animation can still be displayed in real-time if the animation is precompiled. During such precompilation, pipeline 200 operates as usual except that the CPU output 213 of viewport card 210 is used to divert the processed data points to disk 812 (see FIG. 1). Then, after the animation is completely compiled, it may be displayed in real time by transmitting the compiled data to header card 300 using a Direct Scan command. The control data points are then passed through all the cards in pipeline 200 until the data reaches exploder card 211, where the data is again processed normally. The benefit of such compilation is the ability to generate increased real-time animation complexity. The cost of compilation is, of course, the compile time and the required disk storage.

Particular Configuration and Operation of the Various Pipeline Cards

The individual cards in pipeline 200 may have any suitable configuration which is consistent with the general operation of pipeline 200 described above. Those skilled in the art will readily appreciate that the various pipeline cards may have a number of different configurations and may use a wide variety of specific circuit components without departing from the essential characteristics and operation of pipeline 200, as set forth above. Therefore, the following more detailed description of the various pipline cards in pipeline 200 is merely illustrative of one presently preferred embodiment of each of the pipeline cards of pipeline 200.

As illustrated in FIG. 2, pipeline 200 includes 13 individual cards 201–212 and 300. Because the function and method of operation of most of the cards is somewhat similar, it would greatly reduce manufacturing and assembly costs if the various pipeline cards could be configurated identically. Accordingly, twelve of the pipeline cards (cards 201-212) can be configurated with identical printed circuit boards with minor modifications as to which circuit components are used on each printed circuit board. Thus, pipeline cards 201-212 can be manufactured and assembled using a single basic card. Pipeline card 300, on the other hand, is not readily adaptable to the same basic configuration as cards 201-212 and must, therefore, be configurated somewhat differently.

In view of the foregoing, it order to simplify the following discussion, the basic pipeline card will first be described, illustrating the optional circuit components that can be used on the card. Then, each of the pipeline cards in pipeline 200 will be described individually with reference to the basic pipeline card, with appropriate modifications thereto being pointed out.

A. Basic Pipeline Card

Figure 3:
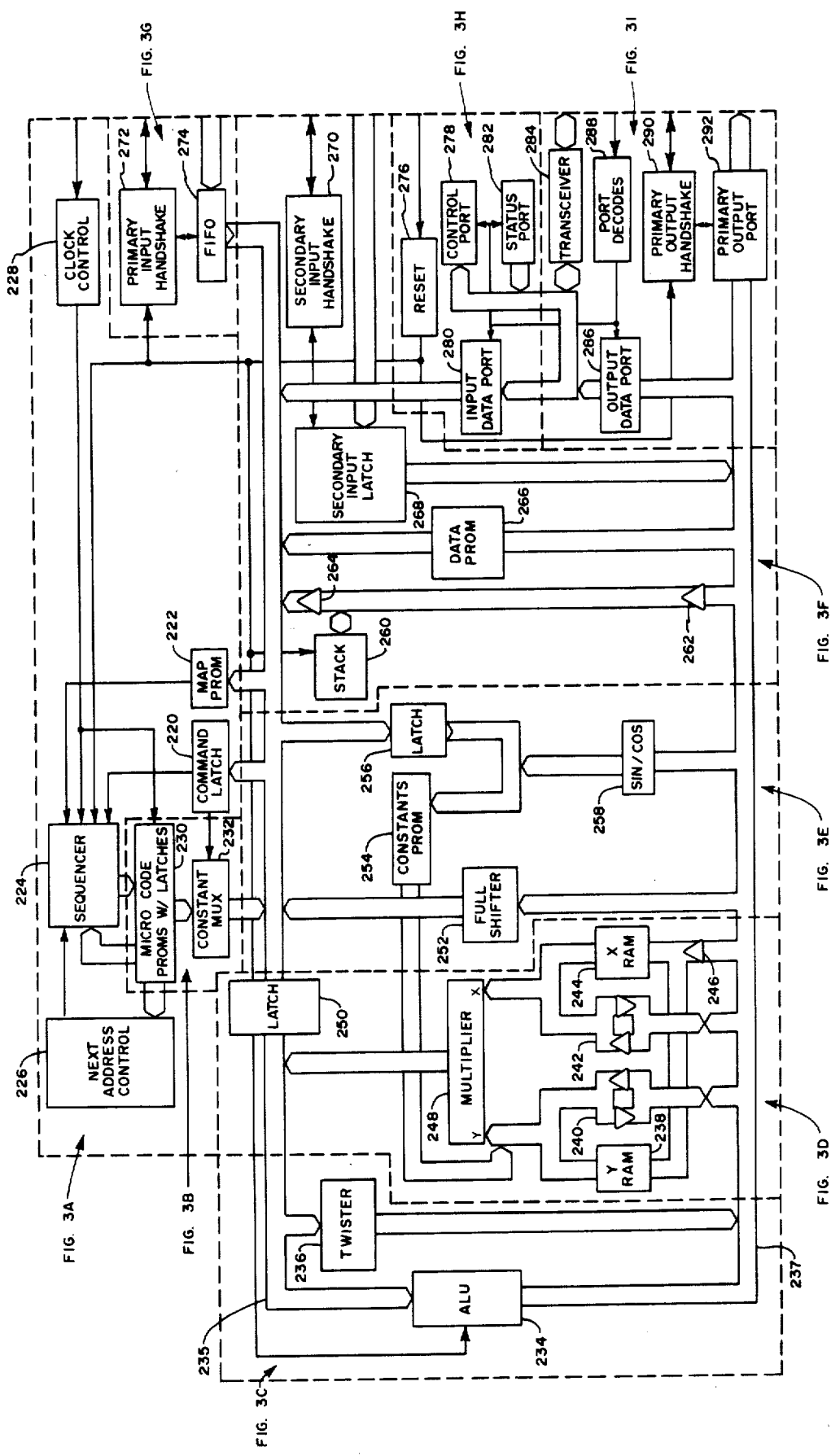
FIG. 3 is a block diagram of the basic pipeline card which is used in the data processing pipeline of the present invention.

The basic pipeline card is illustrated in the general block diagram of FIG. 3. The basic pipeline card is a special purpose, bit slice, micro-programmed processor used in various pipeline positions to perform several high speed data manipulations (such as, for example, rotations, clipping, perspective, and lighting). The basic pipeline card is specifically programmed in each of the several pipeline positions to execute special algorithms designed to generate the desired graphic functions.

Referring now more particularly to FIG. 3, commands are input to the pipeline card on bus 235. Such commands are stored in mapping PROM 222, and a portion of each command may be latched in command latch 220 for routing to various circuit components. Each command is next transmitted to sequencer 224. An illustrative example of the commands used to program PROM 222 is set forth in Appendix P.

Sequencer 224 then communicates with micro-code PROMs and latches 230 in order to interpet the command which has been received. Microcode PROMs 230 then transmit the appropriate information to next address control 226 and sequencer 224 to enable the system to execute the command. In executing the command, sequencer 224 may obtain the next address from either map PROM 222, next address control 226, or microcode PROMs and latches 230.

Microcode PROMs 230 are also used to storage constants which are needed for mathematical computations by the pipeline card. Thus, constant multiplexer 232 is provided in order to transmit such constants, as needed, onto data bus 235. Constant multiplexer 232 is also used to transmit various parameters to other system components.

Each pipeline card receives a clock pulse which is generated elsewhere in the system. However, various operations to be performed on the pipeline cards may require variations in the cycle time of the card. Accordingly, a clock control 228 is provided on the basic pipeline card to allow the card's cycle time to varied, as necessary.

Turning now to the data manipulating components of the basic pipeline card, the basic pipeline card is provided with an arithmetic logic unit (ALU) 234. ALU 234 is the basic processing component of the card, and it regulates the various data calculations and manipulations performed by the card. In general, data bus 235 is used to input data into ALU 234, while data bus 237 is used to transmit data from ALU 234.

Another component of the basic pipeline card is twister 236. Twister 236 is used to twist data from bus 235 to bus 237 by taking bus 235's most significant bit and putting it onto bus 237's least significant bit, with all other bits being similarly inverted (or twisted) from their original position. The specific instances in which twister 236 might be used are discussed below in connection with full shifter 252.

The basic pipeline card also comprises a multiplier 248, having both an X and a Y input. Multiplier 248 is used to perform multiplication on the data transmitted to its respective X and Y inputs.

Various circuit components are provided to transmit the needed data to the appropriate input of multiplier 248. For example, transceivers 240 and 242 are provided to enable the direct transfer of data from data bus 237 to the appropriate input of multiplier 248.

Alternatively, data may be first input through driver 246 into either X RAM 244 or Y RAM 238. Such data may then be driven to the appropriate input of multiplier 248, as needed. For example, X RAM 244 and Y RAM 238 may be used to store matrices to be multiplied by multiplier 248. In addition, the position of transceivers 240 and 242 permits data stored in RAMs 238 and 244 to be driven back to data bus 237, as needed.

Finally, multiplier 248 may also receive data at its Y input from constant PROM 254, as hereinafter more fully explained.

The basic pipeline card may also include an in-line transparent latch 250. In some cases, it may be found that the set-up time of ALU 234 requires that data be latched on data bus 235. However, if it is found that the set-up time for ALU 234 is sufficiently short, latch 250 may not be needed.

The basic pipeline card also includes a full shifter 252. Full shifter 252 is used to shift data a given number of bits to either the right or the left. Thus, data input to full shifter 252 by data bus 237 may be shifted to the left four bits, with the shifted output being transmitted to data bus 235.

Typically, a shifter circuit may shift data to either the left or the right. Thus, in order to increase the versatility of such a shifter, the shifter may be used in conjunction with twister 236. Assuming, therefore, that shifter 252 is capable of shifting data only to the left, a right shift may be accomplished in the following manner. Data is first twisted from data bus 235 through twister 236 onto data bus 237. The data is then shifted to the left the required number of bits. The output of shifter 252 is then against twisted in twister 236. The final output from twister 236 is the same as if a right shift had been performed.

The basic pipeline card further comprises a constants PROM 254. Constants PROM 254 is used to compute sines and cosines and to do divisions, using a look-up method. Addresses may be input to constants PROM 254 from either data bus 235 through latch 256 or from data bus 237 through sine/cosine input 258. An illustrative example of the division and sine/cosine constants which are programmed into constants PROM 254 is set forth in Appendix Q hereto.

The result of the sine/cosine or divide look-up is then transmitted from constants PROM 254 to the Y input of multiplier 248. Such data may then be used by multiplier 248 in a required computation or, alternatively, the data may be driven to data bus 237 through transceiver 240.

In addition, the basic pipeline card also includes a stack 260. Data is written into the stack 260 from bus 237 through driver 262. Data may then be read from stack 260 through driver 264 onto data bus 235.

Also, as depicted in FIG. 3, the basic pipeline card includes a data PROM 266. Data PROM 266 may be used, for example, to store constants used in various card operations. An illustrative example of the constants which are stored in data PROM 266 is set forth in Appendix R.

The various inputs and outputs to the basic pipeline card are as follows. The primary input comprises a first-in first-out (FIFO) 274. By using FIFO 274 as a primary input, several commands or parameters may be sequentially transmitted to the basic pipeline card while the pipeline card completes a lengthy operation. Thus, data flow through the pipeline card is maximized. A primary input handshake 272 is also provided to assure that data is not transmitted to the basic pipline card through FIFO 274 until FIFO 274 is ready for the data.

The basic pipeline card further includes a secondary input latch 268. When a secondary input to the card is needed, data may be transmitted to the secondary input latch 268 and thereafter transmitted to data bus 273. A secondary input handshake 270 is also provided to assure that data is not transmitted to secondary input latch 268 until latch 268 is ready for data.

In addition to the primary and secondary inputs, the basic pipeline card can also receive data from CPU 800 (see FIG. 1). This is accomplished in the following manner. First, the CPU sends an address to port decodes 288. If the address received is the correct address for the particular card, the basic pipeline card will then receive data or commands from CPU 800 through transceiver 284.

When transmitting to the basic pipeline card, the CPU first indicates whether the information being transferred is a parameter or a command by manipulating a command bit in control port 278. The information may then be transmitted to data bus 235 through input data port 280. CPU 800 may also transmit a command to control port 278 which causes the basic pipeline card to be initialized or reset.

CPU 800 may also receive data from the basic pipeline card through transceiver 284. First, CPU 800 may read various bits at status port 282 to determine the status of certain operations and functions of the basic pipeline card. In addition, data may be transmitted to CPU 800 from data bus 237 through output data port 268 and transceiver 284.

As shown, the basic pipeline card also includes a primary output 292. This is the principal output used to transmit data between cards in pipeline 200 (see FIG. 2). A primary output handshake 290 is also provided to assure that data is not transmitted to another card in the pipeline until that card is ready for data.

Finally, the basic pipeline card is also provided with a reset circuit 276. In response to various signals from the system, reset 276 causes the basic pipeline card to be initialized by resetting various circuit components and parameters.

Reference is next made to FIGS. 3A-3I, which illustrate in more detail one preferred embodiment of a detailed electrical schematic diagram derived from the block diagram of FIG. 3. Those of ordinary skill in the art will, of course, appreciate that various modifications to the detailed schematic diagrams of FIGS. 3A-3I may be easily made without departing from the essential characteristics of the invention. Thus, the following description of the detailed schematic diagrams of FIGS. 3A-3I is intended only as an example, and simply illustrates one presently preferred embodiment. The various circuit stages corresponding to each of the functional blocks of FIG. 3 are outlined in FIGS. 3A-3I by bold, dashed lines and are numbered with like numerals.

Schematic diagrams 3A-3I are related to one another by means of the various connection points 1-130 located along the sides of each figure. In considering the detailed schematic diagrams of FIGS. 3A-3I, therefore, connection points having like numerals should be considered as being electrically connected so as to provide for data transfer between the circuit components illustrated in the several Figures.

In addition, throughout FIGS. 3A-3I, integrated circuits are represented by a numeral preceded by the letter "U." Resistors and capacitors are designated by numerals preceded by the letters "R" and "C," respectively. Various test points on the schematic diagrams are designated by numerals preceded by the letters "TP." Also, switches are designated by numerals preceded by the letter "S," and indicators are designated by numerals preceded by the letters "DS."

The specific circuit components which are used in accordance with this preferred embodiment of the basic pipeline card are identified in Table 1 below. Those skilled in the art will, however, readily appreciate that a wide variety of different specific circuit components would also produce acceptable results.

Figure 3A:
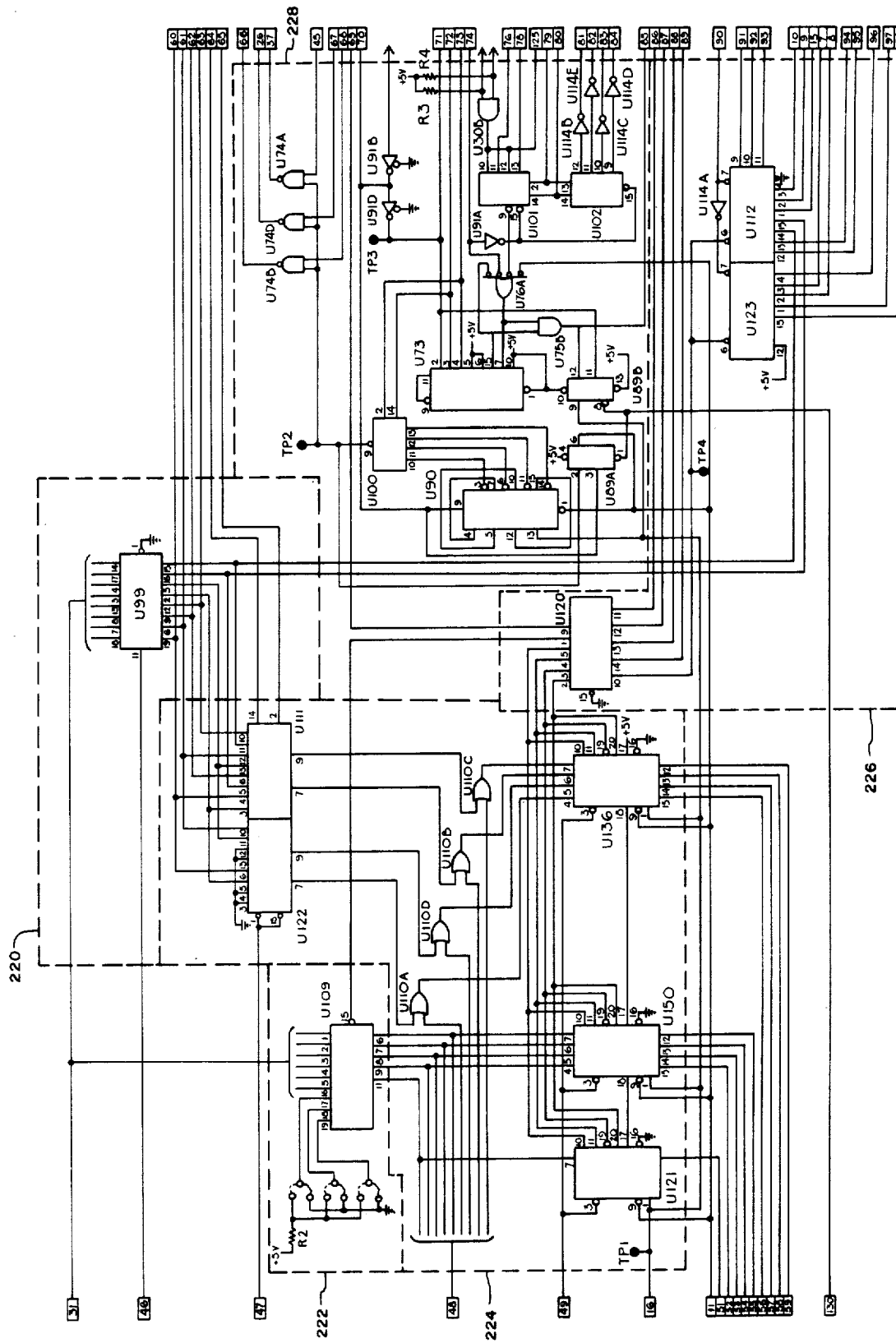

Referring now to FIGS. 3 and 3A, commands are driven on bus 235 to Mapping Prom 222 (U109) and associated circuitry. The lower 8-bits of the command are latched by command latch 220 (U99) to be routed several places, with two bits being sent to condition multiplexers U112 and U123, which are described in more detail below.

Sequencer 224 comprises integrated circuit ("IC") sequencers U121, U150, and U136. In addition, sequencer 224 includes IC multiplexers U122 and U111 and OR gates U110A-D which allow modification of the address received by sequencers U121, U150, and U136 depending upon the particular command being executed or depending upon the fields in such command. As shown, there are four bit combinations which may be used to modify the address.

Next address control 226 comprises a PROM U120. Four bits, along with a possible control bit, are sent to PROM U120. The output of PROM U120 controls selection of the next source of address: two bits control the stack of sequencers U121, U150, and U136; and two bits control whether the next address is received from the next address lines of the microcode PROMs 230 or from Mapping PROM U109 or from the internal sequencer stack, microprogram counter or holding register. In addition, next address control 226 includes condition multiplexers U123 and U112 to input test conditions to sequencers U121, U150, and U136. An example of the data programmed into PROM 120 of next address control 226 is set forth in Appendix S.

Finally, FIG. 3A illustrates the interval clock control circuit 228 of the basic pipeline card. The cycle time of the basic pipeline card is normally 100 nanoseconds. However, there are some operations which take longer. For example, the cycle time for multiplier 248 is 140 nanoseconds. Therefore, in order to lengthen the cycle time as needed, counter U73 of clock control 228 is provided with two bits fed back from Microcode PROMs 230 to allow selection of one of four card cycle times: 100, 150, 200 or 250 nanoseconds.

Clock control 228 also provides for stopping the clock to the card in certain circumstances. As discussed above, the basic pipeline card receives commands from either the CPU or the Pipeline buses. The microcode programming on the pipeline card then tells the card what to do with the command which has been received. The clock control circuitry illustrated in FIG. 3A is set up so when a command input is anticipated, the clock will stop after 100 nanoseconds and wait until a condition bit is set, signifying that the command is ready for input. When the command is ready, clock control 228 starts the cycle clock again. The card clock is also stopped when anticipating a data input to the card's primary or secondary input. However, on the CPU interface, if data input is not available, the card software will loop back until the data is available instead of stopping the cycle clock.

The clock control operation is generally the same for the card outputs. After the card performs one command and computes the values needed, it sends the output to the next pipeline card. However, if then next card is not ready for the data to be loaded, clock control 228 will stop the cycle clock until data output can be completed.

Clock circuit 228 also generates Write pulses for stack 260 and the X and Y RAMs 244 and 238. Importantly, if a Write pulse is being generated by more than one device at the same time, and an instruction stops the clock when a condition isn't met, all Write pulses will finish and not be delayed by clock stoppage.

Figure 3B:
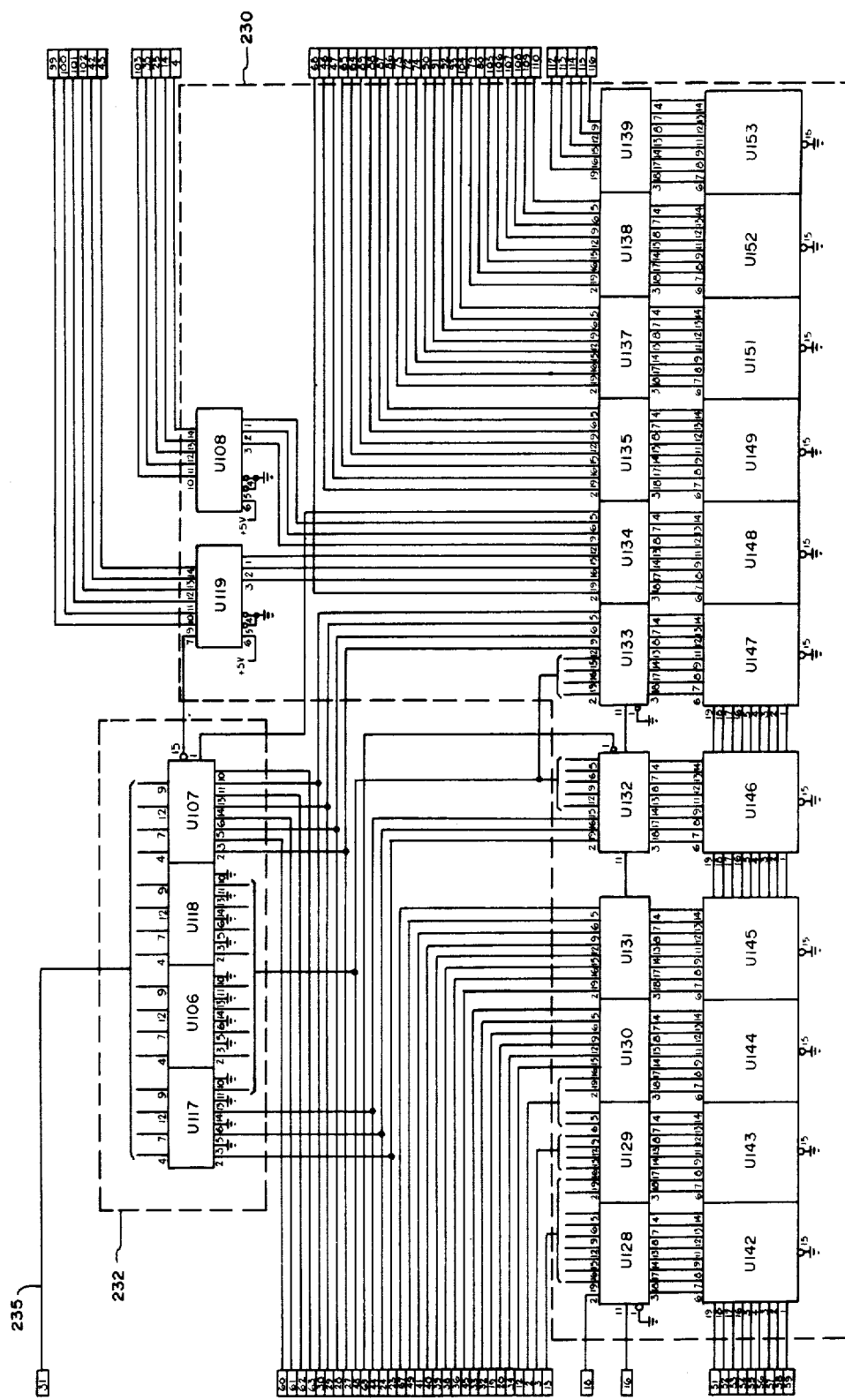

With reference to FIGS. 3 and 3B, microcode PROMs and latches 230 comprise PROMs U142-U149 and U151-U153 and the associated latches U128-135 and U137-139. The latches are all tied output enabled except for U132, which is the next address latch. Since the next address may come from the mapping PROM 222 instead of PROMs U142-U149 and U151-U153, one or the other latch is enabled, but not both.

As further illustrated in FIG. 3B, constant multiplexer 232 comprises multiplexers U117, U106, U118 and U107. Sixteen bits from PROMs U142-U149 and U151-U153 may be entered through the multiplexers and put onto bus 235. All of these bits are dual usage (that is, they are normally used for something else), but the bits can be used to bring a constant onto bus 235, if needed.

The remaining decoders U119 and U108 shown in FIG. 3B are used to determine what drives buses 235 and 237 (under control of the microbits). Thus, more than one device is prevented from driving a bus at any given time.

Figure 3C:
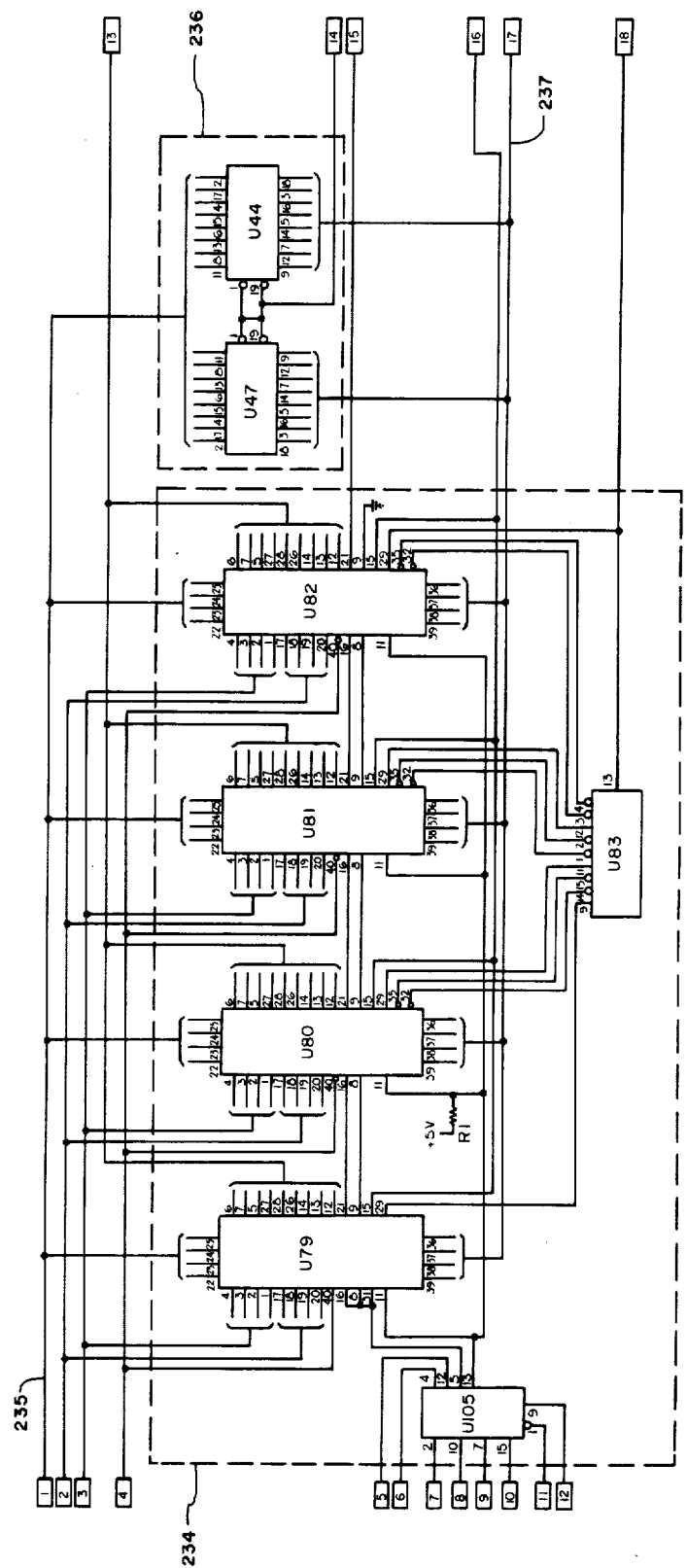

Referring now to FIG. 3C, ALU 234 comprises bit-slice processors U79-U82. ALU 234 also includes a Look-Ahead Carry Generator U83 connected to all four slices.

Two condition bits are used from ALU 234; zero (0) and negative (−). These two condition bits are latched in latch U105 because of the time required to get the result out of ALU 234 and sense it through condition multiplexers U112 and U123 (see FIG. 3A). The bits are latched on a 100 nanosecond cycle and a second 150 nanosecond cycle is used for sensing. On the same sense cycle, the processor continues with a normal path or the path most likely to be correct and starts that operation while the bits are checked. If the condition turns out to be wrong, the path is switched and no time will be lost. If the path chosen is the correct path, the card will be one cycle into the computation required and will not have lost any time when the condition is matched.

Two other condition bits are latched on the basic pipeline card, the Input Data Port Ready with Data and Output Data Port Ready for Data. Actually, these are bits in status port 282, but they are sensed by latch U105 because they have to be input to condition multiplexers for convenience in communicating with the CPU 800 (see FIG. 1). These bits are entered into latch U105 in order to synchronize them with the card clock cycle.

Another circuit shown in FIG. 3C is twister 236 (comprising U44 and U47). As explained above, twister 236 is used to twist data from bus 235 to bus 237; and it cooperates with shifter 252 to produce a right shift.

Figure 3D:
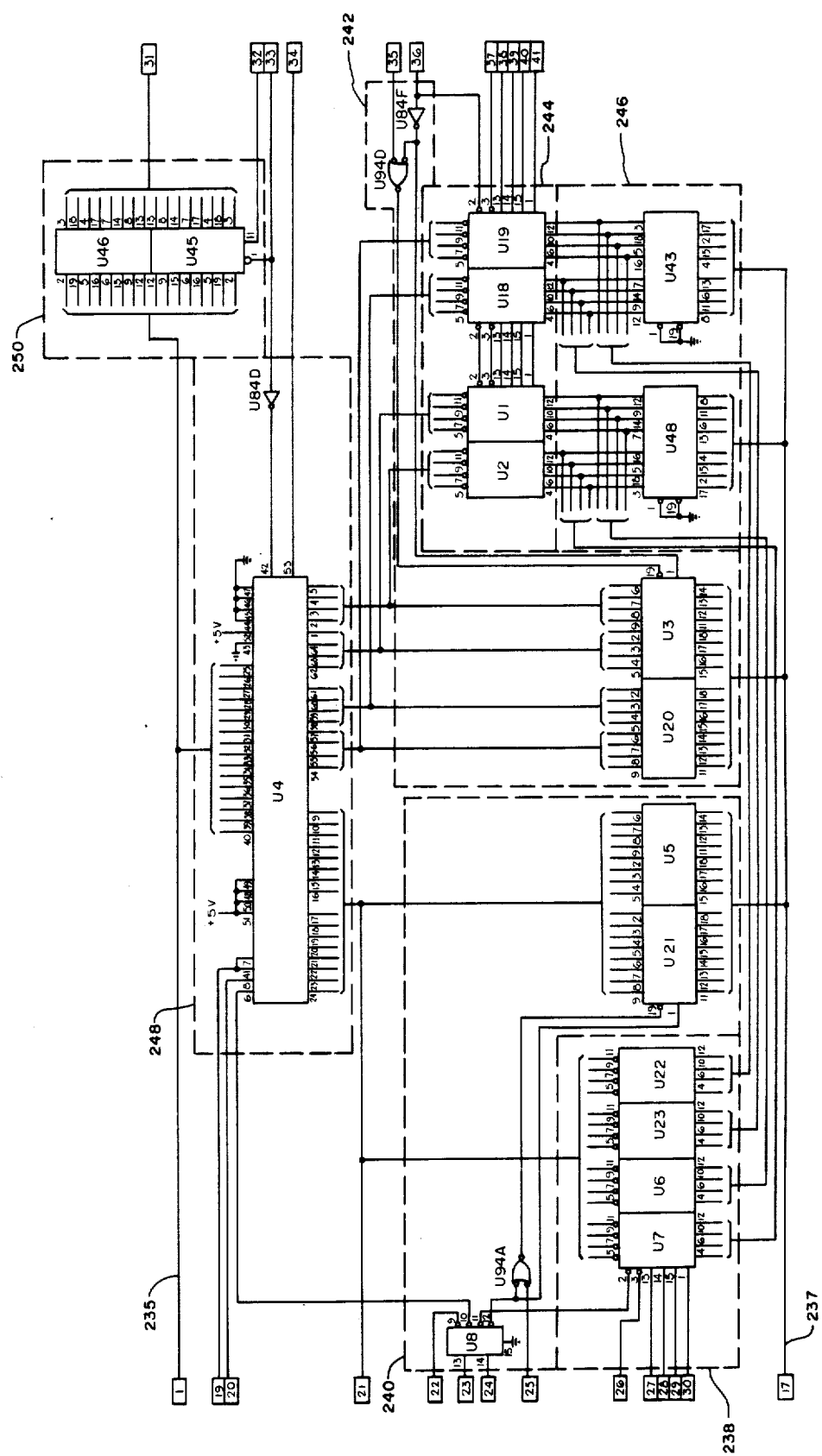

Referring now to FIGS. 3 and 3D, multiplexer 248 (U4) performs a functional 2's complement 16×16 bit multiply with a 32-bit result, output as two 16-bit data words. The most-significant data word is output to bus 235. Such word is output in the form of a sign bit and a fractional 2's complement number.

The inputs to multiplexer 248, designated inputs X and Y (see FIG. 3), are each connected to a 16×16 scratchpad RAM. Y RAM 238 comprises RAMs U7, U6, U23, and U22; X RAM 244 comprises RAMs U2, U1, U18 and U19. In addition, transceivers 240 and 242 comprise transceivers U21 & U5 and U20 & U3, respectively.

There is only one pipeline card in the system which will have both X RAM 238 and Y RAM 244: matrix multiplier card 202. The use of both RAMs allows storage of the current transformation matrix in one RAM and the new matrix to be concatenated in the other RAM, thereby decreasing the cycle time for input of the two values to multiplier 248. Thus, the multiplicands for the X and Y inputs to multiplier 248 are taken simultaneously out of their respective RAMs, and loaded and multiplied in sequential clock cycles.

In order to load constants into either X RAM 244 or Y RAM 238 from bus 237, there is only one inverting driver 246 (comprising drivers U48 and U43). Drivers U48 and U43 are octal inverters and are used on the inputs of the scratchpad RAM's in order to compensate for the RAM chips, which inherently invert their output.

In-line latch 250 (comprising transparent latches U45 and U46) is also depicted in FIG. 3D. This latch is required because of the 51 nanosecond setup time of ALU 234. In most cases, a cycle time of 100 nanoseconds would give only 49 nanoseconds to get the result onto bus 235 to meet the ALU 234 setup time. In many cases, this is not practical. Hence, transparent latches U45 and U46 are inserted in bus 235 at this point. Data may, however, be driven through latches U45 and U46 in "Transparent Mode" if the setup time is adequate. If the setup time is inadequate, however, the data can be latched at the end of the 100 nanosecond cycle, thereby allowing the hardware to perform some other task. On the next cycle, the data is brought from latches U45 and U46 into ALU 234. Since bus 235 has only two devices driving it on the left side of transparent latch 250 (either latch 250 or multiplier 248), only one microbit and an inverter U84D are used for control so as to allow only one device to drive bus 235 at a time.

Figure 3E:
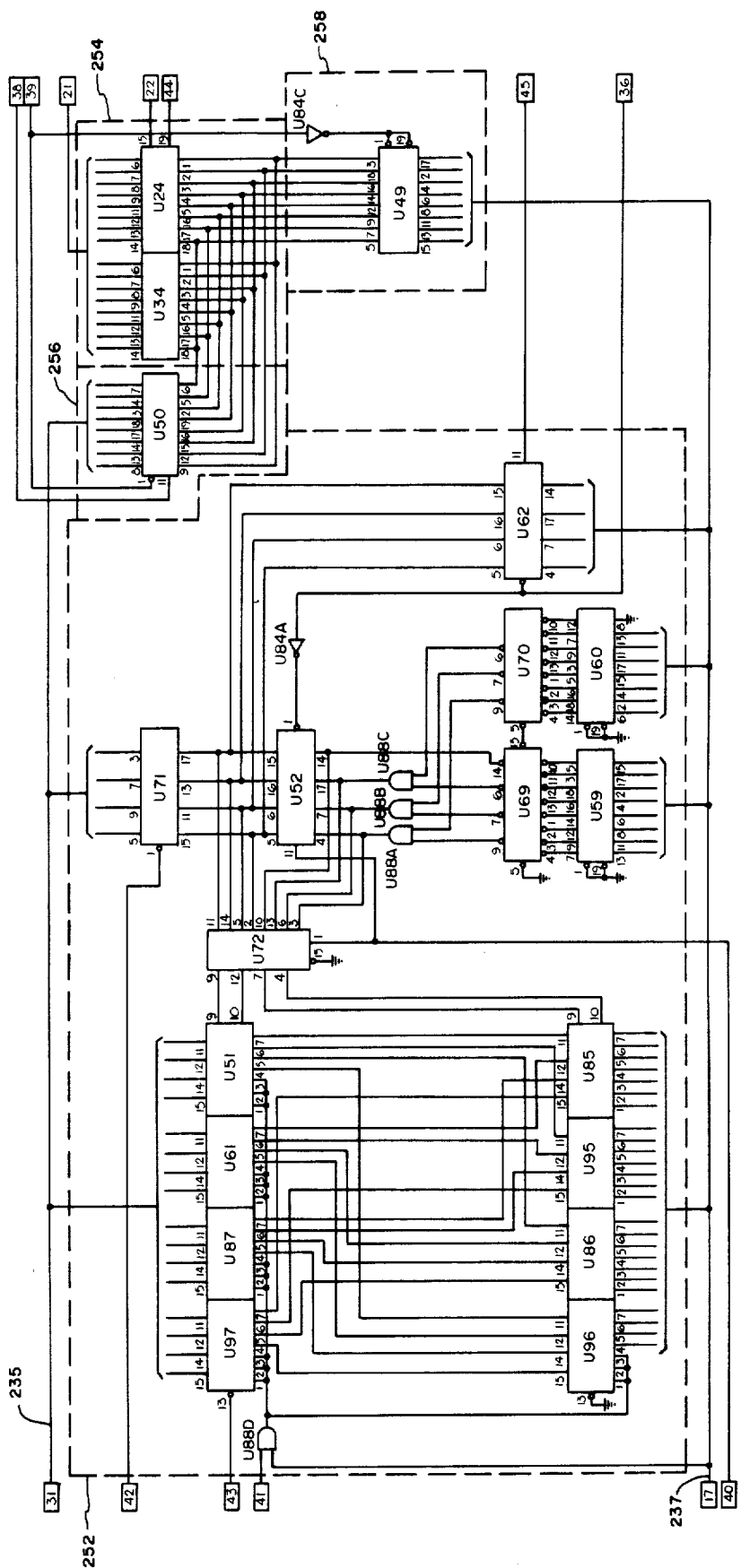

Shifter 252 is illustrated in FIG. 3E. With reference to FIGS. 3 and 3E, shifter 252 comprises IC's U97, U87, U61, U51, U96, U86, U95, and U85 and is configurated as a barrel shifter for left-shifting up to 16 places in one clock cycle. Priority encoders U69 and U70, together with inverters U59 and U60 are used to determine the correct amount of shift so as to put the output in the form 01XXXXXXXXXXXXXX. The encoded information is then put into the shifter so the data can be shifted by the proper amount. Latch U52 allows capture of the encoded shift information and multiplexer U72 dictates the choice of either a new shift encode or an arbitrary amount of shift latched into latch U62. The amount of shift from either of these latches can also be driven back onto bus 235 for input to ALU 234, if needed.

When shifting left, zero-fill is used. That is, instead of rotating the bits, the vacated bits are filled with zeros. For a right shift, there may be some cases for using a sign-fill instead of zero-fill. This function is controlled by a sine microbit which is attached to AND gate U88D.

FIG. 3E also illustrates PROM 254, latch 256, and sine/cosine input 258. As shown, PROM 254 comprises PROMs U34 and U24, latch 256 comprises latch U50 and sine/cosine input 258 comprises driver U49. In addition, an inverter U84C is provided to insure that both latch U50 and driver U49 cannot drive PROMs U34 and U24 at the same time.

Figure 3F:
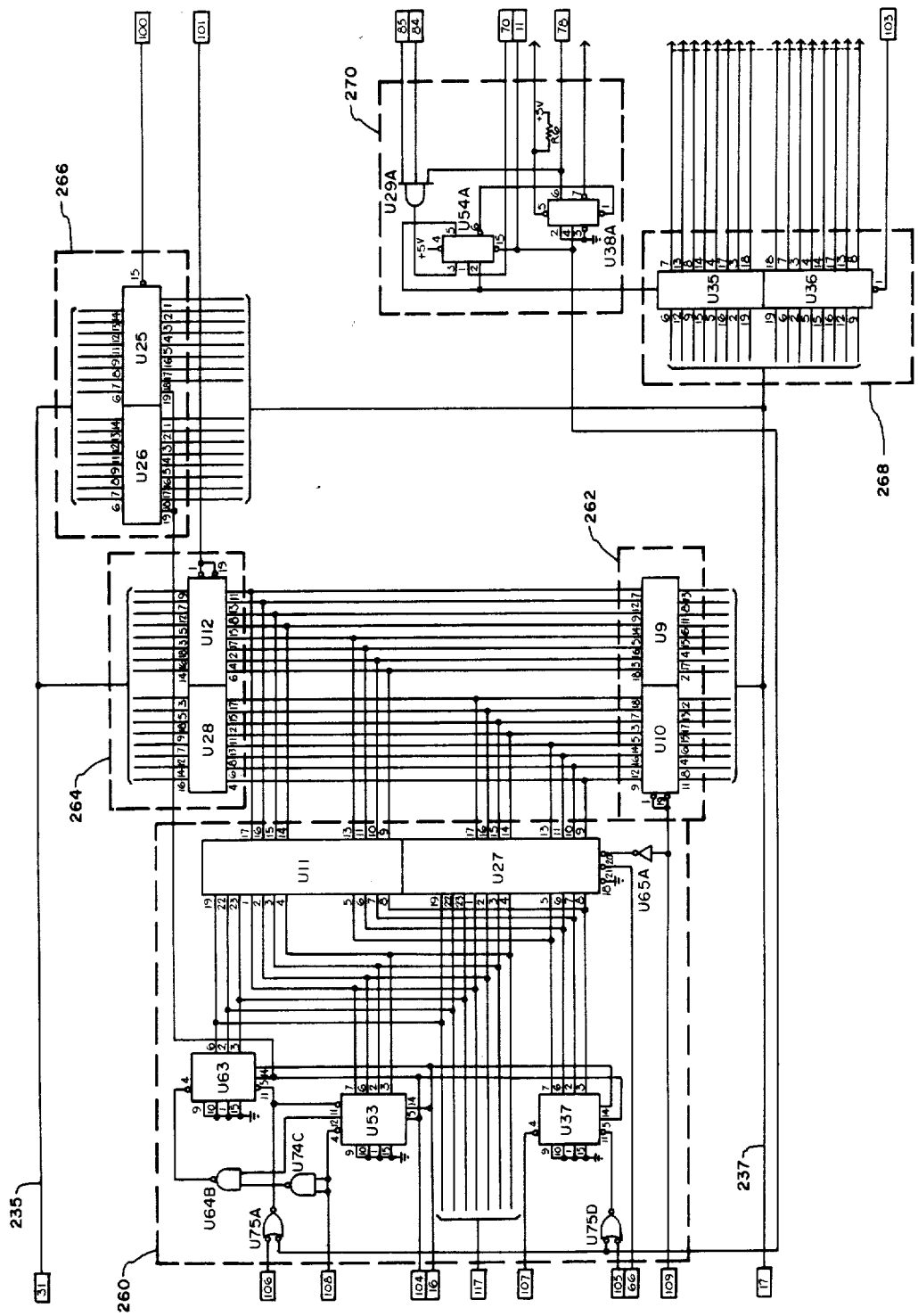

FIG. 3F illustrates the configuration of stack 260. Referring to FIGS. 3 and 3F, stack 260 comprises stack IC's U11 and U27. Stack pointer counters U63, U53 and U37 are arranged in two separate sections. One, U37, is a stack pointer. The others, U53 and U63, comprise a frame pointer which is chosen to make a 16-word frame. Every time a complete frame is stored, the frame counter (U53 and U63) will increment to the next frame. Data is written to the stack from bus 237 through drivers U10 and U9; and data is read out from the stack on bus 235 through drivers U28 and U12.

As further depicted in FIG. 3F, data PROM 266 comprises PROMs U26 and U25. PROMs U26 and U25 are used to store data associated with the operation of incremental form card 212, which is described in more detail below.

FIG. 3F also illustrates the single-register secondary input latch 268 and the associated handshake 270. Handshake 270 signals when the input is ready for data or when there is new data available for the input. Handshake 270 strobes data between pipeline cards such that new data cannot be input before the old data has been removed from latches U35 and U36.

Figure 3G:
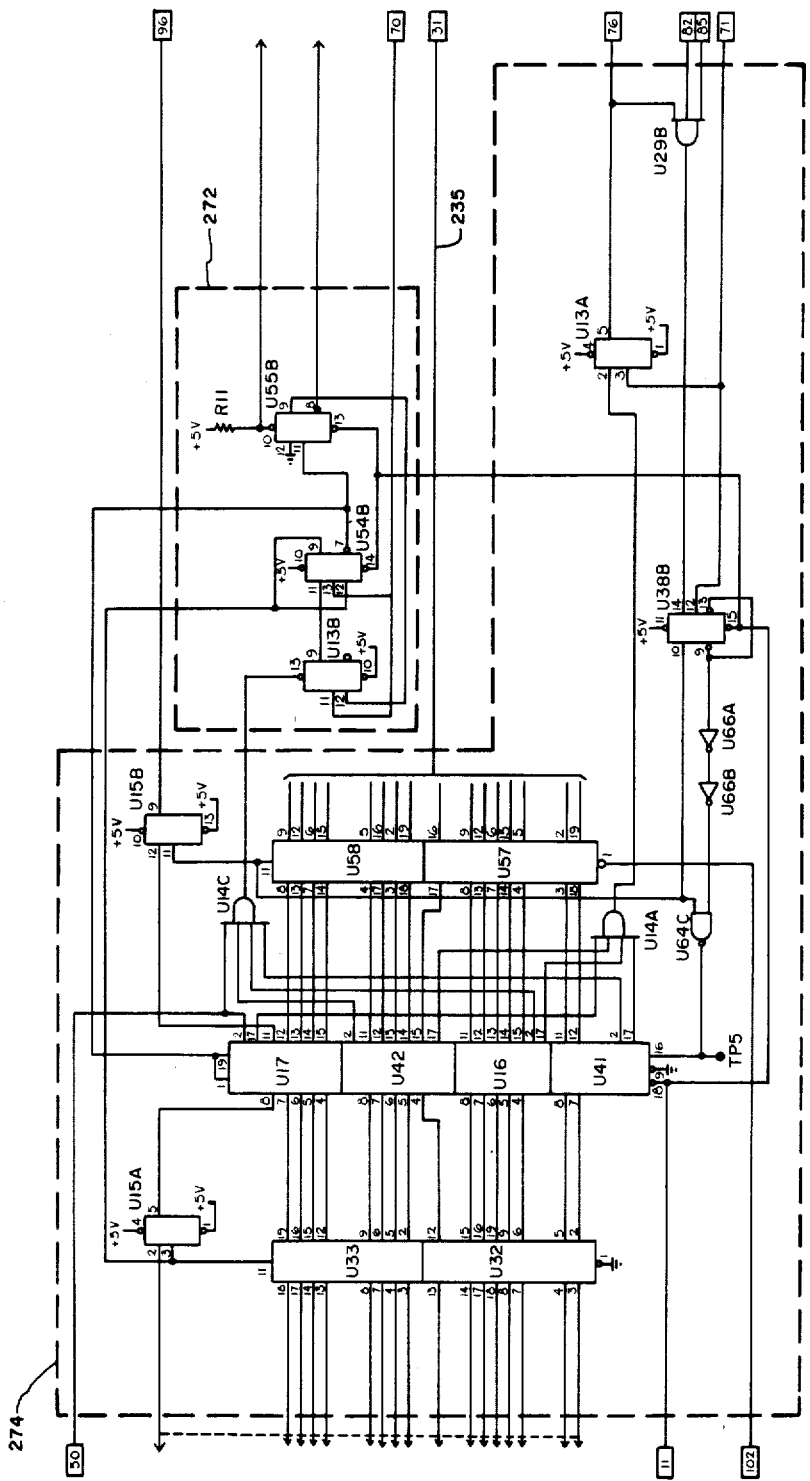

Reference is now made to FIGS. 3 and 3G which illustrate primary input FIFO 274 and its associated handshake 272. Primary input 274 comprises a 16-word FIFO (U17, U42, U16 and U41). For the 17-bit data structure, described above, each chip is 16 words deep by 5 bits wide. The input data hold time for the FIFO is 70 nanoseconds so input data latches U33 and U32 are required to meet the hold time and allow full speed operation. Latches U33 and U32 and the input to the FIFO are clocked by an input state machine, as shown.

Output latches U58 and U57 are also provided, and they allow output as fast as possible from the FIFO with a data output access time of 75 nanoseconds. The stable data at the FIFO output is strobed into output latches U58 and U57, and the same strobe is used to strobe the FIFO output clock for a 100 nanosecond cycle. As shown, a state machine (handshake circuit) is used for both FIFO input and output.

Figure 3H:
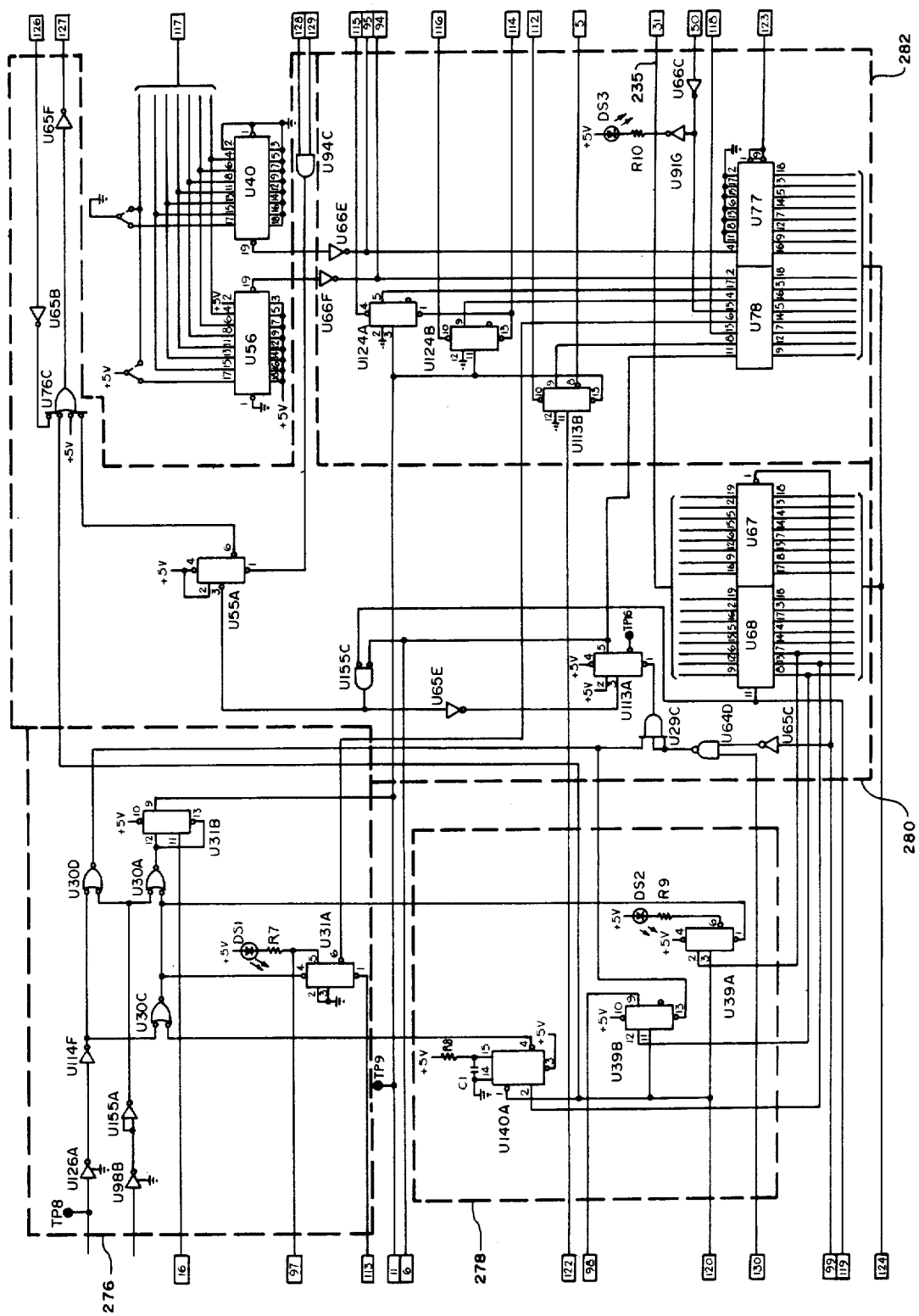
Figure 31:
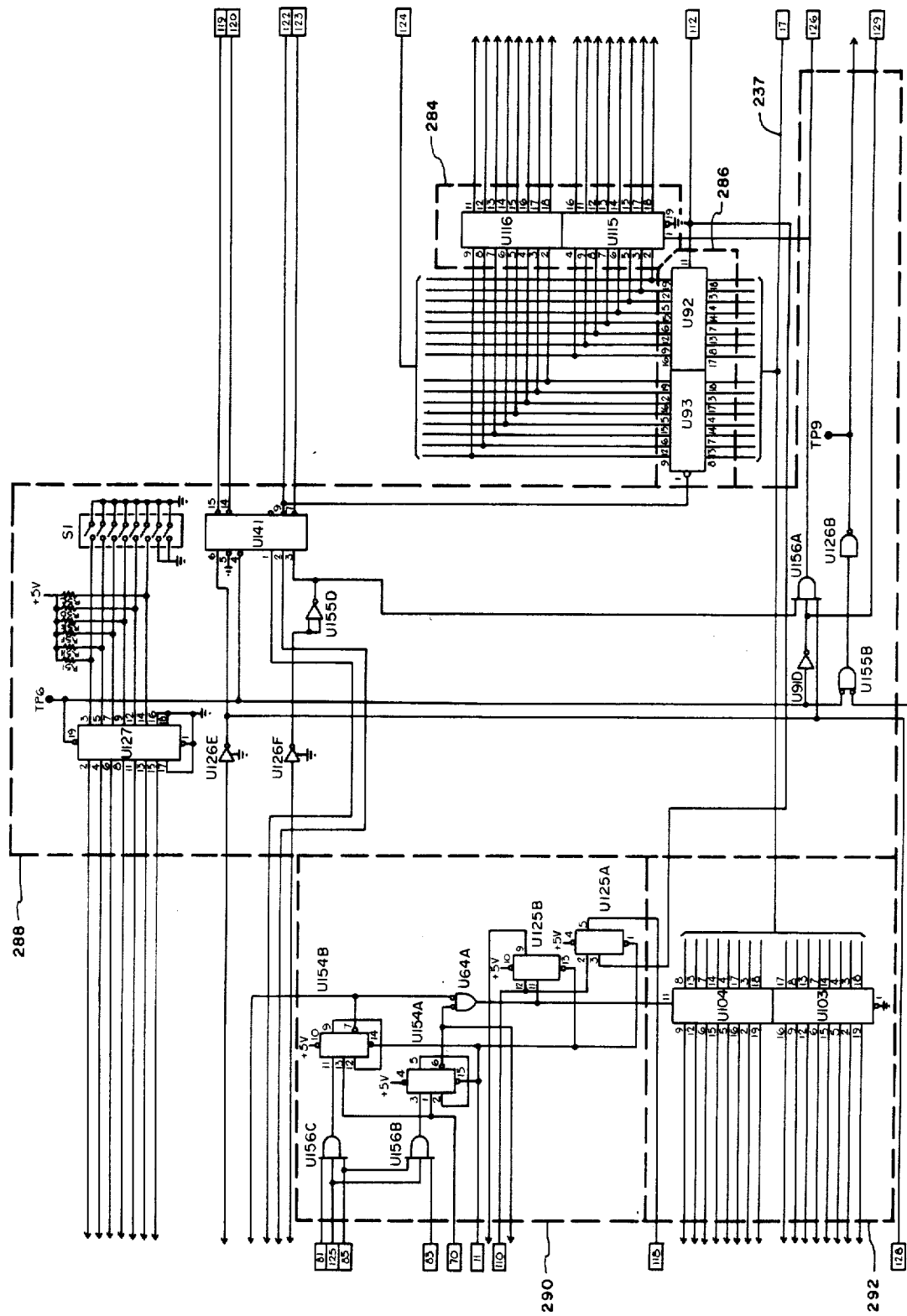

Referring now to FIGS. 3 and 3H, control port 278 is illustrated. CPU 800 (see FIG. 1) writes control information into control port 278. Such information comprises three control bits: one is a reset bit; the second is a command bit (the 17th bit line of the data bus which differentiates between commands and parameters); and the third is used by CPU 800 to turn on LED DS2.

There are three LEDs on the basic pipeline card, two green and one red. One green LED DS1 is turned on by the card when the Power-on Confidence Test is passed. That is, LED DS1 is lit after the card successfully executes a number of routine integrity tests. LED DS2 is turned on by CPU 800 after all pipeline cards are tested for successful completion of the integrity tests. A third LED (DS3) is turned on by the card when input FIFO 274 is full. Thus, LED DS3 indicates the card is backing up the pipeline and the previous pipeline card is holding its output data waiting for storage.

FIG. 3H also depicts status port 282, which comprises IC's U78 and U77. Stack sensors U56 and U40 are used in connection with status port 282 to determine whether stack 260 is either full or empty. CPU 800 reads status port 282 to determine the status of various card functions.

The card reset circuit 276 is also depicted in FIG. 3H. There are three types of card resets: power-up reset; control port reset (from CPU 800); and pipeline initiate. Receipt of these signals by reset circuit 276 will cause various card components and functions to be initialized and/or tested. In addition, reset flip-flop U31A also serves to provide status data to CPU 800 on whether the Power-on Confidence Test, mentioned above, was passed.

Finally, FIG. 3H also illustrates input data port 280. As shown, input data port 280 comprises latches U68 and U67, together with associated control components.

Normally, the pipeline cards only look for input from primary input 274. Thus, if data is to be sent to the card from CPU 800, CPU 800 must first send a command to the pipeline card input port. Such command allows selection of a source of commands for the card to execute, whether normal (from primary input 274) or CPU. The same command can direct the card output to either primary output 292 or to the CPU output (transceiver 284). The card will stay in the selected input or output mode until it receives a new command from CPU 800.

FIGS. 3 and 3I show the pipeline card address decode circuit 288. Each card has a separate address. When CPU 800 addresses the card, a DTACK signal 289 is returned to acknowledge receipt of the address.

CPU bus transceiver 284 comprises transceivers U116 and U115. Such transceivers are used to control data driven on or off of the card from CPU bus 808. The direction of data flow is controlled by the ANDing together to three signals by U156A: Address Decode, Read/Write, and Upper Data Strobe. The normal direction of flow is from the CPU bus to the card.

Primary output port 292 and CPU output data port 286 are also depicted in FIG. 3I. These output ports comprise latches U104 & U103 and U93 & U92, respectively.

Referring to Table 1 below, the various integrated circuits, resistors, and capacitors used in the schematic illustrations of FIGS. 3A-3I are set forth. The components are identified by the same numbers used in the Figures. Resistors are ¼ watt resistors and resistance is stated in ohms. Capacitance is stated in picofarads.

TABLE 1

| Circuit Components of the Basic Pipeline Card | |
|---|---|
| Integrated Circuits | |
| No. | Type |
| U1 | 74F189 |
| U2 | 74F189 |
| U3 | 74LS245 |
| U4 | MPY-16HJ |
| U5 | 74LS245 |
| U6 | 74F189 |
| U7 | 74F189 |
| U8 | 74F139 |
| U9 | 74F244 |
| U10 | 74F244 |
| U11 | 4801A-90 |
| U12 | 74F244 |
| U13 | 74F74 |
| U14 | 74LS21 |
| U15 | 74F74 |
| U16 | 74S225 |
| U17 | 74S225 |
| U18 | 74F189 |
| U19 | 74F189 |

TABLE 1-continued
Circuit Components of the Basic Pipeline Card

| | |
|---|---|
| U20 | 74LS245 |
| U21 | 74LS245 |
| U22 | 74F189 |
| U23 | 74F189 |
| U24 | 27S29 |
| U25 | 27S29 |
| U26 | 27S29 |
| U27 | 4801A-90 |
| U28 | 74F244 |
| U29 | 74F11 |
| U30 | 74F08 |
| U31 | 74F74 |
| U32 | 74F374 |
| U33 | 74F374 |
| U34 | 27S29 |
| U35 | 74F374 |
| U36 | 74F374 |
| U37 | 74F191 |
| U38 | 74F109 |
| U39 | 74F74 |
| U40 | 74F521 |
| U41 | 74S225 |
| U42 | 74S225 |
| U43 | 74F240 |
| U44 | 74F244 |
| U45 | 74F373 |
| U46 | 74F373 |
| U47 | 74F244 |
| U48 | 74F240 |
| U49 | 74F244 |
| U50 | 74F374 |
| U51 | 74F350 |
| U52 | 74F373 |
| U53 | 74F191 |
| U54 | 74S112 |
| U55 | 74F74 |
| U56 | 74F521 |
| U57 | 74F374 |
| U58 | 74F374 |
| U59 | 74F240 |
| U60 | 74F240 |
| U61 | 74F350 |
| U62 | 74F374 |
| U63 | 74F191 |
| U64 | 74F00 |
| U65 | 74F04 |
| U66 | 74LS04 |
| U67 | 74F374 |
| U68 | 74F374 |
| U69 | 74148 |
| U70 | 74148 |
| U71 | 74F244 |
| U72 | 74F257 |
| U73 | 74S163 |
| U74 | 74F00 |
| U75 | 74F08 |
| U76 | 74F20 |
| U77 | 74F244 |
| U78 | 74F244 |
| U79 | 2901B |
| U80 | 2901B |
| U81 | 2901B |
| U82 | 2901B |
| U83 | 74F182 |
| U84 | 74F04 |
| U85 | 74F350 |
| U86 | 74F350 |
| U87 | 74F350 |
| U88 | 74F08 |
| U89 | 74F74 |
| U90 | 74F175 |
| U91 | 74S240 |
| U92 | 74F374 |
| U93 | 74F374 |
| U94 | 74F08 |
| U95 | 74F350 |
| U96 | 74F350 |
| U97 | 74F350 |
| U98 | 3662 |
| U99 | 74F373 |
| U100 | 74F352 |
| U101 | 74F352 |
| U102 | 74F139 |
| U103 | 74F374 |
| U104 | 74F374 |
| U105 | 74F175 |
| U106 | 74F257 |
| U107 | 74F257 |
| U108 | 74F138 |
| U109 | 27S29 |
| U110 | 74F32 |
| U111 | 74F153 |
| U112 | 74F251 |
| U113 | 74F74 |
| U114 | 74F04 |
| U115 | 74LS645-1 |
| U116 | 74LS645-1 |
| U117 | 74F257 |
| U118 | 74F257 |
| U119 | 74F138 |
| U120 | 74S288 |
| U121 | 2911A |
| U122 | 74F153 |
| U123 | 74F251 |
| U124 | 74F74 |
| U125 | 74F74 |
| U126 | 3662 |
| U127 | 74F521 |
| U128 | 74F374 |
| U129 | 74F374 |
| U130 | 74F374 |
| U131 | 74F374 |
| U132 | 74F374 |
| U133 | 74F374 |
| U134 | 74F374 |
| U135 | 74F374 |
| U136 | 2911A |
| U137 | 74F374 |
| U138 | 74F374 |
| U139 | 74F374 |
| U140 | 74LS123 |
| U141 | 74F138 |
| U142 | 27S29 |
| U143 | 27S29 |
| U144 | 27S29 |
| U145 | 27S29 |
| U146 | 27S29 |
| U147 | 27S29 |
| U148 | 27S29 |
| U149 | 27S29 |
| U150 | 2911A |
| U151 | 27S29 |
| U152 | 27S29 |
| U153 | 27S29 |
| U154 | 74S112 |
| U155 | 74F02 |
| U156 | 74F11 |

Resistors

| No. | Resistance |
|---|---|
| R1 | 470 |
| R2 | 10K |
| R3 | 10K |
| R4 | 10K |
| R5 | 10K |
| R6 | 22K |
| R7 | 220 |
| R8 | 22K |
| R9 | 220 |
| R10 | 330 |
| R11 | 22K |

Capacitors

| No. | Capacitance |
|---|---|
| C1 | 68 |

Each of the specific cards in pipeline 200 will now be discussed. In such discussion, reference will be made to the detailed description of the basic pipeline card set forth above, as appropriate.

B. Matrix Maker Card

Matrix maker card 201 has the general configuration of the basic pipeline card of FIG. 3. However, matrix maker card 201 does not include the following components: twister 236, X RAM 244, shifter 252, stack 260, data PROM 266, secondary output latch 268, secondary output handshake 270, FIFO 274, or primary input handshake 272.

As described above, the main purpose of matrix maker card 201 is to quickly generate transformation matrices and output them to matrix multiplier card 202. The main task of matrix maker card 201 in creating such matrices is the computation of sines and cosines to 16-bit accuracy. Commands from CPU 800 control matrix maker card 201 determine which matrices are formed. Since matrix maker card 201 has no other pipeline cards above it, all commands are received by this card from CPU bus 808.

Matrices formed by matrix maker card 201 include: rotation matrices, translation matrices, scaling matrices, and tilt matrices. Rotation matrices are used to represent an active rotation of the illustration. Translation matrices are used to move graphic characters about on the viewing screen. Scaling matrices are used for scaling down an illustration from a maximum size. Tilt matrices represent the tangent of the angle of tilt away from vertical. (Tilt angles from −45 degrees to +45 degrees are possible.)

Other commands input to matrix maker card 201 will be passed through to matrix multiplier card 202. In addition, some commands are generated internally by matrix maker card 202.

It is apparent that the components which form matrix maker card 201 could be programmed using any suitable technique to accomplish the functions described above. An example of one suitable set of microcode instructions which may be used to program matrix maker card 201 is set forth in Appendix B. Appendix A illustrates a bit description map which references each line of the microcode of Appendix B to the particular location in the microcode PROMs U142–U149 and U151–U153 (see FIG. 3B) at which the microcode is stored. Thus, in order to make and use matrix maker card 201 in accordance with the presently preferred embodiment of the present invention, one need only connect the matrix maker IC's using the pin connections as shown in FIG. 3B, and then encode the PROMs U142–U149 and U151–U153 using the microcode of Appendix B, which is encoded in the PROMs as set forth in the bit description map of Appendix A.

C. Matrix Multiplier Card

Matrix multiplier card 202 has the general configuration of the basic pipeline card of FIG. 3. However, matrix multiplier card 202 does not include the following components: twister 236, shifter 252, sine/cosine input 258, constants PROM 254, latch 256, data PROMs 266, secondary input latch 268, and secondary input handshake 270.

The major function of matrix multiplier card 202 is to concatenate two 4×4 matrices to form the current transformation matrix. To accomplish this, both X RAM 244 and Y RAM 238 are utilized on this card. At any time, X RAM 244 holds the current transformation matrix, and Y RAM 238 is used to store the incoming matrix supplied by matrix maker card 201 to be concatenated with the current transformation matrix. When the product matrix is completed, the produced matrix is then stored in X RAM 244 and becomes the new current transformation matrix.

Also, matrix multiplier card 202 includes stack 260. Stack 260 is used to store frames consisting of entire matrices.

It is apparent that the components which form matrix multiplier card 202 could be programmed using any suitable technique to accomplish the functions described above. An example of one suitable set of microcode instructions which may be used to program matrix multiplier card 202 is set forth in Appendix C. Appendix A illustrates a bit description map which references each line of the microcode of Appendix C to the particular location in the microcode PROMs U142–U149 and U151–U153 (see FIG. 3B) at which the microcode is stored. Thus, in order to make and use matrix multiplier card 202 in accordance with the presently preferred embodiment of the present invention, one need only connect the matrix multiplier IC's using the pin connections as shown in FIG. 3B, and then encode the PROMs U142–U149 and U151–U153 using the microcode of Appendix C, which is encoded in the PROMs as set forth in the bit description map of Appendix A.

D. Header Card

As mentioned above, header card 300 is not readily adaptable to the same basic configuration as the basic pipeline card. Consequently, header card 300 is configurated somewhat differently thaw the basic pipeline card. A general block diagram representing one presently preferred embodiment of header card 300 is set forth in FIG. 4.

With reference to FIG. 4, data in the form of point files and normal files enters header card 300 through FIFO input 310. Unlike most of the other cards in pipeline 200, however, essentially all commands to header card 300 are enter the card from CPU bus 808 through a CPU interface 370. Based upon the data received from pipeline bus 806 and the commands received from CPU bus 808, header card 300 then generates it own commands using ALU 350, together with sequencer 340 and the microcode stored in PROMs 330. The commands so generated may then be sent down pipeline 200 through output port 380 to control each of the other pipeline cards such as cards process control data points. Alternatively, such commands may be sent back to CPU 800 on CPU bus 808.

Header card 300 also includes RAM 360 which may be used to temporarily store data or commands. Also, header card 300 is provided with an internal clocking control 320 which controls the functions of header board 300.

Reference is next made to FIGS. 5A–5E, which illustrate in more detail one preferred embodiment of a detailed electrical schematic diagram derived from the block diagram of FIG. 4. Those of ordinary skill in the art will, of course, appreciate that various modifications to the detailed schematic diagrams of FIGS. 5A–5E may be easily made without departing from the essential characteristics of the invention. Thus, the following description of the detailed schematic diagrams of FIGS. 5A–5E is intended only as an example, and simply illustrates one presently preferred embodiment. The various circuit stages corresponding to each of the functional blocks of FIG. 4 are outlined in FIGS. 5A–5E by bold, dashed lines and are numbered with like numerals.

Schematic diagrams 5A–5E are related to one another by means of various connection points 1'–40' located along the sides of each figure. In considering the detailed schematic diagrams of FIGS. 5A–5E, therefore, connection points having like numerals should be considered as being electrically connected so as to provide for data transfer between the circuit components illustrated in the several Figures.

In addition, as in FIGS. 3A–3I, throughout Figures 5A–5E, integrated circuits are represented by a numeral preceded by the letter "U." Resistors and capacitors are designated by numerals preceded by the letters "R" and "C," respectively. Various test points on the schematic diagrams are designated by numerals preceded by the letters "TP." Also, switches are designated by numerals preceded by the letter "S," and indicators are designated by numerals preceded by the letters "DS."

The specific circuit components which are used in accordance with this preferred embodiment of header card 300 are identified in Table 2 below. Those skilled in the art will, however, readily appreciate that a wide variety of different specific circuit components would also produce acceptable results.

Figure 5A:
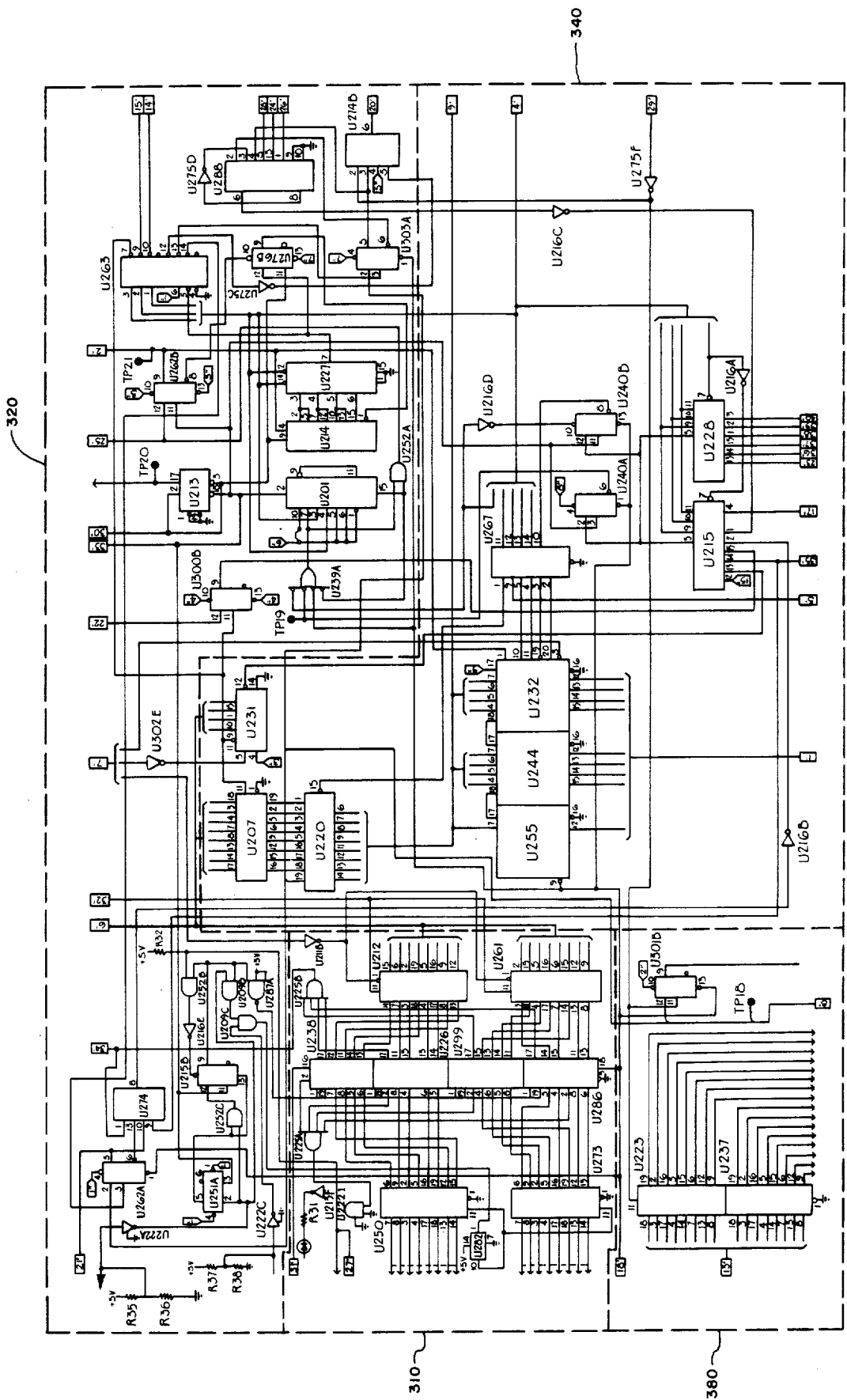
FIGS. 5A-5E are detailed electrical schematic diagrams illustrating one presently preferred embodiment of the general block diagram of FIG. 4.

Reference is now made to FIGS. 4 and 5A. As shown, FIFO input 310 of color board 300 comprises FIFOs U238, U226, U299, and U286. Each chip is 16 words deep by 5 bits wide. As with FIFO 274 of the basic pipeline card, the input data hold time for FIFOs U238, U226, U229, and U286 is 70 nanoseconds. Therefore, input data latches U250 and U273 are provided in order to meet the FIFO hold time and allow full speed system operation. In addition, output latches U212 and U261 are also provided to allow output as fast as possible from the FIFOs with a data output access time of 75 nanoseconds. Data flow through FIFO input 310 is controlled by a control circuit illustrated in FIG. 5E.

FIG. 5A also depicts pipeline output port 380. As illustrated, output port 380 comprises latches U223 and U237. Thus, commands and data output which are from header card 300 can be latched in latches U223 and U237 while such commands and data are read by vector multiplier card 203 (see FIG. 2).

FIG. 5A also shows sequencer section 340 of header card 300. Sequencer section 340 comprises sequencers U255, U244, and U232.

In addition, sequencer section 340 includes a mapping PROM U220 and a latch U207. Thus, when a command is received from CPU 800, the command may be driven to latch U207 and into mapping PROM U220.

A next address control, comprising PROM U267 is also provided in sequencer section 340. The output of PROM U267 controls selection of the next source of address for the system. This next address may be received from either microcode PROMs 330 or mapping PROM U220. Further, sequencer section 340 comprises condition multiplexers U215 and U228 to input test conditions to sequencers U255, U244 and U232.

FIG. 5A also illustrates the internal clock and mode control of header board 300. As with the basic pipeline card, some operations performed by header card 300 may take longer than the typical header card cycle time. Accordingly, counter U201 is provided to allow for selection of the appropriate card cycle time. In addition, this portion off the circuit contains numerous flip-flops and gates which allow selection of various operating modes for header card 300. That is, the circuit controls the source of commands and data being input to and output from header card 300.

Figure 5B:
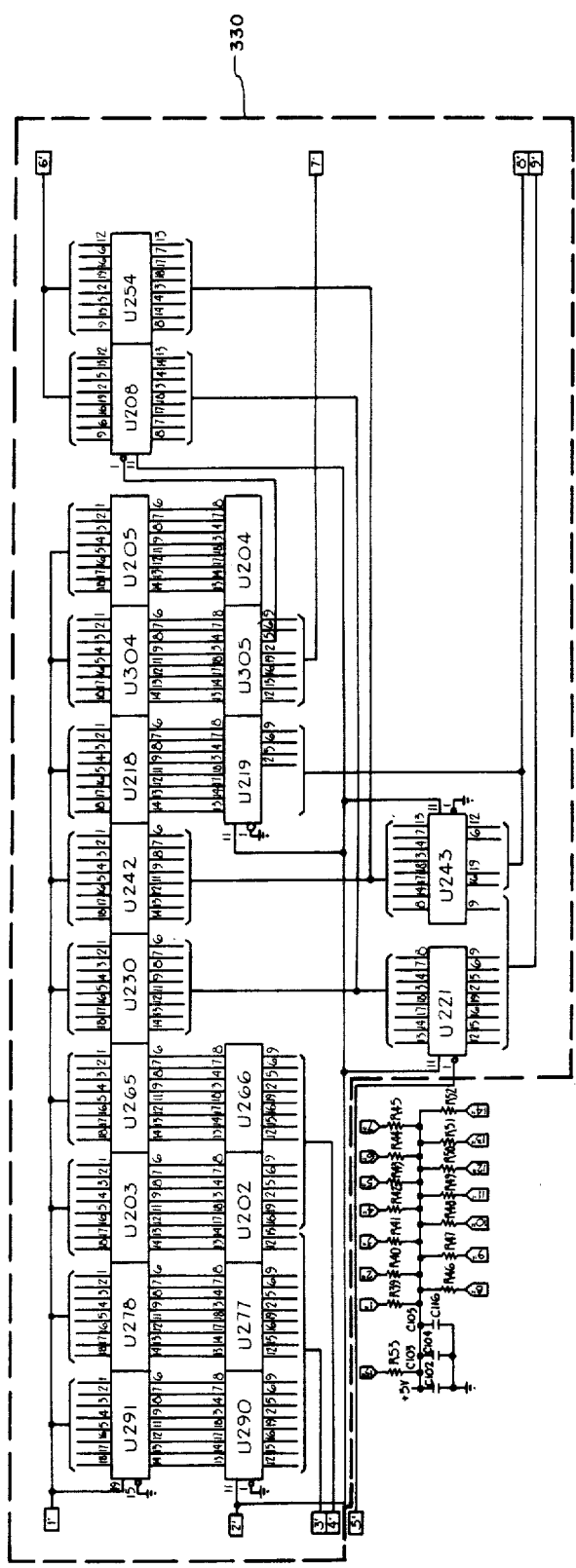

Referring now to FIGS. 4 and 5B, microcode PROMs and latches 330 comprise PROMs U291, U278, U203, U265, U230, U242, U218, U304, and U205. As with microcode PROMs and latches 230 of the basic pipeline card, the output of the PROMs of header card 300 are latched by latches U290, U277, U202, U266, U221, U243, U219, U305, U204, U254 and U208. A pullup circuit is also illustrated in FIG. 5B which has a plurality of numbered flags. Such flags represent connections between correspondingly numbered flags in FIGS. 5A–5E.

Figure 5C:
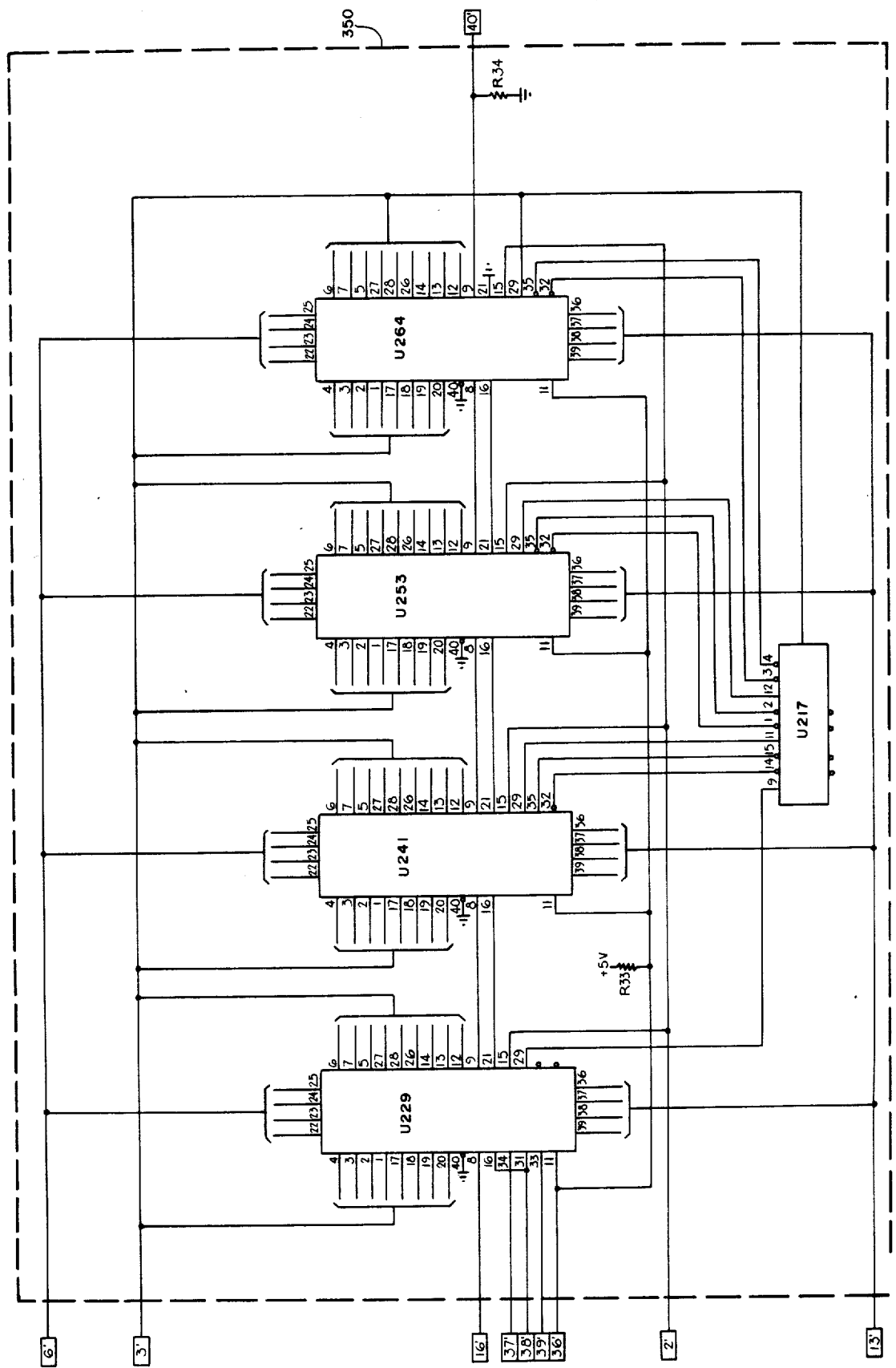

In FIGS. 4 and 5C, ALU 350 of header card 300 is illustrated. ALU 350 comprises bit slice processors U229, U241, U253, and U264. ALU 350 also comprises a look-ahead carry generator U217 connected to all four ALU slices.

Figure 5D:
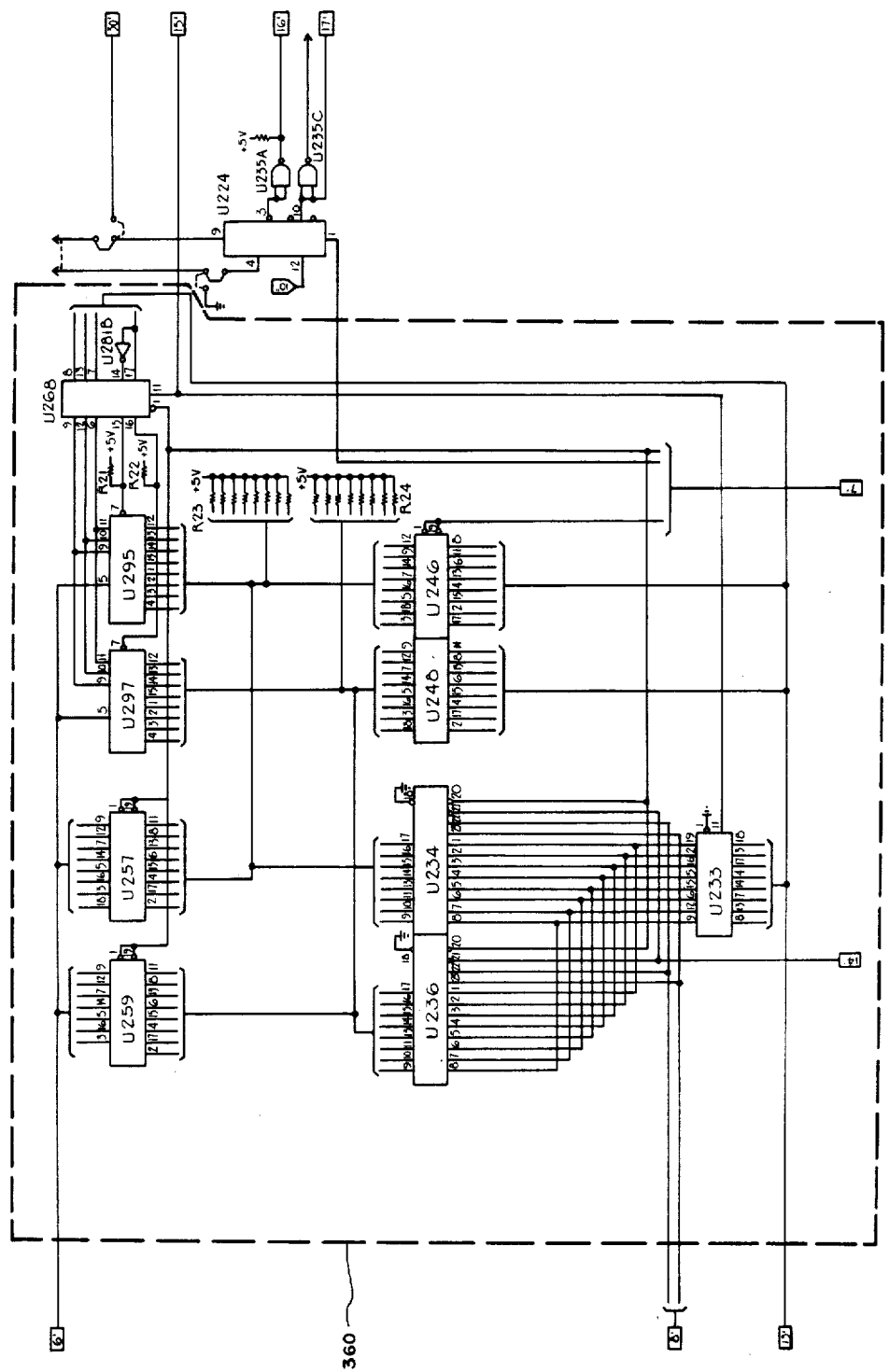

FIG. 5D illustrates RAM storage 360 of header card 300. As shown, RAM storage 360 comprises RAMs U236 and U234. Drivers U259 and U257 are also provided for driving data from RAMs U236 and U234. In addition, RAM storage 360 also includes multiplexers U297 and U295 with associated drivers U248 and U246. Multiplexers U297 and U295 are used to test and/or read various individual bits which are input from RAMs U236 and U243 or from the header card data bus through drivers U248 and U246.

A serial input circuit (comprising IC U224), is also shown in FIG. 5D. This circuit allows header card 300 to signal when it is ready for data input and also to receive face visible bits from shader card 204 to be transmitted back to CPU 800, as described above.

Figure 5E:
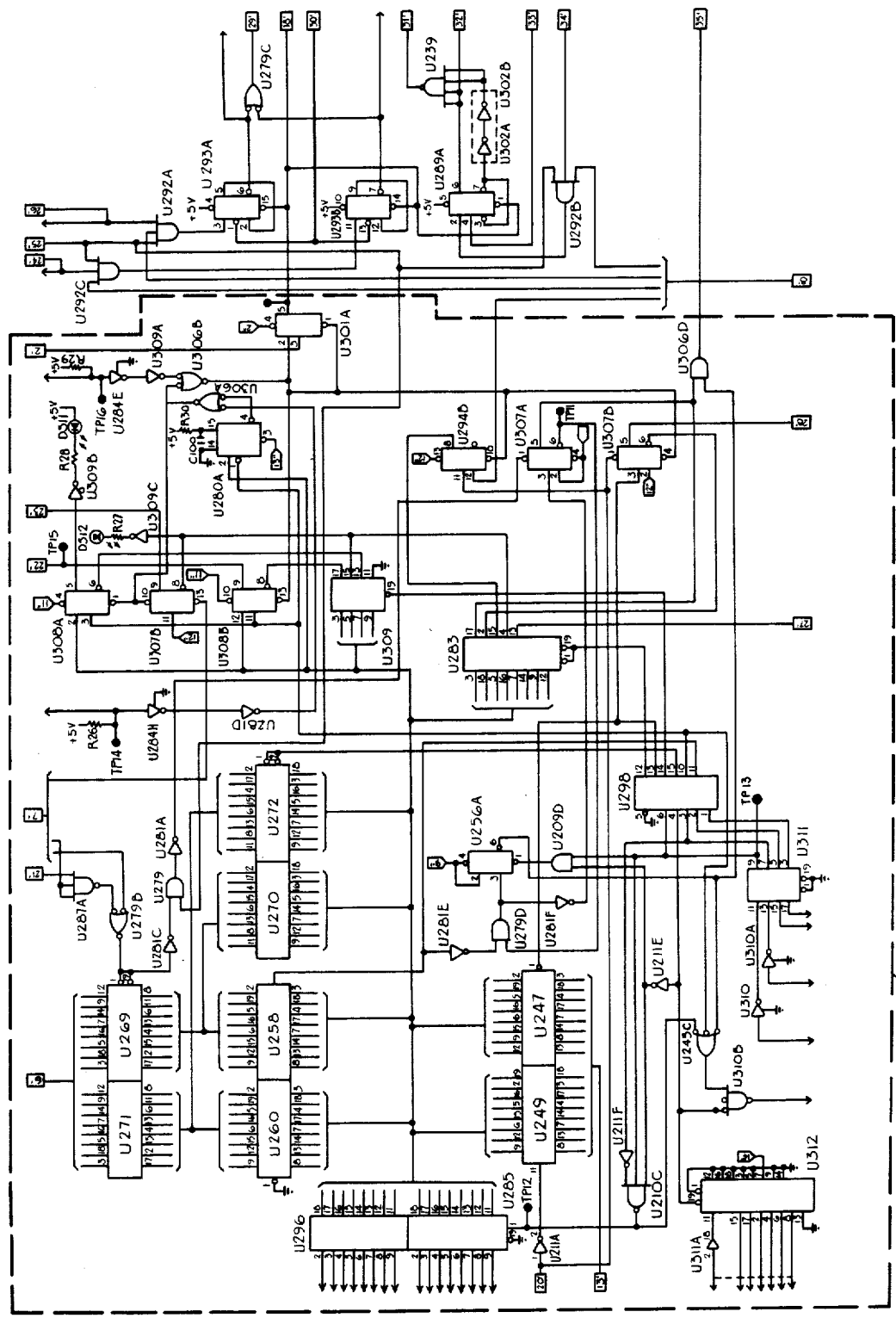

Referring now to FIGS. 4 and 5E, the CPU interface of header card 300 is configurated similarly to that of the basic pipeline card. Accordingly, CPU interface 370 of header card 300 comprises a control port, a status port, an input data port, an output data port, a transceiver, and an address decoder. Each of these components will be described briefly.

The control port portion of computer interface 370 comprises ICs U308A, U308B, U307B, U280A, and U301A. CPU 800 writes control information into control port 278. Such information comprises a reset bit and a bit used to indicate that all of the pipeline cards have passed the Power-on Confidence Test, described above. As with the basic pipeline card, LEDs are provided to indicate both that header card 300 has passed the Power-On Confidence test (DS1) and that all of the cards in pipeline 200 have passed the Power-on Confidence Test (DS2). The status port portion of CPU interface 370 comprises driver U283 and associated flip-flops U294B, U307A, and U307B. The status port enables CPU 800 to read several bits of information, thereby determining the status of various header card functions.

The input and output port portions of CPU interface 370 comprise latches U260 & U258 and U249 & U247, respectively. Drivers U271 and U269 are provided to drive data from input latches U260 and U258 onto the data bus of header card 300. Transceivers U296 and U285 allow CPU 800 to receive data from header card 300 through output latches U249 and U247 and to input data and commands to header card 300 through input latches U260 and U258.

The address decoder portion of CPU interface 370 comprises IC U311A. This circuit allows header card 300 to determine whether the information on the CPU bus is destined for header card 300 or for some other portion of the system.

FIG. 5E also illustrates a control circuit which is used to control the input FIFOs 310 illustrated in FIG. 5A. This control circuit comprises IC's U293A, U293B, and U289A, together with associated circuitry.

Referring to Table 2 below, the various integrated circuits, resistors, and capacitors used in the schematic illustrations of FIGS. 5A–5E are set forth. The components are identified by the same numbers used in the Figures. Resistors are ¼ watt resistors and resistance is stated in ohms. Unless otherwise indicated, capacitance is stated in microfarads.

TABLE 2

Circuit Components of the Header Card

Integrated Circuits

| No. | Type |
|---|---|
| U201 | 74S163 |
| U202 | 74F374 |
| U203 | 27S29 |
| U204 | 74F374 |
| U205 | 27S29 |
| U207 | 74F374 |
| U208 | 74F374 |
| U209 | 74F08 |
| U210 | 74F10 |
| U211 | 74F04 |
| U212 | 74F374 |
| U213 | 74S240 |
| U214 | 74F175 |
| U215 | 74F251 |
| U216 | 74F04 |
| U217 | 74F182 |
| U218 | 27S29 |
| U219 | 74F374 |
| U220 | 27S29 |
| U221 | 74F374 |
| U222 | 3662 |
| U223 | 74F374 |
| U224 | 74LS175 |
| U225 | 3662 |
| U226 | 74S225 |
| U227 | 74F352 |
| U228 | 74F251 |
| U229 | 2901 B |
| U230 | 27S29 |
| U231 | 74LS193 |
| U232 | 2911A |
| U233 | 74F374 |
| U234 | 4801A-90 |
| U235 | 74S38 |
| U236 | 4801A-90 |
| U237 | 74F374 |
| U238 | 74S225 |
| U239 | 74F20 |
| U240 | 74F74 |
| U241 | 2901 B |
| U242 | 27S29 |
| U243 | 74F374 |
| U244 | 2911A |
| U245 | 74F10 |
| U246 | 74F244 |
| U247 | 74F374 |
| U248 | 74F244 |
| U249 | 74F374 |
| U250 | 74F374 |
| U251 | 74LS74 |
| U252 | 74F08 |
| U253 | 2901 B |
| U254 | 74F374 |
| U255 | 2911A |
| U256 | 74LS74 |
| U257 | 74F244 |
| U258 | 74F374 |
| U259 | 74F244 |
| U260 | 74F374 |
| U261 | 74F374 |
| U262 | 74F74 |
| U263 | 74F138 |
| U264 | 2901 B |
| U265 | 27S29 |
| U266 | 74F374 |
| U267 | 74S288 |
| U268 | 74F374 |
| U269 | 74F244 |
| U270 | 74LS244 |
| U271 | 74F244 |
| U272 | 74LS244 |
| U273 | 74F374 |
| U274 | 74S51 |
| U275 | 74F04 |
| U276 | 74F74 |
| U277 | 74F374 |
| U278 | 27S29 |
| U279 | 74F08 |
| U280 | 74LS123 |
| U281 | 74F04 |
| U282 | TTLDL-125 |
| U283 | 74LS244 |
| U284 | 3662 |
| U285 | 74LS645-1 |
| U286 | 74S225 |
| U287 | 74F10 |
| U288 | 74S51 |
| U289 | 74F109 |
| U290 | 74F374 |
| U291 | 27S29 |
| U292 | 74F11 |
| U293 | 74S112 |
| U294 | 74LS74 |
| U295 | 74F251 |
| U296 | 74LS645-1 |
| U297 | 74F251 |
| U298 | 74LS138 |
| U299 | 74S225 |
| U300 | 74LS74 |
| U301 | 74F74 |
| U302 | 74LS04 |
| U303 | 74LS74 |
| U304 | 27S29 |
| U305 | 74F374 |
| U306 | 74LS08 |
| U307 | 74LS74 |
| U308 | 74LS74 |
| U309 | 27S240 |
| U310 | 3662 |
| U311 | 74S244 |
| U312 | 74F521 |

Resistors

| No. | Resistance |
|---|---|
| R21 | 3.3K |
| R22 | 3.3K |
| R23 | 3.3K |
| R24 | 3.3K |
| R25 | 3.3K |
| R26 | 3.3K |
| R27 | 220 |
| R28 | 220 |
| R29 | 3.3K |
| R30 | 22K |
| R31 | 330 |
| R32 | 3.3K |
| R33 | 470 |
| R34 | 680 |
| R35 | 180 |
| R36 | 390 |
| R37 | 180 |
| R38 | 390 |
| R39 | 470 |
| R40 | 470 |
| R41 | 470 |
| R42 | 330 |
| R43 | 470 |
| R44 | 470 |
| R45 | 470 |
| R46 | 470 |
| R47 | 470 |
| R48 | 470 |
| R49 | 470 |
| R50 | 470 |
| R51 | 470 |
| R52 | 470 |
| R53 | 470 |

Capacitors

TABLE 2-continued

| Circuit Components of the Header Card | |
|---|---|
| No. | Capacitance |
| C101 | 68 pF |
| C102 | 47 |
| C104 | 100 nF |
| C116 | 10 nF |

It is apparent that the components which form header card 300 could be programmed using any suitable technique to accomplish the functions described above. An example of one suitable set of microcode instructions which may be used to program header card 300 to generate the appropriate commands for controlling the other cards in pipeline 200 is set forth in Appendix O. Appendix N illustrates a bit description map which references each line of the microcode of Appendix O to the particular location in the microcode PROMs U291, U278, U203, U265, U230, U242, U218, U304, and U205 (see FIG. 3B) at which the microcode is stored. Thus, in order to make and use header card 300 in accordance with the presently preferred embodiment of the present invention, one need only connect the header IC's using the pin connections as shown in FIG. 5B, and then encode the PROMs U291, U278, U203, U265, U230, U242, U218, U304, and U205 using the microcode of Appendix O, which is encoded in the PROMs as set forth in the bit description map of Appendix N.

E. Vector Multiplier Card

Vector multiplier card 203 has the general configuration of the basic pipeline card of FIG. 3. However, vector multiplier card 203 does not include the following components: twister 236, X RAM 244, shifter 252, sine/cosine input 258, constants PROM 254, latch 256, stack 260, and data PROM 266.

Vector multiplier card 203 is the most complex pipeline card with respect to its position in pipeline 200. Two pipeline cards can write to vector multiplier card 203, and it can write to two other cards below it in the pipeline. Accordingly, vector multiplier has four systems of data transfer handshakes: secondary input handshake 270, primary input handshake 272, a secondary output handshake (secondary output is by CPU bus 808), and primary output handshake 290.

The purpose of vector multiplier card 203 is to transform points coming into it from header card 300 by the current transformation matrix supplied by the matrix multiplier card 202. Vector multiplier card 203 then sends the transformed points out to their correct destinations: data points to clipper cards 205-209; and transformed normal vectors to shader card 204.

It is apparent that the components which form vector multiplier card 203 could be programmed using any suitable technique to accomplish the functions described above. An example of one suitable set of microcode instructions which may be used to program vector multiplier card 203 is set forth in Appendix D. Appendix A illustrates a bit description map with references each line of the microcode of Appendix D to the particular location in the microcode PROMs U142-U149 and U151-U153 (see FIG. 3B) at which the microcode is stored. Thus, in order to make and use vector multiplier card 203 in accordance with the presently preferred embodiment of the present invention, one need only connect the vector multiplier IC's using the pin connections as shown in FIG. 3B, and then encode the PROMs U142-U149 and U151-U153 using the microcode of Appendix D, which is encoded in the PROMs as set forth in the bit description map of Appendix A.

F. Shader/Hidden Surface Card

Shader/hidden surface card 204 has the general configuration of the basic pipeline card of FIG. 3. However, shader/hidden surface card 204 does not include the following components: twister 236, X RAM 244, sine/cosine input 258, stack 260, PROM 266, secondary input latch 268, and secondary input handshake 270.

The input of shader card 204 is connected to the primary output 292 of vector multiplier card 203. Shader card 204 receives both commands and data from vector multiplier cards 203 on this data path. The purpose of the shader card 204 is to compute whether faces are front or back facing (face visible or not) and also to compute an appropriate shade fraction for each face. Face visible data is then sent to header card 300 while the computed shade fraction is sent to scan converter 820.

It is apparent that the components which form shader card 204 could be programmed using any suitable technique to accomplish the functions described above. An example of one suitable set of microcode instructions which may be used to program shader card 204 is set forth in Appendix E. Appendix A illustrates a bit description map which references each line of the microcode of Appendix E to the particular location in the microcode PROMs U142-U149 and U151-U153 (see FIG. 3B) at which the microcode is stored. Thus, in order to make and use shader card 204 in accordance with the presently preferred embodiment of the present invention, one need only connect the shader IC's using the pin connections as shown in FIG. 3B, and then encode the PROMs U142-U149 and U151-U153 using the microcode of Appendix E, which is encoded in the PROMs as set forth in the bit description map of Appendix A.

G. Clipper Cards

Each of the clipper cards 205-209 has the general configuration of the basic pipeline card of FIG. 3. However, clipper cards 205-209 do not include the following components: twister 236, X RAM 244, sine/cosine input 258, data PROM 266, secondary input latch 268, and secondary input handshake 270.

All 5 clipper cards are configurated as 3D clippers, and each clipper card clips against one plane of the viewing frustum (see FIG. 1B). The D clipper (clipper card 205) clips at $z=D$, the "near clipping plane." The $\pm A$ clippers (clipper cards 206-207) clip at the left and right viewing boundaries, and the $\pm B$ clippers (clipper cards 208-209) clip at the top and bottom viewing boundaries.

Figure 6:
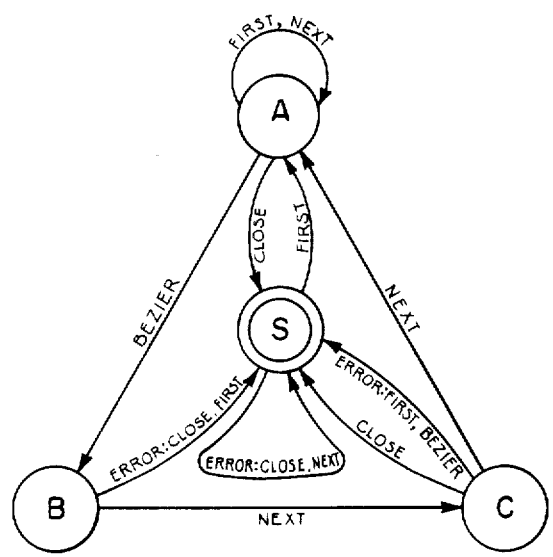
FIG. 6 is a state diagram illustrating the way in which the clipper cards move from state to state in clipping graphic figures to the viewing frustum.
Figure 7:
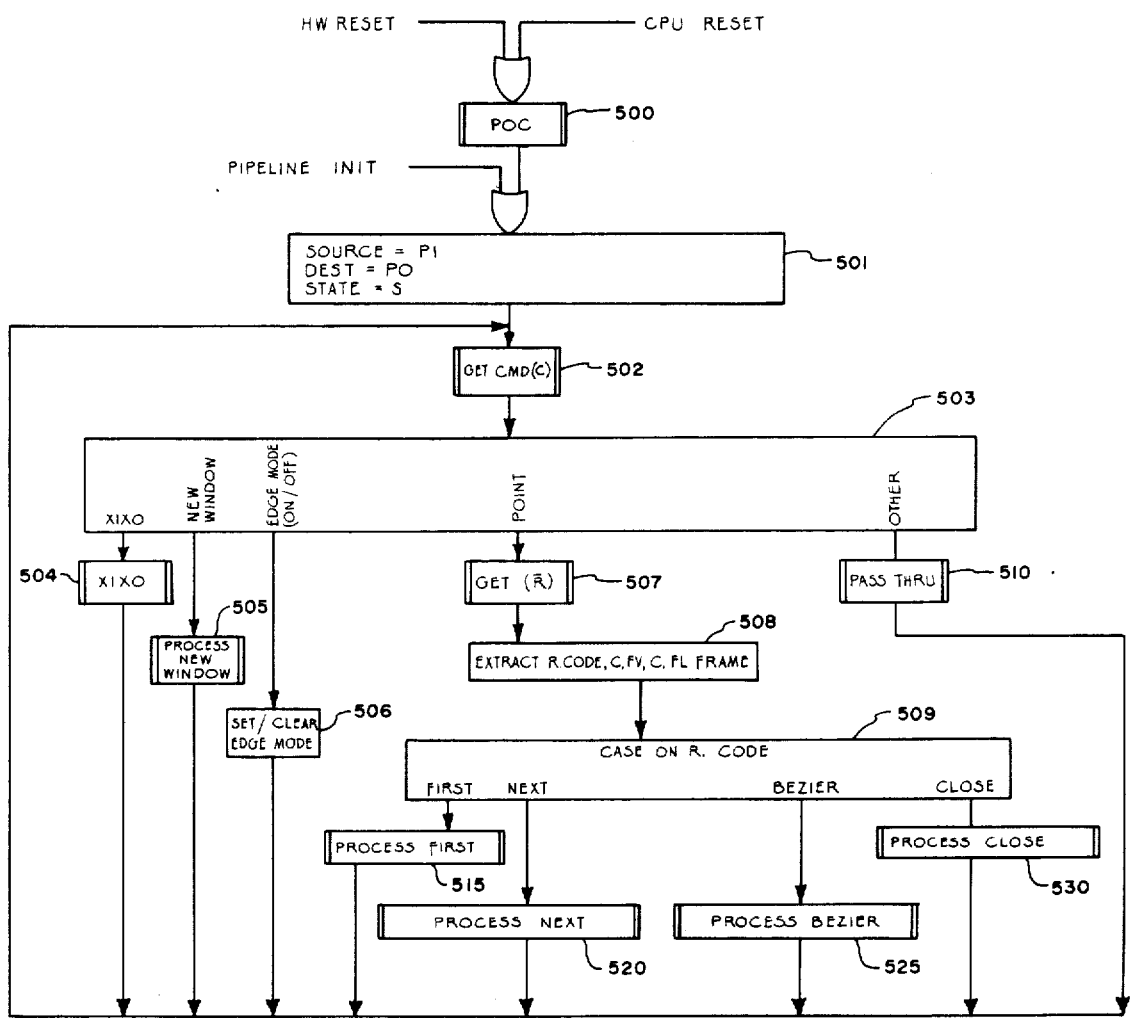
FIG. 7 is a general flow chart illustrating the processing program used by each of the clipper cards of the pipeline.

The points coming into clipper cards 205-209 are of the form ($x_E, y_E, z_E$), (i.e., points in three-dimensional space). When a clipper card clips, it computes the intersection point of a line or curve with the appropriate clipping plane. Reference is now made to FIGS. 6-7N which illustrate the operation of clipper cards 205-209 in more detail.

FIG. 6 is a state diagram which illustrates how clipper cards 205-209 move from state to state in processing data points representing straight lines and curves.

The system is first initialized to State S. While in State S, if a point comes in with a code of Close or Next, this is an error. Thus, no action is taken and the system remains in State S. If a point comes in with a First code, the point is processed and the system moves to State A.

From State A, a Close point will return the system back to State S. If, while in State A, either a First or a Next code is received, the system remains in State A. If, while in State A, a Bezier code is received, the system moves to State B.

From State B, a Close or First code is an error and the system returns to State S. However, while in State B a Next code will move the system to State C.

In State C, either a First or Bezier code is an error and moves the system to State S. From State C, a Close code is proper but will also move the system to State S. If, while in State C, a Next code is received, the system moves to State A.

The main clipper flow chart is illustrated in FIG. 7. Referring to the top of the flow chart, either a hardware reset or a CPU reset will cause the system to go into the Power-On Confidence Test subroutine 500. As explained above, this subroutine performs a test on certain system functions. Either a Pipeline Init or either of the above-mentioned resets will cause an initialization of registers in step 501. The system then goes into the Get Command subroutine 502. Dependent on the command obtained through the routine, control will pass in step 503 to either the change input/output (XIXO) subroutine 504, the Process New Viewing Window subroutine 505, the Set/clear Edge Mode Subroutine 506, a Point subroutine, or it will pass the command through to other cards in step 510 (if the command is not for this card).

In the Point subroutine, the system will first get a point called "Vector R" in step 507. Then in step 508 the system extracts from the point the point code, and various control bits. A jump is then made in step 509 depending on the code associated with that point (the code being either "First," "Next," "Bezier" or "Close").

Figure 7A:
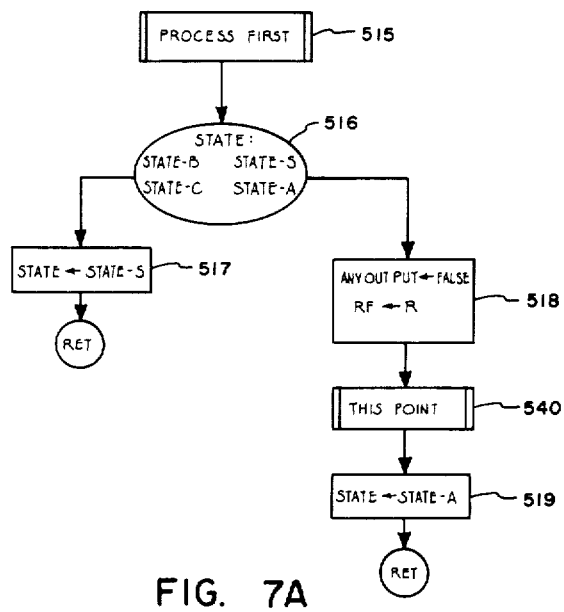
FIGS. 7A-7N are flow charts illustrating various subroutines of the clipper card program.

The subroutine illustrated in FIG. 7A is the Process First point subroutine 515. Step 516 is simply a jump, dependent on the State of the system (see FIG. 6).

If the state flag is B or C, the system jumps to step 517, wherein the state flag is set to State S. The system then returns to the Get Command subroutine 502.

If the State in step 516 is State S or State A, the system jumps to step 518 to clear (or set to false) that Any Output Flag. The vector R (composed of components $R_x$, $R_y$ and $R_z$) is then loaded into a storage location called $R_f$(R-First) and a jump is then performed to step 540 which is the This Point subroutine (see FIG. 7E). After a step 540a, the system state flag is set to a State A in step 519 and the system returns to the Get-Command subroutine 502.

Figure 7B:
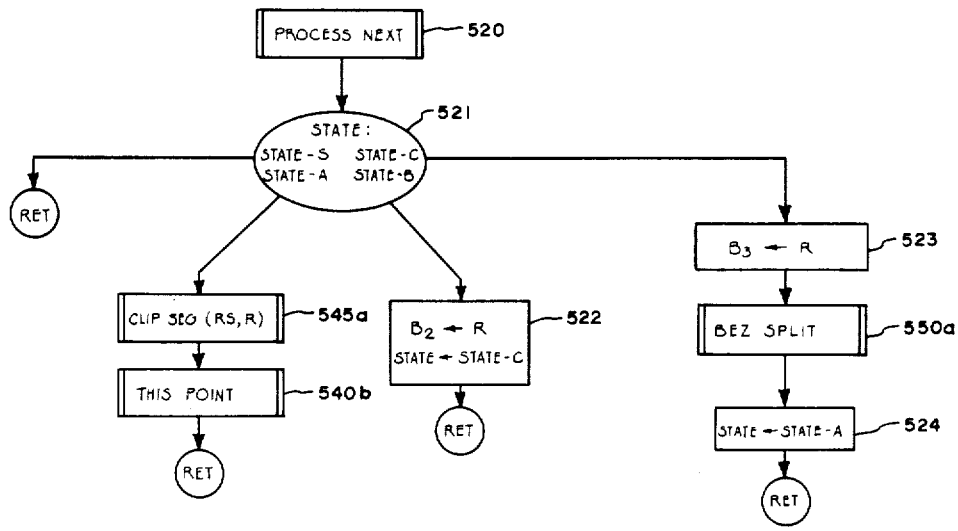

The Process Next point subroutine 520 is illustrated in FIG. 7B. First, in step 521, a jump is made dependent upon the system State flag. If the system is in State S, the system simply returns to the Get Command subroutine 502. If the system is in State A, the system jumps to the Clip Seg subroutine in step 545a (see FIG. 7F), then to the This Point subroutine in step 540b (see FIG. 7E). The system then returns to the Get Command subroutine 502.

In step 521, if the system state flag is in the B condition, a jump is made to step 522 wherein Vector R is loaded into a storage location called $B_2$. Then the system state flag is then set to State C and control returns to the Get Command subroutine 502.

In step 521, if the system state flage is C, a jump is made to step 523 where the Vector R is loaded into a storage location $B_3$. The routine then jumps to the Bezier Split subroutine in step 550a (see FIG. 7I). After step 550a, the system goes to step 524 where the system state flag is set to State A. The system then returns to the Get Command subroutine 502.

Figure 7C:
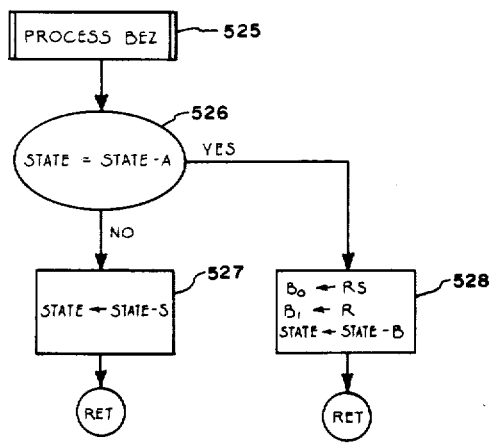

The flow chart illustrated in FIG. 7C is the Process Bezier subroutine 525. First, the routine goes to step 526 and tests the system state flag to see if it is in State A.

If the answer is no, control goes in step 527 to set system state flag to State S, and the system returns to the Get Command subroutine 502.

If the system state flag in step 526 is at State A a jump is made to step 528. Vector $R_s$ is then put into a new storage location $B_0$. (Vector $R_s$ is the start vector.) The Vector R is next put into the $B_1$ storage location (R is the current vector being dealt with). The system state flag is then set to State B, and the system returns to the Get Command subroutine 502.

Figure 7D:
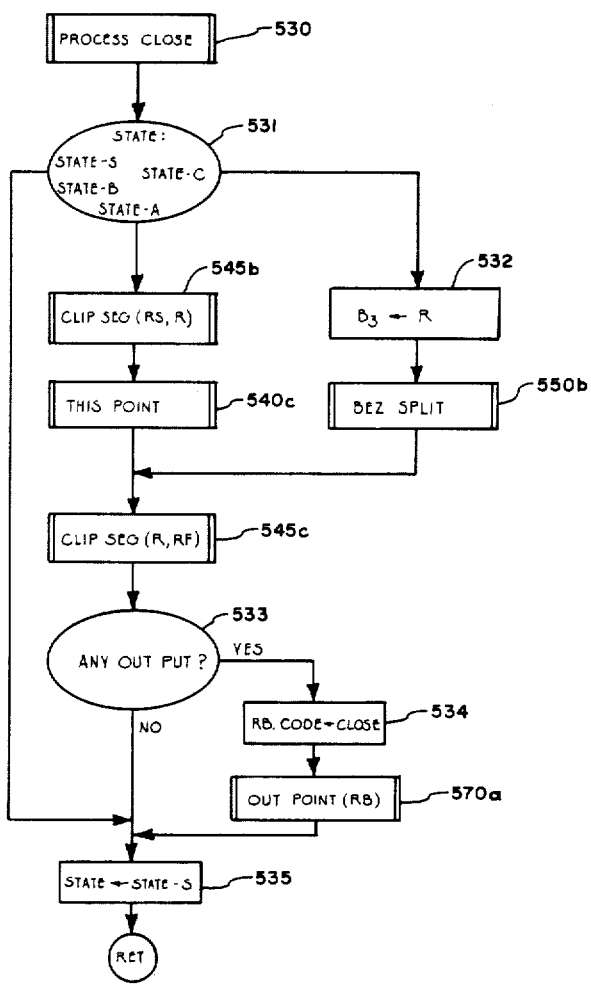

The Process Close subroutine is illustrated in FIG. 7D. First, in step 531, a conditional jump on the system state flag is performed.

If the state flag is State S or B, the system immediately jumps to step 535. This means there was an error, since the system should not have received a Close Code at this point. The state flag is then set to State S in step 535 and the system returns to the Get Command subroutine 502.

Figure 7E:
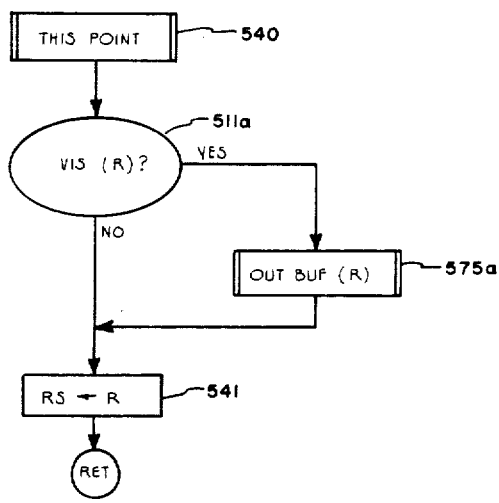
Figure 7F:
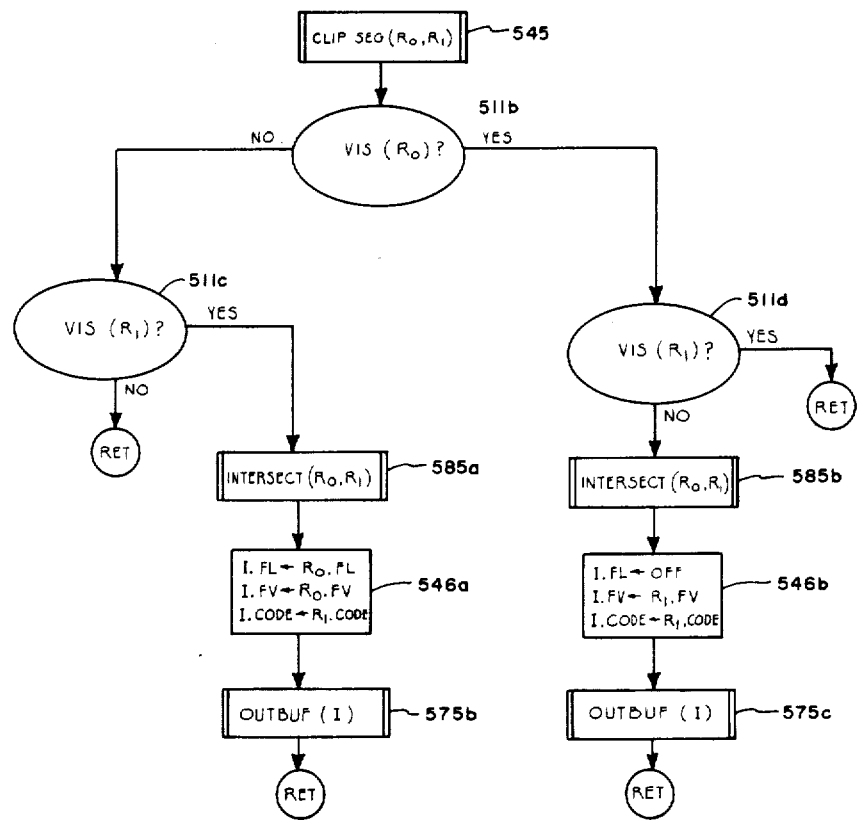
Figure 7G:
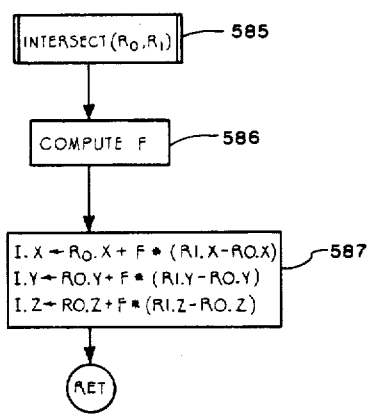
Figure 7H:
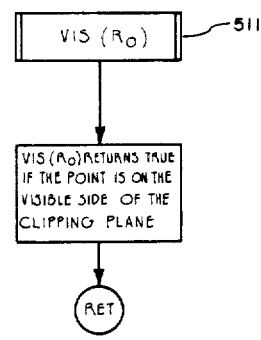
Figure 71:
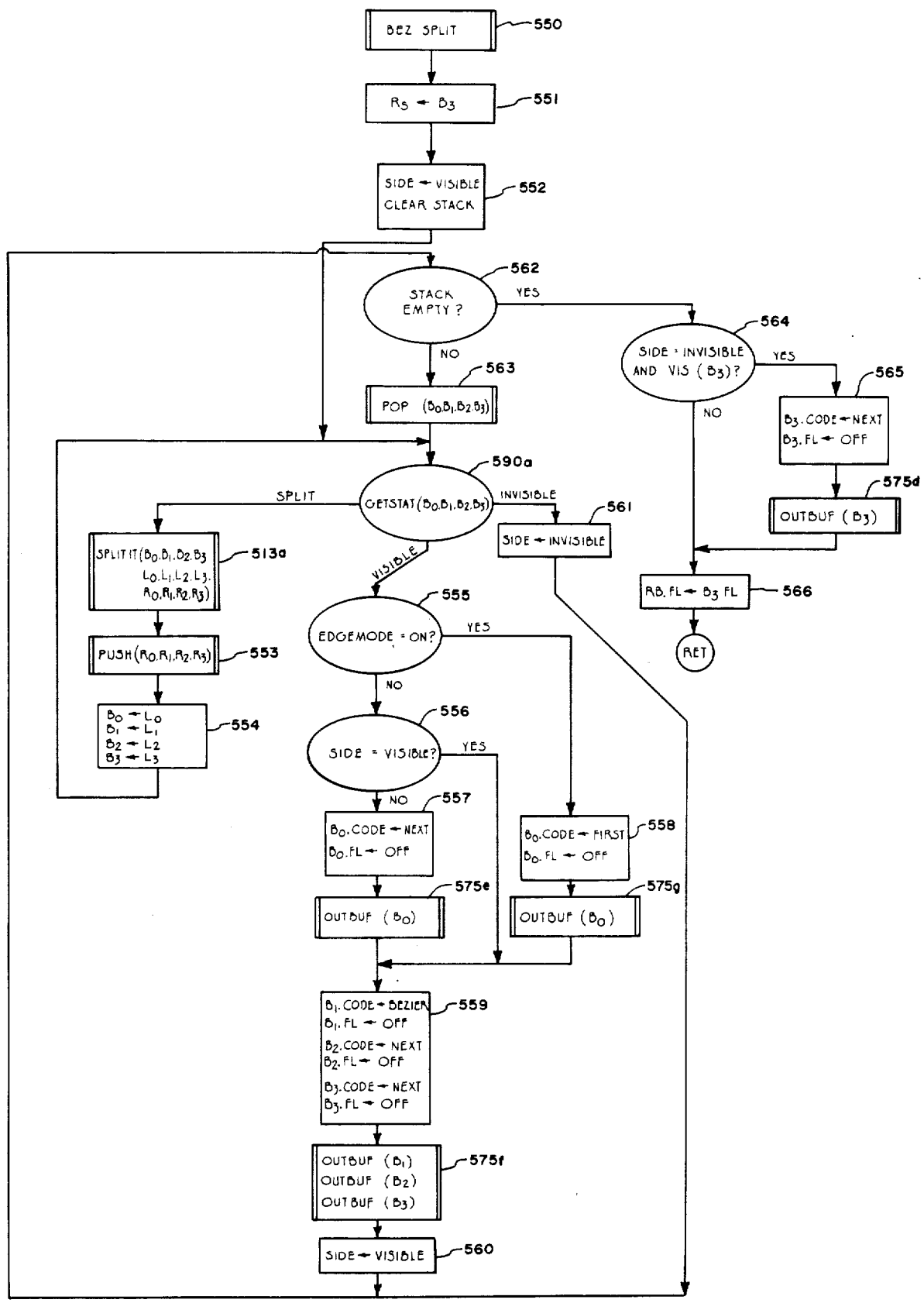

In step 531, if the state flag is A, the system then goes to the Clip Seg subroutine in step 545b (see FIG. 7F). After step 545b, the system goes to the This Point subroutine in step 540c (see FIG. 7E). Then, in step 545c, the system again executes the Clip Seg subroutine (see FIG. 7F).

In step 533, the system tests the Any Output flag to see if it is set. If the flag is not set, the system jumps to step 535, sets the state flag to S and returns the Get Command subroutine 502. If the Any Output flag is set, a jump is made from step 533 to step 534 where the point code for point $R_b$ is set to "Close." The System then jumps to the Out Point subroutine in step 570a. Then, the system executes step 535 as described above and returns to the Get Command subroutine.

Back in step 531, if the state flag is C, the system jumps to step 532 and puts the R Vector into storage location $B_3$. A jump is then made to the Bezier Split subroutine 550b (see FIG. 7I). On return from that subroutine, the system jumps to step 545c and operates from that point on as described above.

The This Point subroutine 540 is illustrated in FIG. 7E. This subroutine goes first to step 511a and tests to see if the Vector R is visible (see FIG. 7H).

If the answer is no, the system jumps to step 541, puts the Vector R into the $R_s$ storage location, and then returns to the calling routine.

Figure 7M:
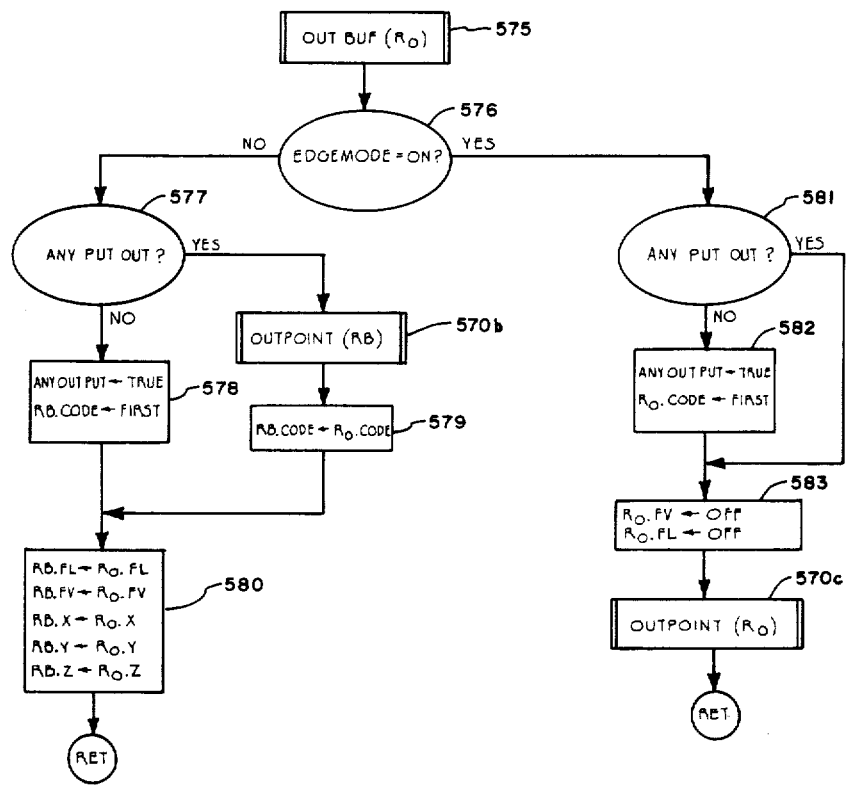
Figure 7N:
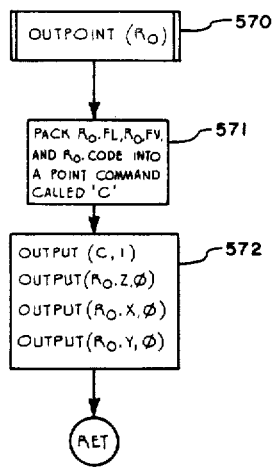

If the answer to the visibility test is yes, the system goes to step 575a and jumps to the OutBuf subroutine (see FIG. 7M). After executing step 575a, the system then goes to step 541, as described above.

The Clip Seg subroutine 545 is illustrated in FIG. 7F. This subroutine enters with two vectors $R_0$ and $R_1$. First, the routine goes into step 511b to determine whether $R_0$ is visible (see FIG. 7H).

If $R_0$ is not visible, the control goes to step 511c to test if the Vector $R_1$ is visible. If $R_1$ is not visible, the system returns to the calling subroutine. If $R_1$ is visible, control then goes in step 585a, to the Intersect subroutine (see FIG. 7G). After step 585a, the system goes to step 546a. There, the point code from $R_1$ is copied to the intersect point (I) code. Also, the flap and face visible bits of point I are copied from $R_0$. The system then jumps to the Out-Buff subroutine in step 575$b$ (see FIG. 7M) and then returns to the calling subroutine.

In step 511, at the top of FIG. 7F, if it is determined that Vector $R_0$ is visible, then the system control goes to step 511$d$ to test whether Vector $R_1$ is visible. If both are visible, the system returns to the calling routine. If Vector $R_1$ is not visible, the system jumps in step 585$b$ then to the Intersect subroutine (see FIG. 7G). After 585$b$, the system moves to step 546$b$, copies the point code and Face Visible bit for Vector $R_1$ to Vector I and sets the Flap bit of Vector I to "OFF." The system then jumps to the OutBuf subroutine in step 575$c$ and then returns to the calling routine.

The Intersect subroutine 585 is illustrated in FIG. 7G. This subroutine requires two variables: $R_0$ and $R_1$.

First, a jump is made to step 586 and a value for F is computed, as discussed below. After computing F, the intersect point is computed in step 587. The X component of the intersect vector, $I_x$, equals $RO_x + [F*(R1_x - RO_x)]$. The Y component of the intersect vector, $I_y$, is $RO_y + [F*(R1_y - RO_y)]$. The Z component of the intersect vector, $I_z$, is $RO_z + [F*(R1_z - RO_z)]$. The system then returns to the calling routine.

The value for F is computed dependent upon the particular clipper being used. Alpha is A/D; Beta is B/D (see FIG. 1B). The parameters A, B, D were obtained from a previous command input to the card called the New Window command. For the D Clipper (clipper card 205), $F = (D - Z_0)/Z_1 - Z_0)$. It is the constant D minus the Z component of the $R_0$ vector divided by the Z component of Vector $R_1$ minus the Z component of the $R_0$ vector. For the +A Clipper (clipper card 206):

$$F = \frac{(X_0 - \text{Alpha} * Z_0)}{(X_0 - \text{Alpha} * Z_0) - (X1 - \text{Alpha} * Z1)}$$

For the −A Clipper (clipper card 207):

$$F = \frac{(X_0 + \text{Alpha} * Z_1)}{(X_0 + \text{Alpha} * Z_0) - (X1 + \text{Alpha} * Z1)}$$

For the +B Clipper (clipper card 208):

$$F = \frac{(Y_0 - \text{Beta} * Z_0)}{(Y_0 - \text{Beta} * Z_0) - (Y1 - \text{Beta} * Z1)}$$

For the −B Clipper (clipper card 209):

$$F = \frac{(Y_0 + \text{Beta} * Z_0)}{(y_0 + \text{Beta} * Z_0) - (Y1 + \text{Beta} * Z1)}$$

FIG. 7H illustrates the Visible subroutine 511 which is used to determine whether a particular point is visible. The visible subroutine will return "true" if the point is on the visible side of the particular clipping plane being tested. The visible subroutine will return false if the point is on the invisible side of the clipping plane. After the flag is set to true or false, the system returns to the calling subroutine.

The way the visibility is evaluated depends upon the particular clipper in question.

The D clipper (clipper card 205) Visible subroutine test is: "$R_z > D$." If the answer is true, the point is visible; if false, the point is invisible.

The evaluation made for the +A clipper (clipper card 206) is:

"$R_x < R_z*(A/D)$."

The evaluation made for the −A clipper (clipper card 207) is:

"$R_x > -R_z*(A/D)$."

The evaluation made for the +B clipper (clipper card 208) is:

"$R_y < R_z*(B/D)$."

The evaluation made for the −B clipper (clipper card 209) is:

"$R_y > -R_z*(B/D)$."

The Bez Split Subroutine 550 is illustrated in FIG. 7I. A flag called "Side" can be either in the "Visible" or "Invisible" states. When the get status (Get Stat) subroutine 590 (see FIG. 7J) is used, there are three possible status returns: Visible, Invisible or Split.

At the top of the Bez Split subroutine, take Vector B3 and put it into the storage location for Vector $R_s$ in step 551. Then, in step 552, the side flag is set to visible and the stack is cleared.

The routine then jumps to step 590$a$ to evaluate the status of the four working points: Vectors $B_0$, $B_1$, $B_2$ and $B_3$.

If the status is Split, the system jumps to step 513$a$ and goes to the Split it subroutine (see FIG. 7L). The Split it subroutine will return two new sets of curved points: Vectors Left 0, Left 1, Left 2 and Left 3 ($L_0$, $L_1$, $L_2$, and $L_3$) and $R_0$, $R_1$, $R_2$, and $R_3$. These two vectors represent the left and right halves of the curve. In step 553, the set of vectors for the right half of the curve ($R_0$, $R_1$, $R_2$, and $R_3$) are pushed into the stack. Then, in step 554, set $B_0 = L_0$, $B_1 = L_1$, $B_2 = L_2$, and $B_3 = L_3$. This uses the left half of the curve that was split and makes it the new curve of evaluation. From step 554, the system will return back to step 590$a$ again.

At step 590$a$, if the Get Stat subroutine returns the answer "invisible," the system goes to step 561 to set the Side Flag to invisible and then proceeds to step 562 which is explained more fully below.

From step 590$a$, if the answer to the Get Status subroutine is "visible," the system jumps to step 555 to see if Edge Mode is on. If Edge Mode is on, the system jumps to step 558 to set the code of the $B_0$ point to a "First" code and turn the flap bit of the B0 point to off. Then, the system jumps to the Out Buf subroutine in step 575 (see FIG. 7M). On return, having completed steps 558 and 575$g$, the system jumps to step 559, which is more fully described below. If, in step 555, it is determined that Edge Mode is off, the system then goes to step 556.

In step 556, the system determines whether the side flag is set to "Visible."

If the answer is yes, the system jumps to step 559, which is described more fully below. If in step 556, the answer is no, the system goes to step 557 to set the code for the $B_0$ point to "Next" and set the flap bit of the $B_0$ point to "off." The system then jumps to the Out Buf subroutine in step 575$e$ (see FIG. 7M).

The system then executes step 559. In step 559, the code of the $B_1$ point is set to "Bezier," the flap bit of point $B_1$ is set to "off," the code of the $B_2$ point is set to "Next," the flap bit of the $B_2$ point is set to "off," the code of the $B_3$ point is set to "Next," and the flap bit of the $B_3$ point is set to "off."

The system then goes to the Out Buf subroutine in step 575f for each of the points $B_1$, $B_2$, and $B_3$. After executing the subroutine three times, the system goes to step 560 to set the side flag to visible.

Next, the system goes to step 562 and determines whether the stack is empty. If the stack is not empty, the system pops whatever is on top of the stack off in step 563. The system then goes back to step 509a and proceeds as set forth above.

At step 562, if it is found that the stack is empty, the system jumps to step 564 to determine whether the side flag is set to "Invisible" and, at the same time whether the $B_3$ point is visible. If the answer to the test is no, the system jumps to step 566 and sets the flap bit of the point stored as $R_B$ equal to the $B_3$ flap bit. Then, the system returns to the calling routine.

If the answer to the test in step 564 is yes, the system jumps to step 565 and sets the $B_3$ code to "Next," and the $B_3$ flap bit to "off." Then, the system jumps to the Out Buf subroutine in step 575d. After step 575d, the system executes step 566, as previously described.

The Get Stat subroutine as illustrated in FIG. 7J. In step 591, the system determines whether $B_0$ and $B_1$ and $B_2$ and $B_3$ are all visible (see FIG. 7H). If the answer is yes, the system proceeds to step 592 and the answer returned to the calling routine is "visible." The system then returns to the calling routine. If the answer to step 591 is no, the system proceeds to step 593.

In step 593, the system determines whether $B_0$, $B_1$, $B_2$, and $B_3$ are all invisible (see FIG. 7K). If the answer is yes, "invisible" status is returned to the calling routine in step 594; and the system then returns to the calling routine.

If the answer is no, status "split" is returned to the calling routine in step 595, and the system returns back to the routine from which it was called.

The Binv subroutine 512 is illustrated in FIG. 7K. This subroutine determines whether a vector is invisible. The evaluation of whether a vector $R_0$ is invisible is a Boolean function which determines if the control point of a Bezier curve is invisible. The invisibility determination is slightly different from the visibility function (see FIG. 7H) in order to make the curves converge.

The invisibility determination is different for each of the clipper cards 205-209. For for the D clipper (clipper card 205), it must be determined that the Z component of the R vector ($R_z$) is less than D+Epsilon, where Epsilon is a small number (such as, for example, 4). For the +A Clipper, $R_x$ must be greater than $R_z$*Alpha—Epsilon, where Alpha=(A/D). For the −A Clipper, $R_x$ must be less than $-R_z$*Alpha+Epsilon. For the +B Clipper, $R_y$ must be greater than $R_z$*Beta−Epsilon, where Beta=(B/D). For the −B Clipper, $R_y$ must be less than $-R_z$*Beta+Epsilon.

The Split it subroutine 513 is depicted in FIG. 7L. This subroutine requires the Vectors $B_0$, $B_1$, $B_2$, and $B_3$; two other sets of vectors ($L_0$, $L_1$, $L_2$, and $L_3$ and $R_0$, $R_1$, $R_2$, and $R_3$), are derived.

First, in step 514, a new vector M is determined. Vector M equals vector $B_1+B_2$, divided by two. Second, vector $B_0$ is copied to vector $L_0$. Vector $L_1$ is Vector $B_0+B_1$, divided by 2. Vector $L_2$ is found by taking vector $L_1$+vector M, and dividing by two. Vector $R_3$ equals Vector $B_3$. Vector $R_2$ is $B_2+B_3$, divided by two. Vector $R_1$ is vector $M+R_2$, divided by two. The vector $R_0$ is found by taking the quantity vector $L_2+R_1$ and dividing by two. Vector $L_3$ equals vector $R_0$.

After performing all of the above calculations, the system then returns to the calling subroutine.

The Out Buf subroutine 575, is shown in FIG. 7M. First, in step 576 it is determined whether Edge Mode is on. If the answer is yes, the system goes to step 581 and determines whether the Any Output flag is set. If the flag is set, the system jumps to step 583, discussed below. If the Any Output flag is not set, the system jumps to step 582. There, the Any Output flag is set, and the code of point $R_0$ is set to "First."

In step 583, set the face visible and the flap bits of the $R_0$ Vector are set to off. The system then jumps to the Out Point subroutine in step 570c (see FIG. 7N). After step 570c, the system returns to where the Outbuff subroutine was called from.

Back step 576, if the Edge Mode is not on, the system jumps to step 577. In step 577, the Any Output flag is again checked to see if it is on or off. If it is off, the system jumps to step 578 and sets the Any Output flag to true and the code of point $R_B$ to "FIRST." A jump is then made to step 580.

In step 577, if the Any Output flag is on, the system goes to step 570 to jump to the Out Point subroutine with the Vector $R_B$ as the point of evaluation.

Returning from the Out Point subroutine, go to step 579 and put the code of the Vector $R_0$ into the $R_B$ code storage location. From step 579, the system jumps to step 580.

In Step 580, the flap bit of the $R_0$ point becomes the flap bit for the $R_B$ point. Face Visible bit of $R_0$ becomes the face visible bit for $R_B$. Then, vector $R_0$ is placed into the $R_B$ storage location, that is, this means all three vector components $R_{ox}$ $R_{oy}$ and $R_{oz}$ are stored in the respective $R_B$ locations $R_{Bx}$, $R_{By}$, and $R_{Bz}$. Next, the system returns to where the Out Buf subroutine was called from.

The Out Point subroutine is illustrated in FIG. 7N. In step 571, the flap bit, face visible bit, and code previously stored for the $R_0$ vector are combined as parameters to form a Point Command (called Command C). Then, in step 572, a Command C is output then $R_{oz}$, $R_{ox}$, $R_{oy}$ (the components of vector $R_0$) are output. The subroutine then returns to wherever it was called from.

It is apparent that the components which form clipper cards 205-209 could be programmed using any suitable technique to accomplish the functions described above. An example of one suitable set of microcode instructions which may be used to program the clipper cards 205-209 is set forth in several Appendices. The microcode for clipper card 205 is set forth in Appendix F. The microcode for clipper card 206 is set forth in Appendix G. The microcode for clipper card 207 is set forth in Appendix H. The microcode for clipper card 208 is set forth in Appendix I. The microcode for clipper card 209 is set forth in Appendix J. Appendix A illustrates a bit description map which references each line of the microcode of Appendices F-J to the particular location in the microcode PROMs U14-2-U149 and U151-U153 (see FIG. 3B) at which the microcode is stored. Thus, in order to make and use the clipper cards 205-209 in accordance with the presently preferred embodiment of the present invention, one need only connect the clipper IC's using the pin connections as shown in FIG. 3B, and then encode the PROMs U142-U149 and U151-U153 using the appropriate microcode of Appendices F-J, which is encoded in the PROMs as set forth in the bit description map of Appendix A.

H. Viewport Card

Viewport card 210 has the general configuration of the basic pipeline card of FIG. 3. However, viewport card 210 does not include the following components: twister 236, X RAM 244, sine/cosine input 258, stack 260, data PROM 266, secondary input latch 268, and secondary input handshake 270.

Viewport Card 210 receives data representing 3D points clipped to the inside of the viewing frustum. The card outputs 2D points lying on the "screen," or within a specific viewport on the screen.

It is apparent that the components which form viewport card 210 could be programmed using any suitable technique to accomplish the functions described above. An example of one suitable set of microcode instructions which may be used to program viewport card 210 is set forth in Appendix K. Appendix A illustrates a bit description map which references each line of the microcode of Appendix K to the particular location in the microcode PROMs U142-U149 and U151-U153 (see FIG. 3B) at which the microcode is stored. Thus, in order to make and use viewport card 210 in accordance with the presently preferred embodiment of the present invention, one need only connect the viewport IC's using the pin connections as shown in FIG. 3B, and then encode the PROMs U142-U149 and U151-U153 using the microcode of Appendix K, which is encoded in the PROMs as set forth in the bit description map of Appendix A.

I. Exploder Card

Exploder card 211 has the general configuration of the basic pipeline card of FIG. 3. However, exploder card 211 does not include the following components: twister 236, multiplier 248, X RAM 244, shifter 252, sine/cosine input 258, constants PROM 254, latch 256, data PROM 266, secondary input latch 268, and secondary input handshake 270.

This card performs two unrelated functions: it explodes curves into segments, and performs the Vector Hit Test.

Exploder card 211 takes the points in the data stream it recognizes as curves and explodes these points into straight line segments which are short enough so the segments appear smoothly curved on the screen after scan conversion. Points which are recognized as straight edges in the data stream are passed through by exploder card 211. Data recognition in the point stream is done by means of the "Code" which is attached to each point in the data stream.

During a Vector Hit Test the viewing window is made very small and positioned over a selected position. If a point comes through viewport card 211 to exploder card 212, a "hit" is registered. On the other hand, if the clippers have clipped everything away, no points will reach exploder card 211 and no hit is registered.

Figure 8A:
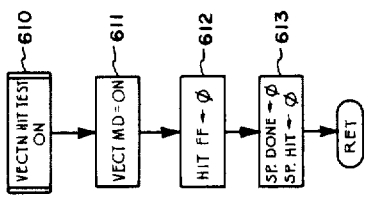
FIGS. 8A-8E are flow charts illustrating various subroutines of the exploder card program.
Figure 8B:
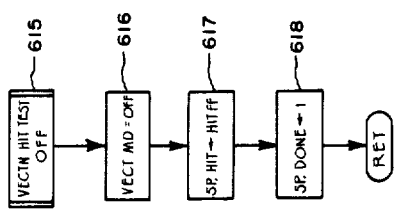
Figure 8:
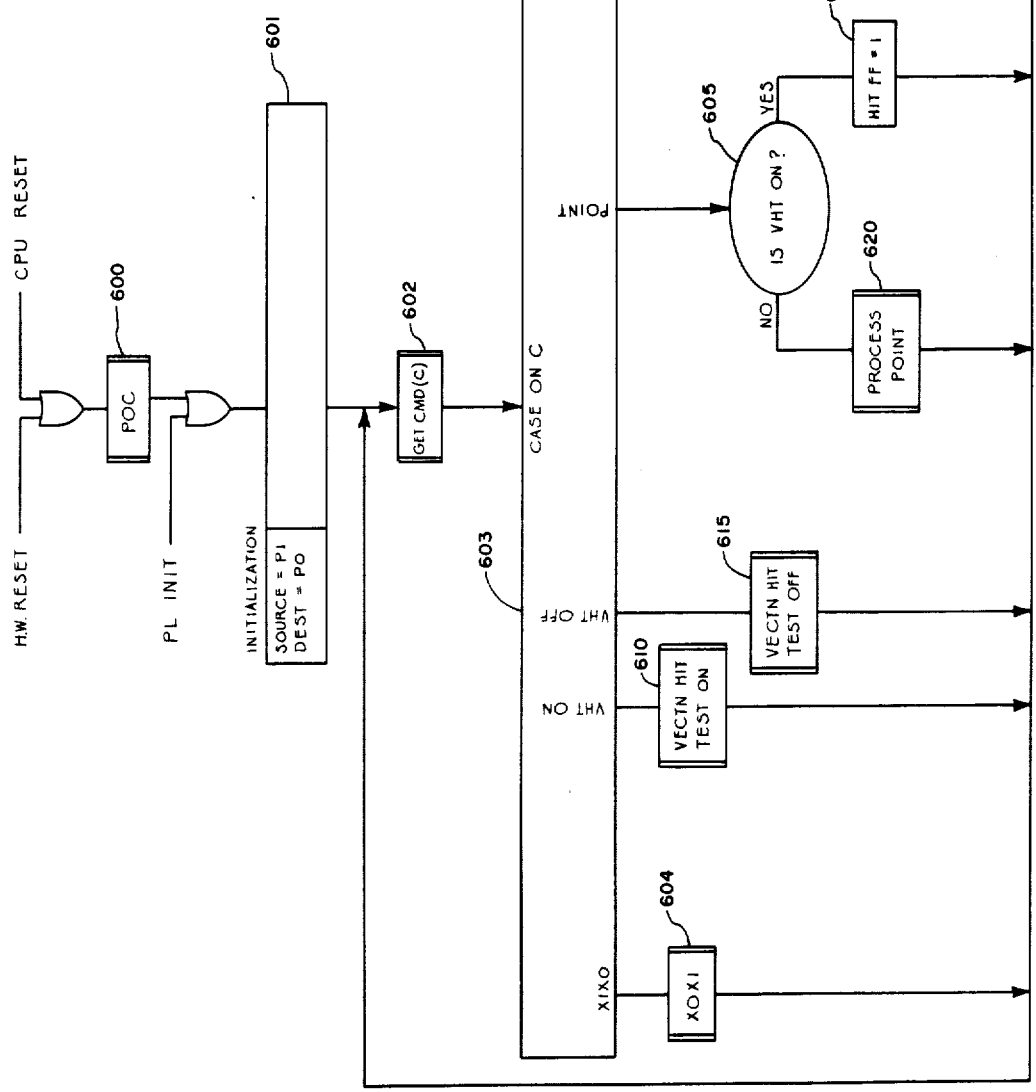
FIG. 8 is a general flow chart illustrating the processing program used by the exploder card of the pipeline.

FIG. 8 is an overall flow chart that shows the subroutines that will be described in detail.

Either a hardware reset or a CPU reset causes a jump to the POC subroutine 600. The next step down 601 shows that Pipeline Init (PL INIT) as well as the other two resets will cause an initialization of the registers and the card.

From there, a jump is made into the Get Command subroutine 602. After the command is obtained, it is tested and a jump is made to the particular subroutine 603 called for by the command. The jump can go either to the XIO, Vector Hit On, Vector Hit Off, or the Point subroutine. If the command is other than the above, the routine will jump to a pass through subroutine 607 to pass the command to the next card.

If the command is for a point subroutine 603, a test will be made first to see if the Vector Hit Test is on. If it is not, the routine will jump to Process Point 620. If the Vector Hit Test is on, the Hit flip-flop is set in step and control is passed to the Get Command subroutine 602.

The Vector Hit Test On subroutine 610 is illustrated in FIG. 8A. This subroutine first turns the Vector Hit Test mode in step 611, clears the hit flip-flop in step 612, then sets the Status Port Done bit to 0 and the Status Port Hit bit to 0 in step 613. A return is then made to the calling routine.

The Vector Hit Test off subroutine 615 is shown in FIG. 8B. Then, the hit flip-flop is set in step 617, and the Status Port Done bit is turned on in step 618.

Figure 8C:
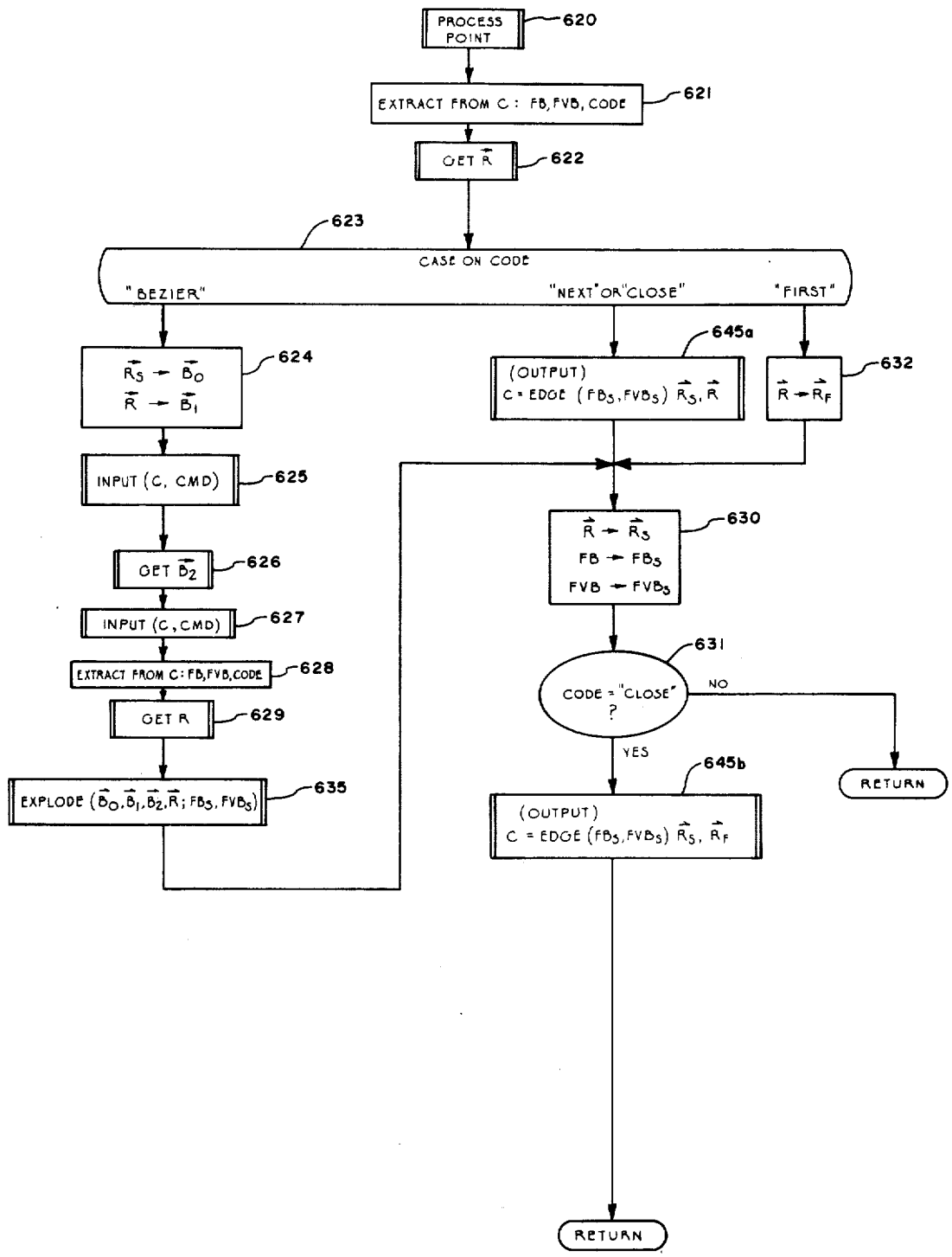

The Process Point subroutine 620 is illustrated in FIG. 8C. Step 621, the Flap Bit, Face Visible Bit and Code are extracted from the command and stored by the Process Point subroutine. In step 622, the Vector R is brought in with the Point Command is then examined in step 623. A conditional jump based on the code of the command is then made.

If the code is Bezier, jump to step 624 on the left side of the flow chart. A point previously stored in $R_S$ is put into $B_0$. The current Vector R is then put in to $B_1$. Then in step 625, another command with vector is retrieved and placed into the $B_2$ storage location in step 626. In step 627, a third command and the associated vector is then retrieved. From that command, the Face Visible bit, the Flap bit and the Code are extracted (step 628) and stored in Location $B_3$ and R (step 628). A Jump is then made to the Explode subroutine (step 635). After returning from the Explode subroutine, jump to step 630.

At step 630, the R point (R vector) is transferred to the $R_S$ storage location. The Flap bit is stored in the S Flap bit ($FB_S$) storage location and the Face Visible bit in the S Face Visible bit ($FVB_S$) storage location. A jump is then made to step 631. In step 631, the code is tested to see if it is a close code. If the answer is No, return to the calling subroutine. If the answer is Yes, jump to step 645b.

Step 645b is the output of an edge. An edge runs from $R_S$ to $R_F$ or from the current point ($R_S$ to the First Point ($R_F$), with the $R_S$ Flap and Face Visible bits. After outputting this edge, we return to the calling subroutine.

Back up to step 623, if the point has a "Next or Closed" code associated with it, a jump is made to step 645, the output subroutine. An edge is output that goes from the $R_S$ point to the current point or the current vector R, with the Flap bit and the Face Visible bit that are associated with the $R_S$ point. A jump is then made to step 630 and the subroutine continues as described above.

Back to step 623 again, if the point were "First," a jump is made to step 632 and the current vector R is placed in the $R_F$ (or First Point) storage locations. The routine then jumps to step 630 and continues as described above.

Figures 8D, 8E:
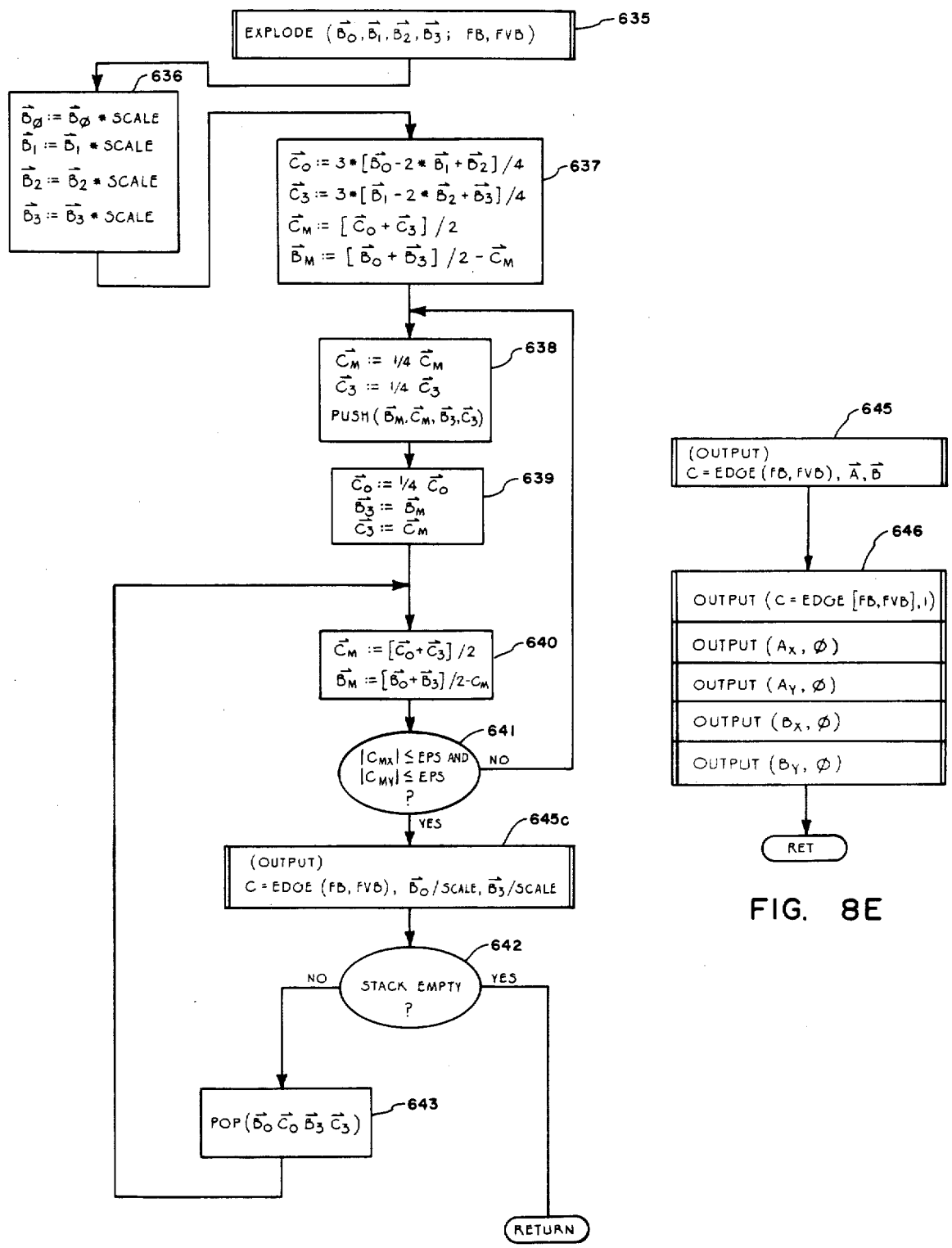

The Explode subroutine is illustrated in FIG. 8D. The subroutine is entered with $B_0$, $B_1$, $B_2$, and $B_3$ vectors, together with a Flap bit, and Face Visible bit.

First, a jump is made to step 636, where Vectors $B_0$, $B_1$, $B_2$ and $B_3$ are multiplied by a scale factor, such as, for example, 2. A jump is then made to step 637, where Vector $C_0$ is calculated. This means that both the X and the Y components of the Vector $C_0$ will be calculated. To calculate $C_0$:

$$C_0 = \frac{3 * (B_0 - 2 * B_1 + B_2)}{4}$$

Next, $C_3$ is calculated:

$$C_3 = \frac{3 * (B_1 - 2 * B_2 + B_3)}{4}$$

The Vector $C_M$ is now calculated:

$$C_m = \frac{(C_0 + C_3)}{2}$$

The Vector $B_M$ is now calculated:

$$B_m = \frac{(B_0 + B_3)}{2} - C_M$$

A jump is now made to step 638. The vector $C_M$ is divided by four ($\frac{1}{4} C_M$) and placed back into $C_M$. The value currently in vector $C_3$ is also divided by four ($\frac{1}{4} C_3$) and placed back in the $C_3$ storage location. The vectors $B_M$, $C_M$, $B_3$, and $C_3$ are then pushed onto the stack and a jump is made to step 639. In step 639 the vector $C_0$ is divided by four ($\frac{1}{4} C_0$) and placed back into the storage location for $C_0$. The vector $B_M$ is placed into the storage location for $B_3$. The vector $C_M$ is placed into the storage location for $C_3$. A jump is then made to step 640.

In step 640, a new value for Vector $C_M$ is calculated. That calculation is:

$$C_m = \frac{(C_0 + C_3)}{2}$$

The new Vector $B_M$ is also calculated:

$$B_m = \frac{(B_0 + B_3)}{2} - C_M$$

A jump is made now to step 641 for two tests. They are:

Is $C_{MX} \leq$ (Epsilon).

and:

Is $C_{MY} \leq$ (Epsilon), where Epsilon is, for example, zero.

The Vector $C_M$ is actually the curvature of the middle of a line segment and has two components, $C_{MX}$ and $C_{MY}$. The curvature of a line segment is being tested to see if it is flat enough to output and make the curve look smooth.

If the answer to the Boolean expression in step 641 is No, a jump is made to step 638 and the system continues down to steps 639, 640 and 641.

If the answer to the question in step 641 is Yes, a jump is made to step 645C. This step is a jump to the Output subroutine to output an edge from vector $B_0$ to vector $B_3$, but the values in $B_0$ and $B_3$ must be first divided by the scale factor.

After the edge is output, a jump is made to step 642 and a test made to see if the stack is empty. If the stack is empty, jump to the calling subroutine. If the stack is not empty in step 642, jump to step 643 to pop the vectors $B_0$, $C_0$, $B_3$, and $C_3$ off the stack, then jump back to step 640 and start the process again as described above.

The Output Edge Subroutine 645 is illustrated in FIG. 8E. In step 646, an edge command is output with the appropriate Flap and Face Visible bits. Then the X value of the first end point is output, together with the Y value of the first end point. The X value of the second end point and the Y value of the second end point are then output. A return to the calling routine is then made.

It is apparent that the components which form exploder card 211 could be programmed using any suitable technique to accomplish the functions described above. An example of one suitable set of microcode instructions which may be used to program exploder card 211 211 is set forth in Appendix L. Appendix A illustrates a bit description map which references each line of the microcode of Appendix L to the particular location in the microcode PROMs U142-U149 and U151-U153 (see FIG. 3B) at which the microcode is stored. Thus, on order to make and use exploder card 211 in accordance with the presently preferred embodiment of the present invention, one need only connect the exploder IC's using the pin connections as shown in FIG. 3B, and then encode the PROMs U142-U149 and U151-U153 using the microcode of Appendix L, which is encoded in the PROMs as set forth in the bit description map of Appendix A.

J. Incremental Form Card

Incremental form card 212 has the general configuration of the basic pipeline card of FIG. 3. However, the incremental form card 212 does not include the following components: X RAM 244, sine/cosine input 258, stack 260, secondary input latch 268, and secondary input handshake 270.

The basic input to the Incremental Form card is pairs of points. Each pair of points defines an edge. The card converts this description of an edge to "incremental form," which is an alternate description of the same edge more appropriate for scan conversion. The basic output of the card is edges stored in incremental form.

The card has two other major functions. If the card is put into "vector mode" (by an appropriate command), it converts each incoming pair of points into a thin rectangle roughly two pixels wide. This rectangle is output as four edges in incremental form. This thin rectangle is the "vector."

The other major function of the card is "flapping." If an incoming edge has a certain flapping bit set, the edge is translated slightly (about one pixel) in a direction perpendicular to itself and toward the outside of the graphic figure. This little extension is the "flap," added in effect, to an edge. The purpose of the flap is to give the adjoining graphic figure a good "background" for anti-alias action in scan converter 820 (see FIG. 1).

Figure 9:
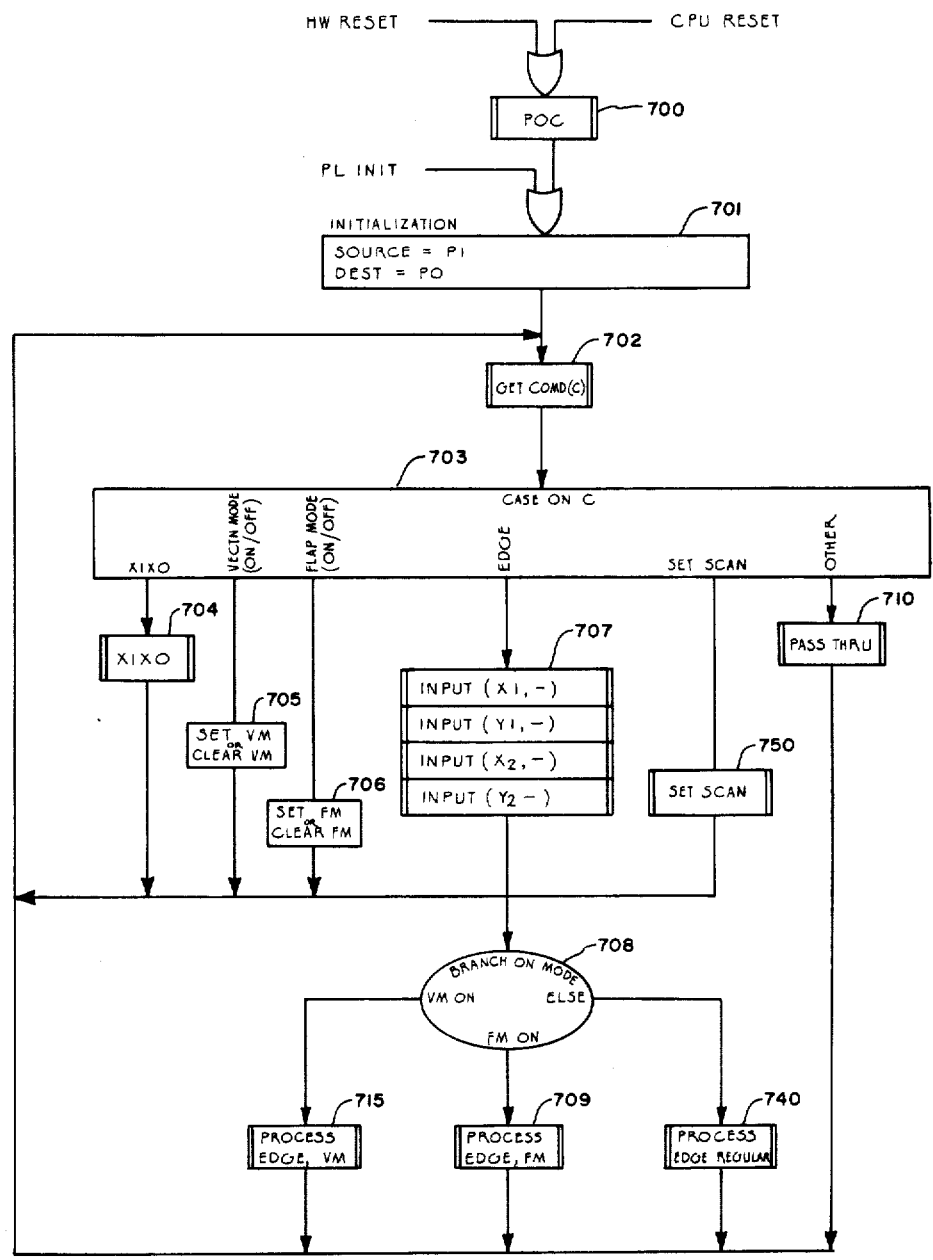
FIG. 9 is a general flow chart illustrating the processing program used by the incremental form card of the pipeline.
Figure 9A:
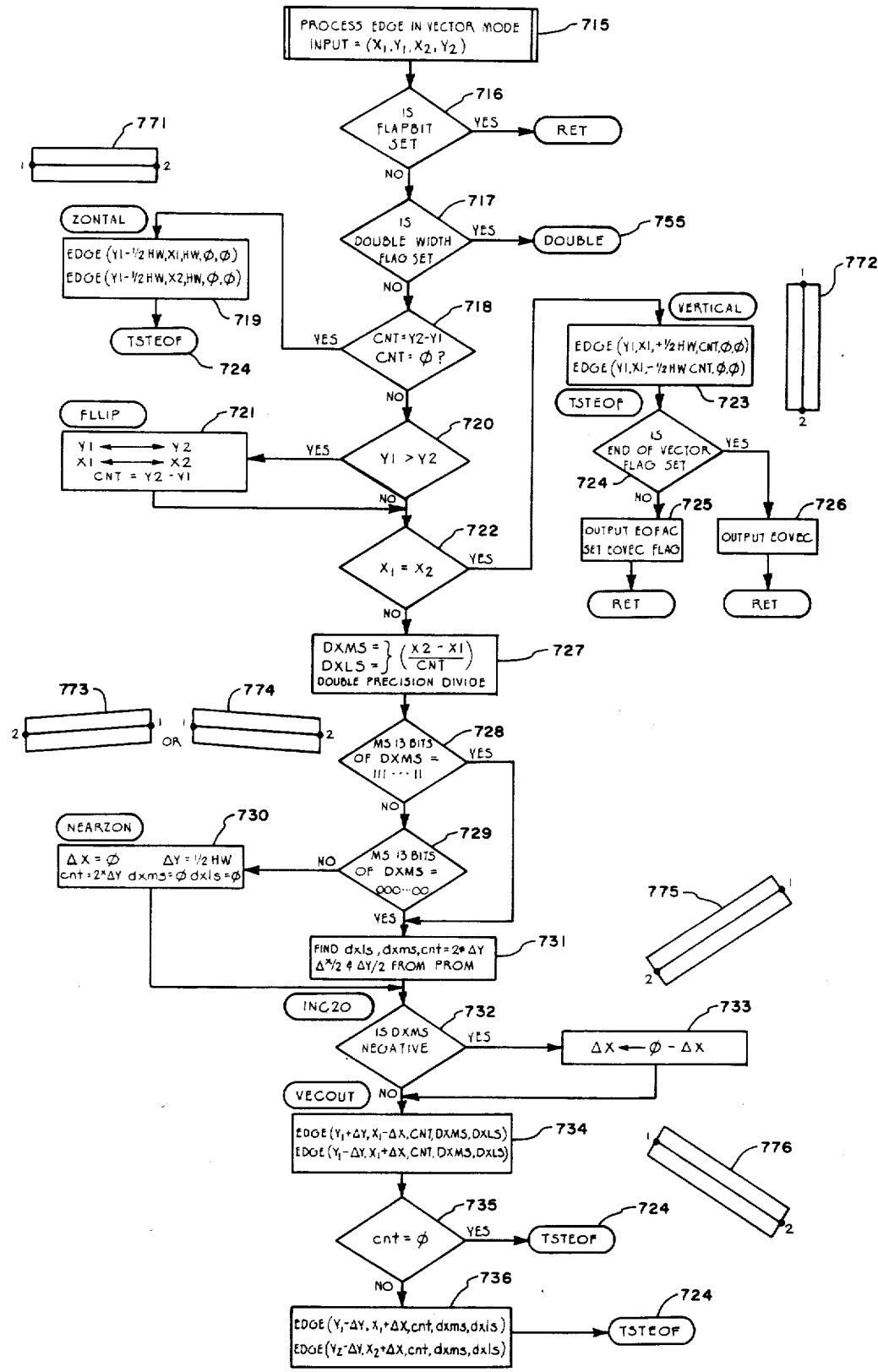
FIGS. 9A-9D are flow charts illustrating various subroutines of the incremental form card program.
Figure 9B:
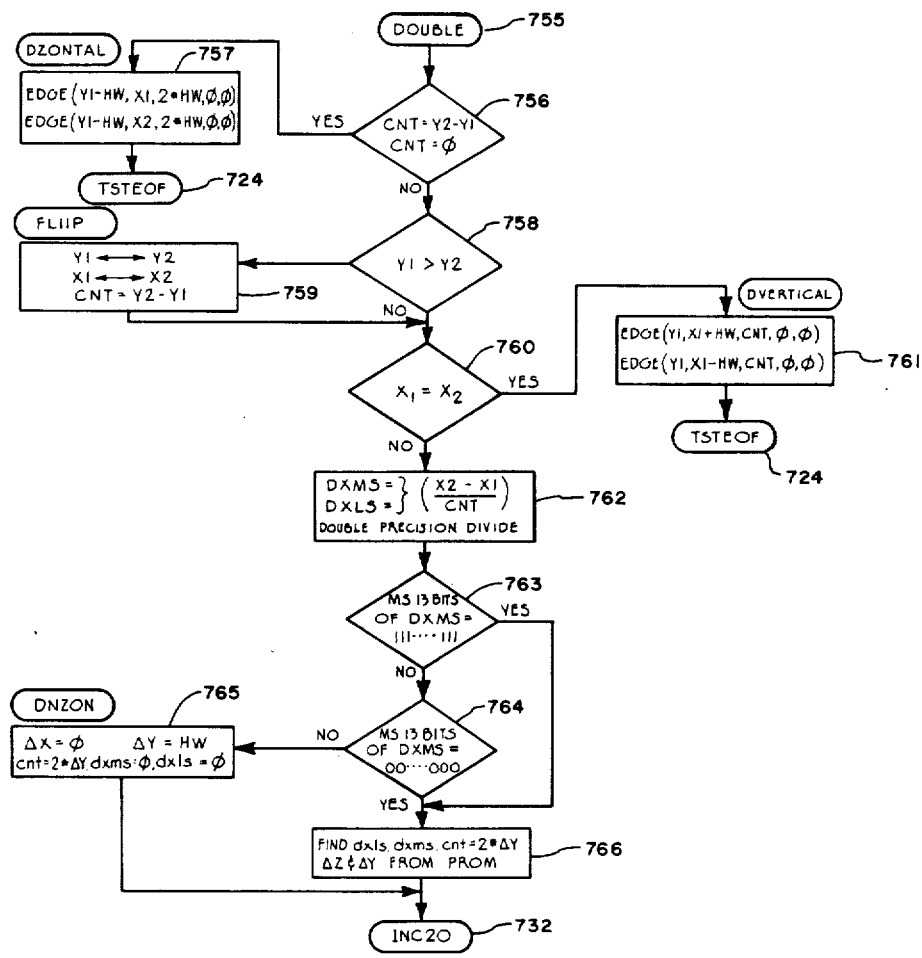
Figures 9C, 9D:
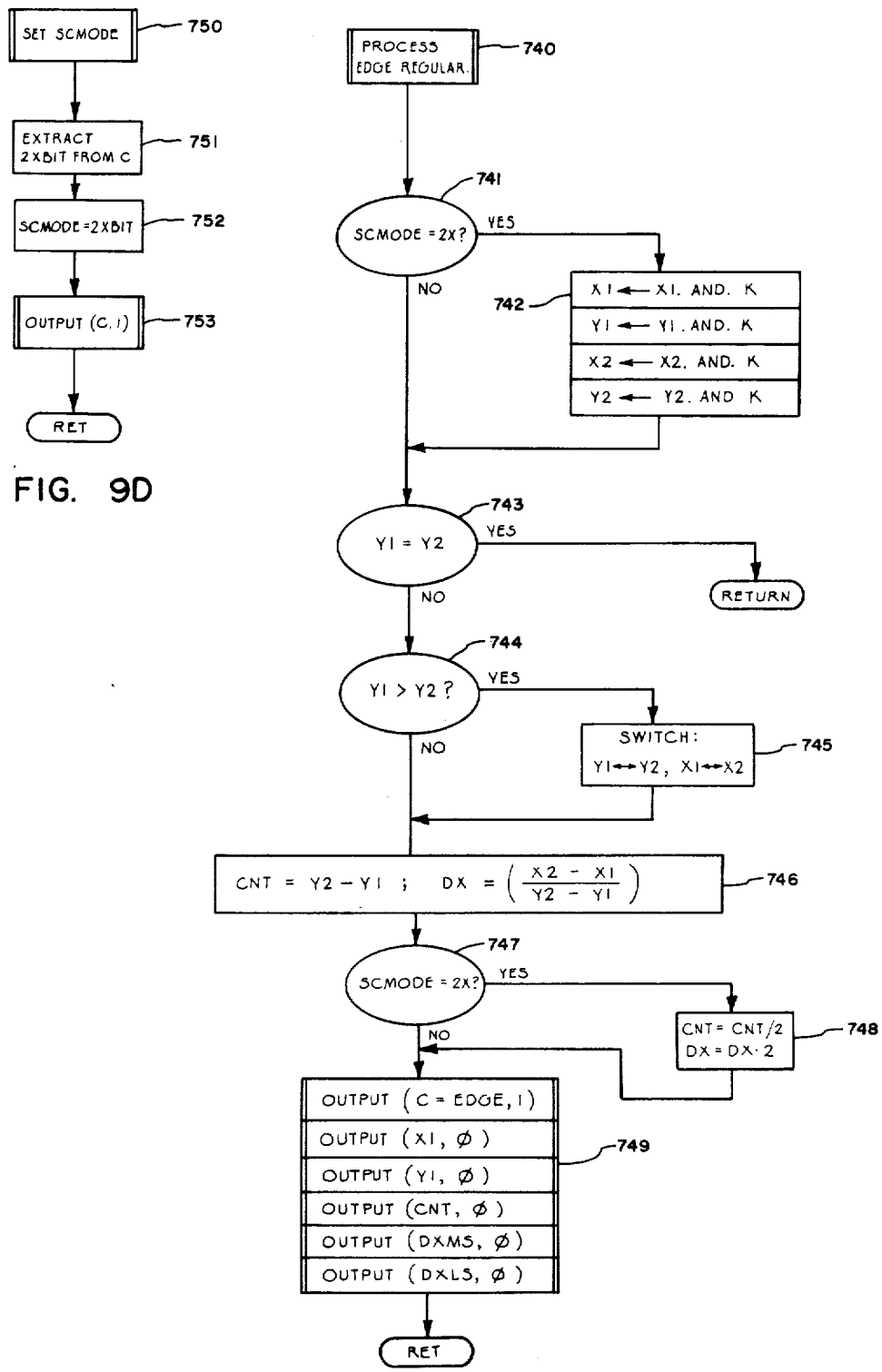

Reference is next made to FIGS. 9-9D which illustrate the operation of incremental form card 212 in more detail.

The chart illustrated in FIG. 9 shows that either a hardware reset or a CPU reset will cause the program to go into the POC subroutine 700. A Pipeline Init (PL INIT) or one of the above resets will then cause the card to go into the initialization routine 701. The Get Command subroutine 702 is then entered, and a jump made to a subroutine dependent on the command received. The possibilities are:

the change input/output command which will cause a jump to the XIXO subroutine 704, the Vector Mode command which can either set or clear the Vector Mode Flag (step 705), the Flap Mode command which can either set or clear the Flap Mode Flag (step 706), the Set Scan Mode command which will cause a jump to the Set Scan subroutine 750 to set the scan to the 2X or 4X mode, or an Edge command.

If the command is not one of the above, it is assumed to be a command for another board and the Pass Through subroutine 710 is called to pass the command through the card.

When any of the subroutines are completed, the program returns back to the Get Command subroutine 702.

When an edge command is input to the card, X1, Y1, X2, Y2 are input (step 707). The valves are the two end points of an edge or a line segment. X1, Y1 is one end point; X2, Y2 is the other end. After inputting the edge, the routine goes to a Branch on Mode point 708. The mode is checked to see if it is Vector Mode, Flap mode or neither. If the Vector mode (VM) flag is on, a jump is made to a subroutine that processes the edge for Vector mode (step 715). If the Flap mode (FM) flag is on, the edge is processed by a routine called the Process Edge in Flap Mode (step 709). If not in either mode, the regular mode must be in effect, so the edge is processed by a third routine called Process Edge Regular (step 740).

The process Edge in Vector Mode subroutine 715 is illustrated in FIG. 9A. The output edges of this subroutine are of the format: (Y, X, Cnt, DXMS, DXLS), where Cnt is the count number and DXMS, DXLS are the most significant and least significant slope numbers.

In step 716, of the Process Edge in Vector Mode subroutine, is a test to see if the Flap bit is set. If the answer is Yes, a return is made to the Get Command subroutine 702 and the vector is discarded. If the answer is No, a jump is made to step 717 and a test is made to see if a single-width or double-width vector is being made.

If it is double-width, a jump is made to the double-width routine 755 (see FIG. 9B). If No, a jump is made to step 718. In step 718, the count (CNT) is computed, which is Y2−Y1, then the result is checked to see if it is zero (0). If the answer is Yes, the edge is horizontal; a jump is made to step 719, which is called the Zontal subroutine. The subroutine outputs two edges. The first edge is:

Edge(Y1−½ HW, X1, HW, 0, 0)

(Y1−½ of the vector width desired for output, X1, then the full width of the vector for output for CNT, and a zero, and a zero for the two slope numbers.)

The second edge to be output will be:

Edge(Y1−½ HW, X2, HW, 0, 0)

After step 719, a jump is made to step 724 where a test is made to see if the End of Vector flag is set. If the answer is Yes, and End of Vector (EOVEC) command is output 726 and a return is made to the Get Command subroutine 702. If the answer is No, an End of Face command is output 725 and the End of Vector Flag is set (step 725) and a jump is made to the Get Command routine 702.

In step 718, if the answer to "Count equal to 0?" (Cnt=0?) is No, jump to step 720 and test to see if Y1 is greater than Y2. If the answer is Yes, go to step 721 and interchange X1 and X2, then Y1 with Y2 and recompute the count with the new Y2 minus the new Y1. Jump to step 722 to continue processing. If the answer in step 720 is No, a jump is made immediately to step 722.

In step 722, a test is made to see if X1 is equal to X2. If the answer is Yes, jump to step 723 and output two edges. The first edge is:

Edge(Y1, X1+½ HW, CNT, 0, 0)

The second Edge is:

Edge(Y1, X1−½ HW, CNT, 0, 0)

A jump is then made to step 724 to complete the processing.

If the answer to the question step 722 is No, a jump is made to step 727. The slope numbers (DXMS, DXLS) are computed by:

$$DX = \frac{X_2 - X_1}{Cnt}$$

The slope is adjusted to two words, a format convention between the output of the Incremental Form card and the input requirements of the Scan Line Processor section.

After this operation, jump to steps 728 and 729 to test to see if the slope is nearly horizontal.

If the answer is Yes, jump to step 730 and set Delta X=0, Delta Y=½ vector width, and count=2 * Delta Y. The count is the count of the End Cap (cnt) and dxms=0 and dxls=0. DXMS, DXLS are for the long edges of the vector and dxms, dxls are for the end caps. A jump is then made to step 732.

If the answer in step 729 is that the edges are not nearly horizontal, jump to step 731 and calculate the values for dxms and dxls by use of a PROM look-up table. The count for the end caps will be set at 2 * Delta Y. The Delta Y and Delta X obtained from the PROMs is divided by two.

A Jump is then made to step 732 to test for a negative slope of the long side of the vector. If the answer is Yes, the sine of Delta X found from the look-up PROM table is changed by subtracting Delta X from zero in 733. A jump is then made to step 734. If the answer is No in step 732, jump to step 734 immediately and output the two long edges of the vector. The Y value for the first of the two long edges is Y1+Delta Y. The X value is X1−Delta X. There is the count number for the long edge (CNT), and the two slope numbers for the long edge, DXMS and DXLS. The second edge output will be Y1−Delta Y. The X value is X1+Delta X, along with the count value for the long edges and the two slope numbers for the long edges. A jump is then made to step 735.

In step 735 a test is made to see if the count number for the end cap is zero. If the answer is Yes, a jump is made to step 724 to complete the processing. If the answer is No, go to step 736 to output the line segments for the two end caps. The first edge output is 41−Delta Y; X1+Delta X; the count for the end cap (cnt) and the two slope numbers for the end cap (dxms, dxls). The next edge output is Y2−Delta Y; X2+Delta X; the count for the end cap and the two slope numbers for the end cap. A jump is then made to step 724 to complete the processing as described before.

The subroutine illustrated in 9B was accessed from step 717 if the Double flag was set.

Entering the Double subroutine at step 756, the count number of the long line segments is calculated as Y2−−Y1. The count is tested for a 0 result.

If the answer is Yes, a jump is made to step 757 to output two edges. The first is:

Edge(Y1−HW, X1, 2 * HW, 0, 0)

The second edge output is:

Edge(Y1−HW, X2, 2 * HW, 0, 0)

(HW=vector width.) A jump is then made to step 724.

In step 756, if the answer to Cnt=0 is No, go to step 758.

In step 758, test whether Y1 is greater than Y2 (Y1->Y2). If the answer is Yes, exchange Y2 and Y1 (step 759), X2 and X1 and compute a new count (CNT) which is the new Y2 minus the new Y1 and jump to step 760. If the answer to step 758 (Y1 Y2) is No, jump directly to step 760.

In step 760, X1 is tested to see if it is equal to X2. (X1=X2). If the answer is Yes, jump to step 761 and output two edges. The first edge is:

Edge(Y1, X1+HW, Cnt, 0, 0)

The second edge is:

Edge(Y1, X1−HW, Cnt, 0, 0)

A jump is then made to step 724 to complete the computation.

If in step 760, the answer to X1=X2 is No, jump to step 762 and compute the slope numbers for the long side by:

$$DX = \frac{(X2 - X1)}{Cnt}$$

After this operation, go to step 763 and then 764 to determine if this slope about to be output is very near horizontal or close enough to horizontal for our purposes.

If the answer is Yes, go to step 765 and set delta X=0; Delta Y=HW (the value derived from PROM). The count for the end caps is 2 * Delta Y and the slope numbers for both end caps are set to zero. A jump is then made to step 732.

In steps 763 and 764, if the answer is No, go to step 766 and perform a calculation to derive values for the two slope numbers (dxms and dxls) for the end cap. The count for the end cap 2 * Delta Y is obtained from the PROM. Jump to step 732.

The regular mode edges subroutine 740 is illustrated in FIG. 9C. In step 741, a test is made to see if the scan mode has been set to 2X or 4X mode. If in 2X mode, jump to step 742. If the answer for the test for scan mode is 4X mode, jump directly to step 743.

In step 742, the values for X1, Y1, X2, and Y2 are AND'ed (logically), one at a time, with a constant to truncate the least significant bit and then store each back into the appropriate storage location, i.e., X1, Y1, X2, and Y2. A jump is then made to step 743.

In step 743, a test is made for Y1=Y2? if the answer is Yes, the edge is horizontal and the scan converter will ignore it and the edge is discarded. The subroutine then returns to the Get Command routine. If the answer is No, jump to step 744, where a test is made to see if Y1>Y2? If no, jump to step 746. If Yes, jump to step 745 to interchange the values Y1 and Y2 and also interchange the values X1 and X2.

A jump is then made to step 746. The count number is computed in step 746, which is Y2−Y1. The two slope numbers (DXLS and DXMS) are then computed by:

$$DX = \frac{X2 - X1}{Y2 - Y1}$$

The result is adjusted into two output words as before.

A jump is then made to step 747 and a test made to see if the Scan mode is 2X.

If the answer is No, jump to step 749.

If the answer is Yes, Jump to step 748 and set the new count number equal to half of the count number just computed in step 746. Both slope numbers (DXLS and DXMS) are also doubled at this point and a jump is made to step 749 to output an edge. The edge is:

Edge(X1, Y1, Cnt, DXLS, DXMS)

The Cnt, DXLS, DXMS values are those just computed. A return is then made to the Get Command subroutine 702.

The Set Scan routine 750 is illustrated in FIG. 9D. This routine first examines a bit in the command word (step 750) to determine if the mode is 2X or 4X. If in 2X mode, set the 2X Scan mode flag and output the command for use of succeeding cards in the system. If in 4X mode, the Scan mode flag is set to the 4X condition and the command is output (step 753).

It is apparent that the components which form incremental form card 212 could be programmed using any suitable technique to accomplish the functions described above. An example of one suitable set of microcode instructions which may be used to program incremental form card 212 is set forth in Appendix M. Appendix A illustrates a bit description map which references each line of the microcode of Appendix M to the particular location in the microcode PROMs U14-2-U149 and U151-U153 (see FIG. 3B) at which the microcode is stored. Thus, in order to make and use incremental form card 212 in accordance with the presently preferred embodiment of the present invention, one need only connect the incremental form card IC's using the pin connections as shown in FIG. 3B, and then encode the PROMs U142-U149 and U151-U153 using the microcode of Appendix L, which is encoded in the PROMs as set forth in the bit description map of Appendix A.

From the above discussion, it will be appreciated that the present invention provides a data processing pipeline system and method which minimizes the quantity of data which must be stored and processed. Since only a few control points need be processed and stored, the present invention significantly increases processing speed and saves on needed storage space. In addition, since the pipeline system and method of the present invention processes curves in the form of Bezier control points, the present invention also provides a data processing pipeline system and method for processing electronic representations of graphical illustrations which can clip the curved portions of such illustrations to a viewing frustum without converting said curved portions into numerous line segments. Additionally, since the pipeline system of the present invention uses a number of specialized, micro-programmed circuit cards, the present invention provides a data processing pipeline system and method which increases processing speed by processing control data points with significant reliance upon system hardware, rather than system software.

Further, the pipeline system and method of the present invention clips the Bezier control points of curves before such curves are exploded into numerous small line segments for display. Thus, the present invention provides a data processing pipeline for use in processing data points representing a graphical illustration which will produce an illustration with substantially smooth edges even though the illustration is enlarged on the viewing screen. Also, since the individual control points processed by the pipeline of the present invention are encoded, the present invention provides an automated graphics system which is capable of producing both solid figures and line drawings as part of a single illustration.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

APPENDIX A

MICROCODE MACRO DEFINITIONS

PL-4000

THE DEFAULT STATES ARE CIRCLED.

| ALU FUNCTION XX1 | | | |
|---|---|---|---|
| 1 | 2 | 3 | 4 |
| Cn | 15 | 14 | 13 |
| HEX | FUNCTION | | MNEMONIC |
| ⓪ | R+S | | RPS |
| 1 | S−R−1 | | SMRM1 |
| 2 | R−S−1 | | RMSM1 |
| 3 | RVS | | ROS |
| 4 | RAS | | RAS |
| 5 | R̄AS | | RBAS |
| 6 | RVS | | RXOS |
| 7 | R̄VS | | RXOSB |
| 8 | R+S+1 | | RPSP1 |
| 9 | S−R | | SMR |
| A | R−S | | RMS |
| B | | | ROS |
| C | | | RAS |
| D | | | RBAS |
| E | | | RXOS |
| F | | | RXOSB |

| ALU SOURCE XX2 | | |
|---|---|---|
| 5 | 6 | 7 |
| 12 | 11 | 10 |
| HEX | R | S | MNEMONIC |
| 0 | A | Q | RS.AQ |
| 1 | A | B | RS.AB |
| 2 | O | Q | RS.ZQ |
| 3 | O | B | RS.ZB |
| 4 | O | A | RS.ZA |
| 5 | D | A | RS.DA |
| 6 | D | Q | RS.DQ |
| ⑦ | D | O | RS.DZ |

| ALU DESTINATION XX3 | | | |
|---|---|---|---|
| 8 | 9 | | 10 |
| 18 | 17 | | 16 |
| HEX | LOAD | Y | MNEMONIC |
| ⓪ | F→Q | F | WFQ.F |
| 1 | NOTHING | F | NOP.F |
| 2 | F→B | A | WFB.A |
| 3 | F→B | F | WFB.F |
| 4 | F/2→B Q/2→Q | F | SRQ.F |
| 5 | F/2→B | F | SR.F |
| 6 | 2F→B 2Q→Q | F | SLQ.F |
| 7 | 2F→B | F | SL.F |

| ALU RAM A PORT ADDRESS XX4 | | | |
|---|---|---|---|
| 11 | 12 | 13 | 14 |
| A3 | A2 | A1 | A0 |

| ALU RAM B PORT ADDRESS XX5 | | | |
|---|---|---|---|
| 15 | 16 | 17 | 18 |
| B3 | B2 | B1 | B0 |

| X RAM ADDRESS XX11 | | | |
|---|---|---|---|
| 27 | 28 | 29 | 30 |
| X RAM A3 | X RAM A2 | X RAM A1 | X RAM A0 |

| Y RAM ADDRESS X17 | | | |
|---|---|---|---|
| 45 | 46 | 47 | 48 |
| Y RAM A3 | Y RAM A2 | Y RAM A1 | Y RAM A0 |
| DEC | | REGISTER | |
| 0 | | R0 | |
| 1 | | R1 | |
| 2 | | R2 | |
| 3 | | R3 | |
| 4 | | R4 | |
| 5 | | R5 | |
| 6 | | R6 | |
| 7 | | R7 | |
| 8 | | R8 | |
| 9 | | R9 | |
| 10 | | R10 | |
| 11 | | R11 | |
| 12 | | R12 | |
| 13 | | R13 | |
| 14 | | R14 | |
| ⑮ | | R15 | |

| XX6 | |
|---|---|
| 19 | |
| CONDITION LATCH CLK | |
| HEX | CONDITION LATCH CLOCK |
| ⓪ | LATCH CPU CONDITIONS AT END OF CYCLE |
| 1 | HOLD PREVISION CONDITIONS |

| MULTIPLIER CLOCKS XX7 | | | |
|---|---|---|---|
| 20 | 21 | 22 | |
| MPY CLK X | MPY CLK Y | MPY CLK OUT | |
| CLOCK: MPYX, MPYY, MPYOUT | | | |
| CLK X | CLK Y | CLK OUT | MULTIPLIER CLOCKS FUNCTION |
| 0 | X | X | CLOCK IN X INPUT |
| X | 0 | Z | CLOCK IN Y INPUT |
| X | X | 0 | CLOCK RESULT OUT |
| ① | ① | ① | NORMAL |

| IN LINE LATCH CONTROL XX8 | | |
|---|---|---|
| 23 | 24 | |
| IN LINE LATCH LE | IN LINE LATCH/MPY OE | |
| HOLD: INLATCH | | |
| ENABLE: MPY | | |
| LE | OE | IN LINE LATCH CONTROL |
| 0 | X | LATCH DATA |
| ① | X | TRANSPARENT TO DATA |
| X | ⓪ | LATCH OE |
| X | 1 | MULTIPLIER OE |

X = DON'T CARE

| XX9 |
|---|
| 25 |
| X RAM WE |

| XX13 |
|---|
| 32 |
| Y RAM WE |

| X18 | |
|---|---|
| 49 | |
| STACK WE | |
| BIT | RAM WE FUNCTION |
| ⓪ | READ FROM RAM |
| 1 | WRITE TO RAM |

| XX12 | |
|---|---|
| 31 | |
| SEQUENCER RE/ | |
| LOAD: SEQR | |
| BIT | SEQUENCER REGISTER ENABLE |
| 0 | LOAD D INTO R |
| ① | HOLD CURRENT R CONTENTS |

| XX15 | |
|---|---|
| 35 | |
| DIV PROM UPPER/LOWER | |
| SELECT: DIVUP | |
| BIT | DIVIDE PROM A8 |
| ⓪ | LOWER HALF |
| 1 | UPPER HALF R |

| XX10 | | |
|---|---|---|
| 26 | | |
| X RAM OE/ | | |
| TRANSFER: MXIN | | |
| (See LOWER BUS ENABLE) | | |
| 4 | X RAM OE | MPY X FUNCTION |
| SEL | 0 | X RAM→LOWER BUS →MPYX |
| SEL | 1 | USELESS |
| NOT SEL | ⓪ | LOWER BUS→MPYX |
| NOT SEL | 1 | LOWER BUS →MPYX |

| MPY Y I/O CONTROL XX14 | | |
|---|---|---|
| 33 | 34 | |
| MPY YSEL A1 | MPY YSEL A0 | |
| (See LOWER BUS ENABLE) | | |
| 3 | HEX | MPY Y FUNCTION |
| SEL | 0 | LOWER BUS→MPY Y |
| SEL | 1 | Y RAM →LOWER BUS |
| SEL | 2 | MPY LS BYTE →LOWER BUS |
| SEL | 3 | DIVIDE PROM →LOWER BUS |
| NOT SEL | 0 | LOWER BUS →MPY Y |
| NOT SEL | 1 | Y RAM →MPY Y |
| NOT SEL | ② | |
| NOT SEL | 3 | DIVIDE PROM →MPY Y |

| BRANCH ADDRESS XX16 | | | | | | | | |
|---|---|---|---|---|---|---|---|---|
| 36 | 37 | 38 | 39 | 40 | 41 | 42 | 43 | 44 |
| NA8 | NA7 | NA6 | NA5 | NA4 | NA3 | NA2 | NA1 | NA0 |
| u STORE JUMP ADDRESS | | | | | | DEFAULT 0 | | |

X21
56 CONSTANT MUX SEL
SELECT: CONST
(See UPPER BUS ENABLE)

| | 7 BIT | CONSTANT MUX |
|---|---|---|
| SEL | 0 | CONSTANT |
| SEL | 1 | # OF PARAMETER WORDS |
| (NOT SEL) | ⊗ | NORMAL |

ADDRESS MODIFICATION SELECT X23

| 58 START ADDR S2 | 59 START ADDR S1 | 60 START ADDER S0 |
|---|---|---|
| | SELECT: ADDMOD | |
| HEX | START ADDR MODIFICATION | |
| 0 | NUMBER OF PARAMETERS | |
| 1 | COLOR | |
| 2 | MATRIX | |
| 3 | CODE | |
| ④ | NO MODIFICATION | |

LOWER BUS ENABLE X20

| 53 LOW BUS EN A2 | 54 LOW BUS EN A1 | 55 LOW BUS EN A0 |
|---|---|---|
| | SELECT: LOWBUS | |
| HEX | LOWER BUS DRIVER | |
| 0 | | |
| ① | 2901 | |
| 2 | TWISTER | |
| 3 | Y RAM XCEIVER | |
| 4 | X RAM XCEIVER | |
| 5 | SECONDARY INPUT | |

CLK LENGTH CONTROL X25

| 65 CLK LENGTH A1 | 66 CLK LENGTH A0 |
|---|---|
| SELECT: CYCLE LENGTH | |
| HEX | CYCLE LENGTH |
| 0 | 250 ns |
| 1 | 200 ns |
| 2 | 150 ns |
| ③ | 100 ns |

NEXT ADDRESS PROM CONTROL X24

| 61 NA PROM A3 | 62 NA PROM A2 | 63 NA PROM A1 | 64 NA PROM A0 |
|---|---|---|---|

SEQUENCE
(See CONDITION MUX SELECT)

| PROM ADDR | HEX | TRUE CONDITION MNEMONIC | INSTRUCTION SOURCE | D INPUT SOURCE | STACK | FALSE CONDITION MNEMONIC | INSTRUCTION SOURCE | D INPUT SOURCE | STACK | COMPLETE MNEMONIC | PROM ADDR |
|---|---|---|---|---|---|---|---|---|---|---|---|
| 0 | 0 | (JSR M) | D | MAP PROM | PUSH PC | JMPS | STKO | u STORE | | SM.JS | 1 |
| 2 | 1 | NEXT | uPC | u STORE | | (JMPD) | D | u STORE | | N.JMD | 3 |
| 4 | 2 | JMPD | D | u STORE | | (NEXT) | uPC | u STORE | | JMD.N | 5 |
| 6 | 3 | NEXT | uPC | u STORE | | (JMPR) | R | u STORE | | N.JMR | 7 |
| 8 | 4 | JMPR | R | u STORE | | NEXT | uPC | u STORE | | JMR.N | 9 |
| A | 5 | NEXT | uPC | u STORE | | (JSRD) | D | u STORE | PUSH PC | N.JSD | B |
| C | 6 | JSRD | D | u STORE | PUSH PC | NEXT | uPC | u STORE | | JSD.N | D |
| E | 7 | NEXT | uPC | u STORE | | (RTS) | STKO | u STORE | POP | N.RTS | F |
| 10 | 8 | RTS | STKO | u STORE | POP | NEXT | uPC | u STORE | | RTS.N | 11 |
| 12 | 9 | RTS | STKO | u STORE | POP | JMPD | D | u STORE | | RT.JD | 13 |
| 14 | A | JMPD | D | u STORE | | RTS | STKO | u STORE | POP | JD.RT | 15 |
| 16 | B | JSRS | STKO | u STORE | PUSH PC | (JSRR) | R | u STORE | PUSH PC | SS.SR | 17 |
| 18 | C | JMPR | R | u STORE | | JSRD | D | u STORE | PUSH PC | JRSD | 19 |
| 1A | D | NEXT | uPC | MAP PROM | | (JMPS) | STKO | MAP PROM | | N.JMS | 1B |
| 1C | E | (PUSH N) | uPC | u STORE | PUSH PC | (JMPM) | D | MAP PROM | | PN.JM | 1D |
| 1E | F | (PJMPD) | D | u STORE | POP | NEXT | uPC | u STORE | | PJD.N | 1F |

| 6 | 7 |
|---|---|

X = DON'T CARE

X22
22 CMD IN LATCH ENAB
LOAD: COMMAND

| BIT | CMD LATCH CLOCK |
|---|---|
| ⓪ | HOLD COMMAND |
| 1 | TRANSPARENT TO NEW DATA |

X26
67 CLK ENAB
ENABLE: I0

| BIT | CLOCK ENABLE |
|---|---|
| ⓪ | NORMAL CLOCK |
| 1 | CLOCK MAY HALT WAITING ON I0 |

CONDITION MUX SELECT X27

| 68 COND MUX S3 | 69 COND MUX S2 | 70 COND MUX S1 | 71 COND MUX S0 |
|---|---|---|---|
| | SELECT: CONDI | | |
| HEX | CONDITION (F3) | | MNEMONIC |
| ⓪ | FALSE (L) | | CFALS |

-continued

CONDITION MUX SELECT X27

| | 68<br>COND<br>MUX S3 | 69<br>COND<br>MUX S2 | 70<br>COND<br>MUX S1 | 71<br>COND<br>MUX S0 |
| --- | --- | --- | --- | --- |
| | HEX | SELECT: COND1<br>CONDITION (F3) | | MNEMONIC |
| LATCH | 1 | ZERO (F=0) | | CZ |
| LATCH | 2 | NEGATIVE (F3) | | CSIGN |
| | 3 | Q0 | | CQ0 |
| | 4 | CMD BIT 1 | | CBIT1 |
| | 5 | CMD BIT 0 | | CBIT0 |
| | 6 | STACK FULL | | CSTKF |
| | 7 | STACK EMPTY | | CSTKEM |
| | 8 | PI CMD | | CPCMD |
| LATCH | 9 | IDPRWD | | CIRWD |
| LATCH | A | ODPRND | | CORFD |
| | B | POC | | CPOC |
| | C | CPU CMD | | CCCMD |
| | D | | | |
| | E | | | |
| | F | TRUE (H) | | CTRUE |

(SEE X24 SEQUENCE CONTROL)

X28
72
STACK PUSH/POP

| BIT | STACK FUNCTION |
| --- | --- |
| ⓪ | PUSH |
| 1 | POP |

I0 SELECT X29

| 73<br>I0 SEL A1 | 74<br>I0 SEL A0 | |
| --- | --- | --- |
| HEX | SELECT: I00<br>INPUT/OUTPUT | |
| 0 | PRIMARY OUTPUT | |
| ① | PRIMARY INPUT | |
| 2 | SECONDARY OUTPUT | |
| 3 | SECONDARY INPUT | |

STACK INITIALIZE X30

| 75<br>STACK INIT | 76<br>STACK FRAME INIT | |
| --- | --- | --- |
| | INIT: STK<br>INIT: FRAME | |
| STACK<br>INIT | FRAME<br>INIT | INITIALIZE |
| 0 | X | INITIALIZE STACK (ZERO) |
| X | 0 | INITIALIZE FRAME (ZERO) |
| ① | ① | NORMAL |

X = DON'T CARE

STACK CLOCKS X31

| 77<br>STACK CLK | 78<br>STACK FRAME CLK | |
| --- | --- | --- |
| | ENABLE: STKCLK<br>ENABLE: FRCLK | |
| STACK<br>CLK | FRAME<br>CLK | STACK CLKS |
| 0 | X | INCR/DECR STACK |
| X | 0 | INCR/DECR FRAME |
| ① | ① | NORMAL |

X32
79
STACK WR DATA ENAB
ENABLE: STACKWRT

| BIT | STACK WRITE DATA |
| --- | --- |
| 0 | LOWER BUS→STACK |
| ① | STACK OE/ |

OUTPUT CMD BIT X33

| 80<br>OUT CMD | 81<br>OUT PARM | |
| --- | --- | --- |
| HEX | STATUS: CMD, PARM<br>OUTPUT CMD BIT | |
| 1 | OUTPUT IS PARAMETER | |
| 2 | OUTPUT IS CMD | |
| ③ | PASS THROUGH | |

X34
82
CPU OUTPUT CLK
CLOCK: OUTCLK

| BIT | CPU OUTPUT CLOCK |
| --- | --- |
| 0 | NEW DATA TO OUTPUTS |
| ① | HOLD OLD OUTPUT |

X35
POC PASS
STATUS: POC

| BIT | POC |
| --- | --- |
| 0 | POWER ON CONFIDENCE PASS |
| ① | NORMAL |

VECTOR HIT TEST CONTROL X36

| 84<br>VHIT ON | 85<br>VHIT OFF | 86<br>VHIT HIT | |
| --- | --- | --- | --- |
| ON | STATUS: VHON, VHDON, VHIT | | |
| | OFF | HIT | VECTOR HIT TEST CONTROL |
| 0 | 1 | 1 | CLR HIT & DONE STATUS |
| 1 | 0 | X | SET DONE STATUS |
| 1 | X | 0 | SET HIT STATUS |
| ① | ① | ① | NORMAL |

X = DON'T CARE

X RAM ADDRESS XX11

| BIT | FUNCTION |
| --- | --- |
| | 27<br>DIV PROM IN ENAB<br>SELECT: SINE |
| ⓪ | UPPER BUS LATCH →DIV PROM |
| 1 | LOWER BUS →DIV PROM |
| | 28<br>DIV LATCH CLK<br>LOAD: DIVLATCH |
| 0 | CLK UPPER BUS LATCH |
| ① | HOLD PREVIOUS DATA |
| | 29<br>SHIFT SEL<br>HOLD: AOS |
| 0 | SHIFT BY PRESELECTED AMT |
| ① | SHIFT TO BRING FIRST "1" TO POS |
| | 30<br>SHIFT IN |

-continued

| X RAM ADDRESS XX11 | |
|---|---|
| BIT | FUNCTION |
| | SHSIGN |
| ⓪ | SHIFT IN ZEROS |
| 1 | SHIFT IN SIGN BIT (RIGHT SHIFT ONLY) |

| XX9 | |
|---|---|
| | 25 |
| | AMOUNT OF SHIFT CLK |
| | LOAD: AAOS |
| BIT | FUNCTION |
| 0 | CLK IN ARBITRARY AMT OF SHIFT |
| ① | HOLD PREVIOUS DATA |

| XX10 | |
|---|---|
| | 26 |
| | AMT OF SHIFT ENABLE |
| | SELECT: ARBAOS |
| BIT | FUNCTION |
| 0 | ARBITRARY AMOUNT OF SHIFT |
| ① | AMOUNT OF DENOMINATOR SHIFT |

| KONSTANT X40 K | | | | | | | |
|---|---|---|---|---|---|---|---|
| 33 | 34 | 35 | 36 | 37 | 38 | 39 | 40 |
| CONST F | CONST E | CONST D | CONST C | CONST B | CONST A | CONST 9 | CONST 8 |
| 41 | 42 | 43 | 44 | 45 | 46 | 47 | 48 |
| CONST 7 | CONST 6 | CONST 5 | CONST 4 | CONST 3 | CONST 2 | CONST 1 | CONST 0 |
| | | | ARBITRARY CONSTANT | | | | |

| X28 | |
|---|---|
| PERPENDICULAR UPPER/LOWER | |
| | 72 |
| | SELECT: DELY |
| BIT | FUNCTION |
| ⓪ | ΔX |
| 1 | ΔY |

| UPPER BUS ENABLE X19 | | |
|---|---|---|
| 50 | 51 | 52 |
| UPP BUS EN A2 | UPP BUS EN A1 | UPP BUS EN A0 |
| | SELECT: UPBUS | |
| HEX | UPPER BUS DRIVER | |
| ⓪ | | |
| 1 | SHIFTER | |
| 2 | AMOUNT OF SHIFT | |
| 3 | PRIMARY INPUT | |
| 4 | STACK RAM | |
| 5 | PERPENDICULARS PROM | |
| 6 | INPUT DATA PORT | |
| 7 | CONSTANT MUX | |

What is claimed and desired to be secured by United States Letters Patent is:

1. In a computer graphics system having a CPU, a work station connected to said CPU for inputting graphics data to said system, means connected to said CPU for storing said data, and means connected to said CPU for outputting graphic illustrations on a video output device, an improved data processing pipeline for processing geometric figures which are composed of an array of both lines and curves, said CPU computing a plurality of vertices and at least one set of control points for each figure input at said work station such that each said line is defined by two end-point vertices and such that each curve of said figure is defined by a set of said control points, and said pipeline comprising:
   means for geometrically transforming any of said vertices or control points to a new position, said transforming means having an input port and an output port and the input port of said transforming means being connected to said means for storing said data;
   means for clipping any of said vertices or control points to a viewing frustum, said clipping means having an input port and an output port and the input port of said clipping means being connected to the output port of said transforming means;
   means for generating a series of data points which re-define each curve of said figure in terms of a series of straight line segments, said generating means having an input port and an output port and the input port of said generating means being connected to the output port of said clipping means whereby said straight line segments are generated only after the output from said clipping means of said clipped vertices and control points; and
   means for converting said lines and curves defining said figure to a format compatible for outputting said figure on said video output device, said converting means being connected to the output port of said generating means.

2. A data processing pipeline as defined in claim 1 wherein said transforming means comprises:
   a matrix maker circuit having an input port and an output port, said matrix maker circuit comprising means for assembling transformation matrices;
   a matrix multiplier circuit having an input port and an output port, the input port of said matrix multiplier circuit being connected to said output port of the matrix maker circuit, said matrix multiplier circuit comprising means for concatenating two matrices;
   a vector multiplier circuit having an input port and an output port, the input port of said vector multiplier circuit being connected to the output port of said matrix multiplier circuit, said vector multiplier circuit comprising means for transforming said vertices and control points by a transformation matrix; and
   said matrix maker circuit, matrix multiplier circuit and vector multiplier circuit each further comprising means for separately programming each said circuit so as to provide for geometric transformations in the form of rotation, translation, scaling and shear transformations.

3. A data processing pipeline as defined in claim 1 wherein said viewing frustum comprises a plurality of sides which define the boundaries of said viewing frustum and wherein said clipping means comprises a separate clipping circuit corresponding to each said side of said viewing frustum, each said clipping circuit having an input port and an output port and each said clipping circuit being connected in series one to the other and comprising means for separately programming each said circuit so as to sequentially clip said vertices and control points in accordance with the boundaries defined by the sides of said viewing frustum.

4. A data processing pipeline as defined in claim 1 further comprising means, connected in series between said clipping means and said generating means, for projecting said vertices and control points in perspective onto an area which corresponds to a two-dimensional viewing surface of said video output device.

5. A data processing pipeline as defined in claim 1 further comprising means, connected to the output port of said transforming means, for processing said vertices and control points so as to generate information for preparing shaded surfaces of said figure and determining which surfaces of said figure are hidden.

6. A data processing pipeline as defined in claim 1 wherein each said transforming, clipping and generating means comprise at least one circuit separately programmed such that each said circuit may simultaneously process said vertices and control points at the same time as one or more of the other said circuits are processing said vertices and control points.

7. In a computer graphics system having a CPU, a work station connected to said CPU for inputting graphics data to said system, means connected to said CPU for storing said data, and means connected to said CPU for outputting graphic illustrations on a video monitor, an improved data processing pipeline for processing geometric figures which are composed of both lines and curves, said CPU computing a plurality of vertices and at least one set of control points for each figure input at said work station such that each curve of said figure is defined by a set of said control points, and said pipeline comprising:
means for geometrically transforming any of said vertices and control points to a new position, said transforming means having an input port and an output port and the input port of said transforming means being connected to said means for storing said data;
means for clipping any of said vertices and control points to a viewing frustum, said clipping means having an input port and an output port and the input port of said clipping means being connected to the output port of said transforming means;
means for projecting any of said vertices and control points in perspective onto an area which corresponds to a two-dimensional viewing surface of said video monitor, said projecting means having an input port and an output port and the input port of said projecting means being connected to the output port of said clipping means;
means for generating a series of data points which re-define each curve of said figure in terms of a series of straight line segments, said generating means having an input port and an output port and the input port of said generating means being connected to the output port of said projecting means, whereby said line segments are generated only after said vertices and control points are clipped and projected by said clipping means and said projecting means so as to enable said generating means to generate a sufficient number of line segments to essentially eliminate the appearance of any straight line approximations in any of said curves; and
means for converting said lines and curves defining said figure to a format compatible for outputting said figure on said video monitor, said converting means being connected to the output port of said generating means.

8. A data processing pipeline as defined in claim 7 wherein each said means comprises at least one circuit which is separately programmed such that each said circuit may simultaneously process said vertices and control points at the same time as one or more of the other said circuits are processing said vertices and control points.

9. A data processing pipeline as defined in claim 8 further comprising means, connected to the output port of said transforming means, for processing said vertices and control points so as to generate information for preparing shaded surfaces of said figure and determining which surfaces of said figure are hidden.

10. A data processing pipeline as defined in claim 9 wherein said viewing frustum comprises a plurality of sides which define the boundaries of said viewing frustum and wherein said clipping means comprises a separate clipping circuit comprising means for clipping said vertices and control points to each said side of said viewing frustum, each said clipping circuit having an input port and an output port and each said clipping circuit being connected in series one to the other and comprising means for separately programming each said circuit so as to sequentially clip said vertices and control points in accordance with the boundaries defined by the sides of said viewing frustum.

11. A data processing pipeline as defined in claim 8 wherein said transforming means comprises:
a matrix maker circuit having an input port and an output port, said matrix maker circuit comprising means for assembling transformation matrices;
a matrix multiplier circuit having an input port and an output port, the input port of said matrix multiplier circuit being connected to said output port of the matrix maker circuit, said matrix multiplier circuit comprising means for concatenating two matrices;
a vector multiplier circuit having an input port and and output port, the input port of said vector multiplier circuit being connected to the output port of said matrix multiplier circuit, said vector multiplier circuit comprising means for transforming said vertices and control points by a transformation matrix; and
said matrix maker circuit, matrix multiplier circuit and vector multiplier circuit each comprising means for separately programming each said circuit so as to provide for geometric transformations in the form of rotation, translation, scaling and shear transformations.

12. In a data processing pipeline that clips electronic signals to a viewing frustum, said electronic signals representing vector-valued control points defining curved edges and curved surfaces of a geometric figure, a system comprising:
means for clipping said control points to said viewing frustum, said clipping means comprising an output port for transmitting electronic signals representing the clipped control points; and
an exploder circuit comprising means for redefining the curved edges and surfaces defined by the clipped control points as curved edges comprised of a plurality of straight line segments and curved surfaces comprised of a plurality of essentially planar patches, whereby said straight line segments and said planar patches are generated only after said control points are clipped.

13. A data processing pipeline for processing a geometric figure having one or more curves defined by a set of vector-valued control points, whereby said figure can be displayed in an animated mode using a series of geometric transformations, said pipeline comprising:

a matrix maker circuit comprising means for defining at least one matrix for each said geometric transformation, said matrix maker circuit also comprising an electronic data input port for receiving said control points and an electronic data output port;

a matrix multiplier circuit comprising means for concatenating at least two of the matrices defined by said matrix maker circuit, said matrix multiplier circuit also comprising an electronic data input port and an electronic data output port, the matrix multiplier circuit input port being electronically connected to the matrix maker circuit output port;

a header circuit comprising means for generating command signals for controlling each circuit of said data processing pipeline as said circuits are used to process said control data points, said header circuit also comprising a first electronic data input port for receiving said control points and a first electronic data output port;

a vector multiplier circuit comprising means for geometrically transforming said control points, said vector multiplier circuit also comprising a first electronic data input port which is electronically connected to the first header circuit output port, a second electronic data input port which is electronically connected to the matrix multiplier circuit output port, and a first electronic data output port;

a plurality of clipper circuits, each said clipper circuit comprising means for clipping said control points to different clipping planes from one another, said clipping planes defining a viewing frustum, and said clipper circuits each comprising an electronic data input port and an electronic data output port, the input port of at least one said clipper circuit being electronically connected to the first output port of said vector multiplier circuit and said clipper circuits being electronically connected in series one with another such that control points transmitted to a first clipper circuit are then sequentially clipped in turn by each of the remaining clipper circuits, with the fully clipped control points being output from the output port of the last clipper circuit;

a view port circuit comprising means for projecting said control points in perspective onto an area representing a two-dimensional viewing surface, said view port circuit also comprising an electronic data input port and an electronic data output port, the input port of said view port circuit being electronically connected to said last clipper circuits output port;

an exploder circuit comprising means for redefining said curves in terms of a plurality of small straight line segments, said exploder circuit also comprising an electronic data input port and an electronic data output port, the exploder circuit input port being electronically connected to the view port circuit's output port so that said straight line segments are generated only after said control points are geometrically transformed, clipped and projected onto said viewing surface; and an incremental form circuit comprising means for transforming said straight line segments into a format for scan line conversion, said incremental form circuit also comprising an electronic data input port and an electronic data output port, the incremental form circuit's input port being electronically connected to the exploder circuit's output port and said incremental form circuit's output port being connected to a means for displaying said graphic illustration, whereby said figure is displayed in an animated mode.

14. A method of generating a geometric figure within the boundaries of a viewing frustum, said method comprising the steps of:

transmitting to a CPU from a data input device a set of electronic signals representing said figure;

transforming said electronic signals into a first set of control points representing said figure, said control points comprising both vertices terminating said linear edges of said figure and parametric control points corresponding to said curved edge of the figure;

clipping said first set of control points such that said vertices and parametric control points are within the boundaries of said viewing frustum, thereby generating a second set of control points comprising the vertices and parametric control points remaining after said clipping step; and transmitting said second set of control points to a video output device so as to illustrate said figure at said video output device.

15. A method as defined in claim 14 wherein transforming step comprises generating an electronic code associated with each control point, said code specifically identifying the parametric control points of said curved edge.

16. A method as defined in claim 14 wherein said clipping step comprises successively clipping said first set of control points to each side of said viewing frustum.

17. A method of generating a geometric figure within the boundaries of a viewing frustum, said method comprising the steps of:

transmitting to a CPU from a data input device a set of electronic signals representing said figure;

transforming said electronic signals into a first set of control points representing said figure, said control points comprising both vertices terminating linear edges of the figure and control points corresponding to curved edges of the figure;

clipping said first set of control points whereby a second set of control points is generated representing the figure after it has been clipped to fit within the boundaries of said viewing frustum;

generating from said second set of control points a plurality of electronic signals which redefine each curved edge of said clipped figure in terms of a series of small straight line segments; and transmitting said electronic signals to a video output device so as to illustrate said figure at said video output device.

18. A method as defined in claim 17 wherein transforming step comprises generating a first electronic code associated with each control point, said first code specifically identifying the control points of each said curved edge.

19. A method as defined in claim 17 wherein said clipping step comprises successively clipping said first set of control points to each side of said viewing frustum.

20. A method as defined in claim 18 wherein said transforming step comprises generating a second electronic code associated with each control point, said second code indicating whether an associated edge of said figure is to be rendered as a line drawing.

21. A method as defined in claim 20 wherein said generating step comprises enlarging said straight line segments so as to form thin rectangles therefrom for rendering portions of said figure as a line drawing.

22. In a computer graphics system having a CPU, a work station connected to said CPU for inputting graphics data to said system, means connected to said CPU for storing said data, and means connected to said CPU for outputting graphic illustrations on a video monitor, a method of processing geometric figures which are composed of both linear and curved edges, said method comprising the steps of:

generating at least one set of control points for each figure input at said work station such that each curve of said figure is defined by said control points;
 geometrically transforming each set of control points to a new position for each said video frame;
 clipping said control points to a viewing frustum;
 redefining each curve of said figure in terms of a series of straight line segments which are generated only after said control points are clipped; and
 outputting said figure on said video monitor.

23. A method as defined in claim 22 further comprising the step of projecting said control points in perspective onto an area of a two-dimensional viewing surface which corresponds to a portion of said video monitor.

24. A method as defined in claim 22 further comprising the steps of processing said control points so as to generate information for preparing shaded surfaces of said figure and determining which surfaces of said figure are hidden.

25. In a computer graphics system having a CPU, a work station connected to said CPU for inputting graphics data to said system, means connected to said CPU for storing said data, and means connected to said CPU for outputting sequential video frames representing animated graphic illustrations on a video monitor, a method of processing geometric figures which are composed of both linear and curved edges, said method comprising the steps of:

computing at least one set of control points for each figure input at said work station such that each curve of said figure is defined by said control points;
 geometrically transforming each set of control points to a new position for each said video frame;
 clipping said control points to a viewing frustum;
 projecting said control points in perspective onto an area of a two-dimensional viewing surface which corresponds to a portion of said video monitor;
 redefining each curve of said figure in terms of a series of straight line segments which are generated only after said control points are clipped and projected; and
 outputting said figure on said video monitor, whereby said figure will be output on said video monitor in an animated mode of display.

26. A method as defined in claim 25 further comprising the step of processing said control points so as to generate information for preparing shaded surfaces of said figure and determining which surfaces of said figure are hidden.

* * * * *

UNITED STATES PATENT AND TRADEMARK OFFICE
CERTIFICATE OF CORRECTION

PATENT NO. : 4,646,075

DATED : February 24, 1987

INVENTOR(S) : David H. Andrews et al.

It is certified that error appears in the above-identified patent and that said Letters Patent are hereby corrected as shown below:

On the title page, second inventor should read -- Philip H. Lucht --.

Abstract, line 5, "are" should be --is--
Abstract, line 35, "are" should be --is--
Column 1, line 14, "are" should be --is--
Column 5, lines 17-18, "in a desirable feature." should be --is a desirable feature.--
Column 8, line 54, "wll" should be --will--
Column 10, line 46, "pipline" should be --pipeline--
Column 11, line 30, "storage" should be --store --
Column 12, line 33, "against" should be --again--
Column 22, line 28, "thaw" should be --than--
Column 22, line 36, "are enter" should be --enter--
Column 23, line 61, "off" should be --of--
Column 29, line 62, "step 522" should be --step 523--
Column 33, line 28, "as" should be --is--
Column 36, line 30, "is then" should be --and is then--
Column 38, line 30, "211 211" should be --211--
Column 38, line 35, "on order" should be --in order--
Column 39, line 29, "are" should be --is--
Column 41, line 12, "41" should be --Y1--

Signed and Sealed this

Nineteenth Day of January, 1988

*Attest:*

DONALD J. QUIGG

*Attesting Officer*    *Commissioner of Patents and Trademarks*